US012812163B2

(12) United States Patent
Kim et al.

(10) Patent No.: US 12,812,163 B2
(45) Date of Patent: Nov. 24, 2026

(54) VIDEO SIGNAL PROCESSING METHOD BASED ON TEMPLATE MATCHING, AND DEVICE THEREFOR

(71) Applicant: WILUS INSTITUTE OF STANDARDS AND TECHNOLOGY INC., Gyeonggi-do (KR)

(72) Inventors: Kyungyong Kim, Gyeonggi-do (KR); Dongcheol Kim, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/849,475

(22) PCT Filed: Mar. 21, 2023

(86) PCT No.: PCT/KR2023/003741
§ 371 (c)(1),
(2) Date: Sep. 21, 2024

(87) PCT Pub. No.: WO2023/182781
PCT Pub. Date: Sep. 28, 2023

(65) Prior Publication Data

US 2025/0211783 A1 Jun. 26, 2025

(30) Foreign Application Priority Data

Mar. 21, 2022 (KR) ........................ 10-2022-0034765
Apr. 11, 2022 (KR) ........................ 10-2022-0044843
Apr. 15, 2022 (KR) ........................ 10-2022-0047172

(51) Int. Cl.
*H04N 19/573* (2014.01)
*H04N 19/176* (2014.01)
(Continued)

(52) U.S. Cl.
CPC ......... *H04N 19/573* (2014.11); *H04N 19/176* (2014.11); *H04N 19/57* (2014.11); *H04N 19/70* (2014.11)

(58) Field of Classification Search
CPC ........................................................ H04N 19/573
(Continued)

(56) References Cited

U.S. PATENT DOCUMENTS 11,388,421 B1 * 7/2022 Wang ..................... H04N 19/11
11,917,187 B2 * 2/2024 Jung .................... H04N 19/105
(Continued)

FOREIGN PATENT DOCUMENTS

KR 10-2020-0115322 10/2020
KR 10-2022-0025205 3/2022
(Continued)

OTHER PUBLICATIONS

International Search Report for PCT/KR2023/003741 mailed on Jun. 28, 2023 and its English translation from WIPO (now published as WO2023/182781).
(Continued)

*Primary Examiner* — Leron Beck
(74) *Attorney, Agent, or Firm* — WOMBLE BOND DICKINSON (US) LLP

(57) ABSTRACT

A processor of the video signal decoding device acquires a first motion information list including first motion information and second motion information related to the current block, acquires a first template including one or more adjacent blocks of the current block, acquires a second template including one or more adjacent blocks of a reference block corresponding to the first motion information and a third template including one or more adjacent blocks of the reference block corresponding to the second motion information, calculates a first cost value related to the similarity
(Continued)

between the first template and the second template, calculates a second cost value related to the similarity between the first template and the third template, and corrects the first motion information or the second motion information on the basis of the template corresponding to the lower cost value from among the first cost value and the second cost value.

20 Claims, 20 Drawing Sheets

(51) Int. Cl.
*H04N 19/57* (2014.01)
*H04N 19/70* (2014.01)

(58) Field of Classification Search
USPC .................................................... 375/240.16
See application file for complete search history.

(56) References Cited

U.S. PATENT DOCUMENTS

| | | | | |
|---|---|---|---|---|
| 11,956,460 | B2 * | 4/2024 | Zhang | H04N 19/176 |
| 12,047,581 | B2 * | 7/2024 | Chen | H04N 19/523 |
| 2010/0208827 | A1 * | 8/2010 | Divorra Escoda | H04N 19/176 375/240.24 |
| 2014/0269939 | A1 * | 9/2014 | Guo | H04N 19/34 375/240.26 |
| 2017/0353730 | A1 * | 12/2017 | Liu | H04N 19/159 |
| 2018/0098086 | A1 * | 4/2018 | Chuang | H04N 19/198 |
| 2018/0255295 | A1 * | 9/2018 | Lee | H04N 19/593 |
| 2019/0215531 | A1 * | 7/2019 | Lee | H04N 19/577 |
| 2019/0335181 | A1 * | 10/2019 | Abe | H04N 19/139 |
| 2020/0053364 | A1 * | 2/2020 | Seo | H04N 19/503 |
| 2020/0366900 | A1 * | 11/2020 | Jun | H04N 19/593 |
| 2021/0021847 | A1 * | 1/2021 | Moon | H04N 19/46 |
| 2021/0067776 | A1 * | 3/2021 | Reuze | H04N 19/573 |
| 2021/0152825 | A1 * | 5/2021 | Reuze | H04N 19/119 |
| 2021/0314596 | A1 * | 10/2021 | Wang | H04N 19/105 |
| 2021/0377559 | A1 | 12/2021 | Liu et al. | |
| 2022/0021883 | A1 * | 1/2022 | Esenlik | H04N 19/583 |
| 2022/0191504 | A1 * | 6/2022 | Gao | H04N 19/543 |
| 2022/0329824 | A1 * | 10/2022 | Liao | H04N 19/176 |
| 2022/0385888 | A1 * | 12/2022 | Lee | H04N 19/61 |
| 2022/0417500 | A1 * | 12/2022 | Huang | H04N 19/503 |
| 2023/0104476 | A1 * | 4/2023 | Chen | H04N 19/52 375/240.02 |
| 2024/0146908 | A1 * | 5/2024 | Zhang | H04N 19/567 |
| 2024/0291972 | A1 * | 8/2024 | Liao | H04N 19/105 |

FOREIGN PATENT DOCUMENTS

| | | |
|---|---|---|
| KR | 10-2022-0027157 | 3/2022 |
| WO | 2023/246634 | 12/2023 |

OTHER PUBLICATIONS

Written Opinion of the International Searching Authority for PCT/KR2023/003741 mailed on Jun. 28, 2023 and its English translation by Google Translate (now published as WO2023/182781).
Mehdi Salehifar et al.: "Non-EE2: Template Matching-based Reordering for Extended MMVD Design", Joint Video Experts Team (JVET) of ITU-T SG 16 WP 3 and ISO/IEC JTC 1/SC 29, Document: JVET-X0085-v4, 24th Meeting, by teleconference, Oct. 6-15, 2021, pp. 1-4.
Chuan Zhou et al.: "Non-EE2: MVP refinement for regular AMVP mode", Joint Video Experts Team (JVET) of ITU-T SG 16 WP 3 and ISO/IEC JTC 1/SC 29, Document: JVET-Y0091-v1, 25th Meeting, by teleconference, Jan. 12-21, 2022, pp. 1-4.

* cited by examiner

Fig. 20

| mvd_coding( x0, y0, refList ,cpIdx ) { | **Descriptor** |
|---|---|
| **mvd_zero_flag** | ae(v) |
| if( mvd_zero_flag == 0) { | |
| **abs_mvd_greater0_flag**[ 0 ] | ae(v) |
| if( abs_mvd_greater0_flag[ 0 ] == 1) | |
| **abs_mvd_greater0_flag**[ 1 ] | ae(v) |
| if( abs_mvd_greater0_flag[ 0 ] ) | |
| **abs_mvd_greater1_flag**[ 0 ] | ae(v) |
| if( abs_mvd_greater0_flag[ 1 ] ) | |
| **abs_mvd_greater1_flag**[ 1 ] | ae(v) |
| if( abs_mvd_greater0_flag[ 0 ] ) { | |
| if( abs_mvd_greater1_flag[ 0 ] ) | |
| **abs_mvd_minus2**[ 0 ] | ae(v) |
| **mvd_sign_flag**[ 0 ] | ae(v) |
| } | |
| if( abs_mvd_greater0_flag[ 1 ] ) { | |
| if( abs_mvd_greater1_flag[ 1 ] ) | |
| **abs_mvd_minus2**[ 1 ] | ae(v) |
| **mvd_sign_flag**[ 1 ] | ae(v) |
| } | |
| } | |
| } | |

Fig. 21

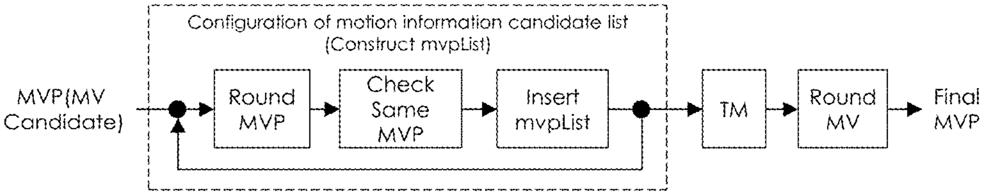

(a)

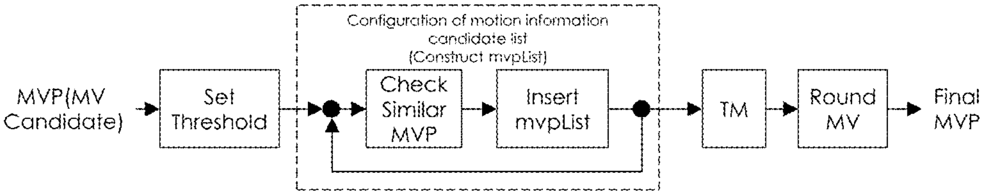

(b)

Fig. 27

D: Diamond Pattern
C: Cross Pattern

| AMVR | finestMvdPrec (Threshold) | (searchStepShift value, repetition count, pattern) for each TM application stage 1st, 2nd, 3rd, 4th, 5th |
|---|---|---|
| ¼ Pel | 2 | **(4, 365, D), (4, 1, C), (3, 1, C), (2, 1, C)**, (1, 1, C) |
| ½ Pel | 3 | **(4, 365, D), (4, 1, C), (3, 1, C)**, (2, 1, C), (1, 1, C) |
| 1 Pel | 4 | **(4, 365, D), (4, 1, C)**, (3, 1, C), (2, 1, C), (1, 1, C) |
| 4 Pel | 6 | **(6, 365, D), (6, 1, C)**, (5, 1, C), (4, 1, C), (3, 1, C) |

(a)

| AMVR | finestMvdPrec (Threshold) | (searchStepShift value, repetition count, pattern) for each TM application stage 1st, 2nd, 3rd, 4th, 5th |
|---|---|---|
| ¼ Pel | 2 | **(4, 365, D), (4, 1, C), (3, 1, C), (2, 1, C)**, (1, 1, C) |
| ½ Pel | 3 | **(4, 365, D), (4, 2, C), (3, 2, C)**, (2, 1, C), (1, 1, C) |
| 1 Pel | 4 | **(4, 365, D), (4, 2, C)**, (3, 1, C), (2, 1, C), (1, 1, C) |
| 4 Pel | 6 | **(6, 365, D), (6, 2, C)**, (5, 1, C), (4, 1, C), (3, 1, C) |

(b)

Fig. 28

D: Diamond Pattern
C: Cross Pattern

1st Stage

| AMVR | finestMvdPrec (Threshold) | (searchStepShift value, repetition count, pattern) for each TM application stage 1st, 2nd, 3rd, 4th, 5th |
|---|---|---|
| ¼ Pel | 2 | **(4, 365, D), (4, 1, C), (3, 1, C), (2, 1, C)**, (1, 1, C) |
| ½ Pel | 3 | **(4, 365, D), (4, 1, C), (3, 1, C)**, (2, 1, C), (1, 1, C) |
| 1 Pel | 4 | **(4, 365, D), (4, 1, C)**, (3, 1, C), (2, 1, C), (1, 1, C) |
| 4 Pel | 6 | **(6, 365, D), (6, 1, C)**, (5, 1, C), (4, 1, C), (3, 1, C) |

2nd Stage

| AMVR | finestMvdPrec (Threshold) | (searchStepShift value, repetition count, pattern) for each TM application stage 1st, 2nd, 3rd, 4th, 5th |
|---|---|---|
| ¼ Pel | 2 | (4, 365, D), (4, 1, C), (3, 1, C), **(2, 1, C)**, (1, 1, C) |
| ½ Pel | 3 | (4, 365, D), (4, 1, C), **(3, 1, C)**, (2, 1, C), (1, 1, C) |
| 1 Pel | 4 | (4, 365, D), **(4, 1, C)**, (3, 1, C), (2, 1, C), (1, 1, C) |
| 4 Pel | 6 | (6, 365, D), **(6, 1, C)**, (5, 1, C), (4, 1, C), (3, 1, C) |

Fig. 29

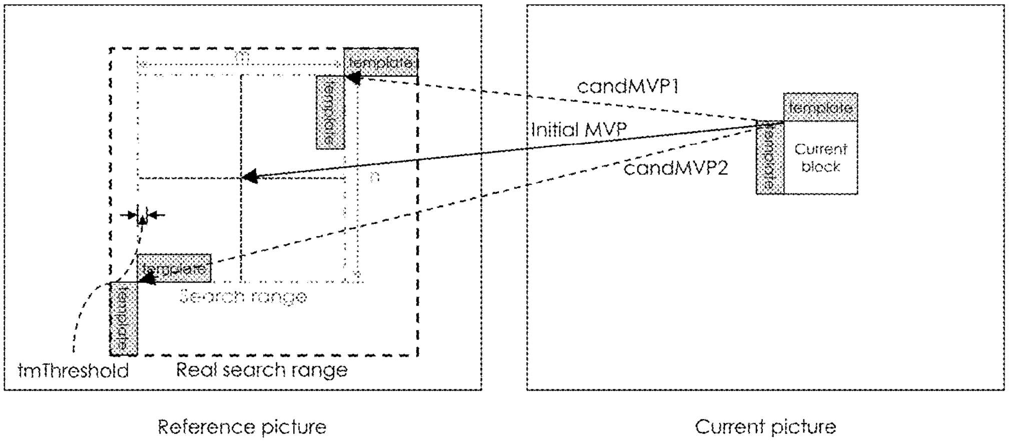

VIDEO SIGNAL PROCESSING METHOD BASED ON TEMPLATE MATCHING, AND DEVICE THEREFOR

CROSS-REFERENCE TO RELATED APPLICATIONS

This application is the National Stage filing under 35 U.S.C. 371 of International Application No. PCT/KR2023/003741, filed on Mar. 21, 2023, which claims the benefit of KR Provisional Application No. 10-2022-0034765, filed on Mar. 21, 2022, KR Provisional Application No. 10-2022-0044843, filed on Apr. 11, 2022, and KR Provisional Application No. 10-2022-0047172, filed on Apr. 15, 2022 the contents of which are all hereby incorporated by reference herein in their entirety.

TECHNICAL FIELD

The present disclosure relates to a video signal processing method and device and, more specifically, to a video signal processing method and device by which a video signal is encoded or decoded.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF INVENTION

Technical Problem

The disclosure is to provide a video signal processing method and a device therefor, so as to increase the coding efficiency of a video signal.

Solution to Problem

The present specification provides a video signal processing method and a device therefor.

In the present specification, a video signal decoding device may include a processor, wherein the processor is configured to: obtain a first motion information list including first motion information and second motion information related to a current block; obtain a first template including one or more neighboring blocks of the current block; obtain a second template including one or more neighboring blocks of a reference block corresponding to the first motion information, and a third template including one or more neighboring blocks of a reference block corresponding to the second motion information; calculate a first cost value related to a similarity degree between the first template and the second template, based on the first template and the second template; calculate a second cost value related to a similarity degree between the first template and the third template, based on the first template and the third template; and obtain first corrected motion information by correcting the first motion information or the second motion information, based on a template corresponding to a smaller cost value among the first cost value and the second cost value. The processor may be configured to rearrange the first motion information and the second motion information of the first motion information list, based on the first cost value and the second cost value. The processor may be configured to: obtain a fourth template including one or more neighboring blocks of a reference block corresponding to the first corrected motion information; and obtain second corrected motion information by correcting the first corrected motion information, based on the fourth template. The second corrected motion information may be motion information corrected based on the template matching.

In the present specification, a video signal encoding device may include a processor, wherein the processor is configured to obtain a bitstream decoded by a decoding method. In the present specification, a computer-readable non-transitory storage medium may store the bitstream.

The decoding method may include: obtaining a first motion information list including first motion information and second motion information related to a current block; obtaining a first template including one or more neighboring blocks of the current block; obtaining a second template including one or more neighboring blocks of a reference block corresponding to the first motion information, and a third template including one or more neighboring blocks of a reference block corresponding to the second motion information; calculating a first cost value related to a similarity degree between the first template and the second template, based on the first template and the second template; calculating a second cost value related to a similarity degree between the first template and the third template, based on the first template and the third template; and obtaining first corrected motion information by correcting the first motion information or the second motion information, based on a template corresponding to a smaller cost value among the first cost value and the second cost value. The decoding method may further include rearranging the first motion information and the second motion information of the first motion information list, based on the first cost value and the second cost value. The decoding method may further include rounding the first corrected motion information, based on an adaptive motion vector resolution (AMVR) of the current block. The decoding method may further include: obtaining a fourth template including one or more neighboring blocks of a reference block corresponding to the first corrected motion information; and obtaining second corrected motion information by correcting the first corrected motion information, based on the fourth template. The second corrected motion information may be motion information corrected based on the template matching.

In the present specification, the first template may be configured by only one or more neighboring blocks adjacent to an upper side of the current block, may be configured by only one or more neighboring blocks adjacent to a left side of the current block, or may be configured by one or more neighboring blocks adjacent to the upper side of the current block and one or more neighboring blocks adjacent to the left side of the current block.

In the present specification, the first cost value may be calculated based on a sum of cost values related to respective similarity degrees between the one or more neighboring blocks of the current block included in the first template and the one or more neighboring blocks of the reference block corresponding to the first motion information, the one or more neighboring blocks being included in the second template and corresponding to the one or more neighboring blocks of the current block included in the first template, respectively. The second cost value may be calculated based on a sum of cost values related to respective similarity degrees between the one or more neighboring blocks of the current block included in the first template and the one or more neighboring blocks of the reference block corresponding to the second motion information, the one or more neighboring blocks being included in the third template and corresponding to the one or more neighboring blocks of the current block included in the first template, respectively.

In the present specification, the first corrected motion information may be motion information corrected based on template matching.

In the present specification, a search range for performing the template matching may be determined based on an adaptive motion vector resolution (AMVR) of the current block.

In the present specification, the first motion information list may include pieces of motion information corresponding to (x1+K, y1), (x1−K, y1), (x1, y1+K), (x1, y1−K), (x2+K, y2), (x2−K, y2), (x2, y2+K), and (x2, y2−K), respectively, the first motion information may be (x1, y1), the second motion information may be (x2, y2), and K may be an integer equal to or greater than 1.

In the present specification, when an adaptive motion vector resolution (AMVR) of the current block is X, the first motion information list may include pieces of motion information corresponding to (x1+K*X, y1), (x1−K*X, y1), (x1, y1+K*X), (x1, y1−K*X), (x2+K*X, y2), (x2−K*X, y2), (x2, y2+K*X), and (x2, y2−K*X), respectively, and X may be a real number.

Advantageous Effects of Invention

The present disclosure provides a method for efficiently processing a video signal.

The effects which can be acquired from the present disclosure are not limited to the above-described effects, and other unmentioned effects can be clearly understood by those skilled in the art in the art to which the present disclosure belongs from the description below.

BRIEF DESCRIPTION OF DRAWINGS

FIG. 20 is a diagram illustrating a method of signaling a motion information differential value according to an embodiment of the present invention.

FIG. 21 is diagrams illustrating a method of performing TM, based on a motion information candidate according to an embodiment of the present invention.

FIG. 26 to FIG. 29 are diagrams illustrating TM that is recursively performed according to an embodiment of the present invention.

BEST MODE FOR CARRYING OUT THE INVENTION

Figure 1:
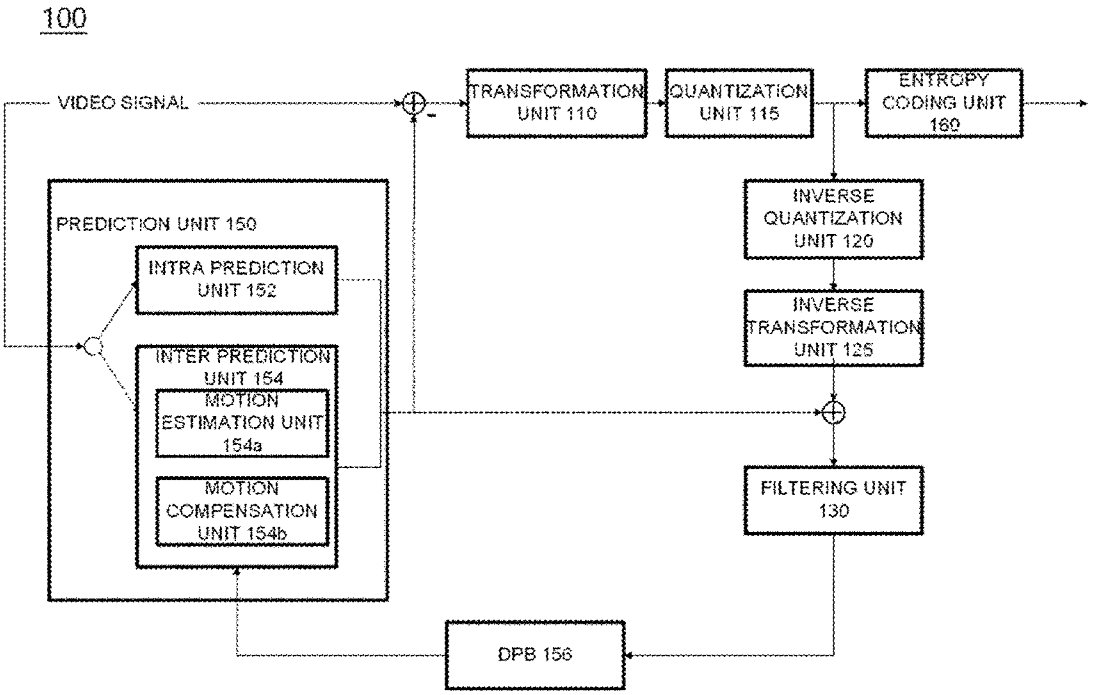
FIG. 1 is a schematic block diagram of a video signal encoding apparatus according to an embodiment of the present invention.

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, 'A and/or B' may be interpreted as meaning 'including at least one of A or B.'

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. Furthermore, a "block" refers to a region of an image that includes a particular component of a luma component and chroma components (i.e., Cb and Cr). However, depending on the embodiment, the terms "unit", "block", "partition", "signal", and "region" may be used interchangeably. Also, in the present specification, the term "current block" refers to a block that is currently scheduled to be encoded, and the term "reference block" refers to a block that has already been encoded or decoded and is used as a reference in a current block. In addition, the terms "luma", "luminance", "Y", and the like may be used interchangeably in this specification. Additionally, in the present specification, the terms "chroma", "chrominance", "Cb or Cr", and the like may be used interchangeably, and chroma components are classified into two components, Cb and Cr, and thus each chroma component may be distinguished and used. Additionally, in the present specification, the term "unit" may be used as a concept that includes a coding unit, a prediction unit, and a transform unit. A "picture" refers to a field or a frame, and depending on embodiments, the terms may be used interchangeably. Specifically, when a captured video is an interlaced video, a single frame may be separated into an odd (or cardinal or top) field and an even (or even-numbered or bottom) field, and each field may be configured in one picture unit and encoded or decoded. If the captured video is a progressive video, a single frame may be configured as a picture and encoded or decoded. In addition, in the present specification, the terms "error signal", "residual signal", "residue signal", "remaining signal", and "difference signal" may be used interchangeably. Also, in the present specification, the terms "intra-prediction mode", "intra-prediction directional mode", "intra-picture prediction mode", and "intra-picture prediction directional mode" may be used interchangeably. In addition, in the present specification, the terms "motion", "movement", and the like may be used interchangeably. Also, in the present specification, the terms "left", "left above", "above", "right above", "right", "right below", "below", and "left below" may be used interchangeably with "leftmost", "top left", "top", "top right", "right", "bottom right", "bottom", and "bottom left". Also, the terms "element" and "member" may be used interchangeably. Picture order count (POC) represents temporal position information of pictures (or frames), and may be the playback order in which displaying is performed on a screen, and each picture may have unique POC.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. A transform kernel used for the transform of a residual block may has characteristics that allow a vertical transform and a horizontal transform to be separable. In this case, the transform of the residual block may be performed separately as a vertical transform and a horizontal transform. For example, an encoder may perform a vertical transform by applying a transform kernel in the vertical direction of a residual block. In addition, the encoder may perform a horizontal transform by applying the transform kernel in the horizontal direction of the residual block. In the present disclosure, the transform kernel may be used to refer to a set of parameters used for the transform of a residual signal, such as a transform matrix, a transform array, a transform function, or transform. For example, a transform kernel may be any one of multiple available kernels. Also, transform kernels based on different transform types may be used for the vertical transform and the horizontal transform, respectively.

The transform coefficients are distributed with higher coefficients toward the top left of a block and coefficients closer to "0" toward the bottom right of the block. As the size of a current block increases, there are likely to be many coefficients of "0" in the bottom-right region of the block. To reduce the transform complexity of a large-sized block, only a random top-left region may be kept and the remaining region may be reset to "0".

In addition, error signals may be present in only some regions of a coding block. In this case, the transform process may be performed on only some random regions. In an embodiment, in a block having a size of 2N×2N, an error signal may be present only in the first 2N×N block, and the transform process may be performed on the first 2N×N block. However, the second 2N×N block may not be transformed and may not be encoded or decoded. Here, N may be any positive integer.

The encoder may perform an additional transform before transform coefficients are quantized. The above-described transform method may be referred to as a primary transform, and the additional transform may be referred to as a secondary transform. The secondary transform may be selective for each residual block. According to an embodiment, the encoder may improve coding efficiency by performing a secondary transform for regions where it is difficult to focus energy in a low-frequency region by using a primary transform alone. For example, a secondary transform may be additionally performed for blocks where residual values appear large in directions other than the horizontal or vertical direction of a residual block. Unlike a primary transform, a secondary transform may not be performed separately as a vertical transform and a horizontal transform. Such a secondary transform may be referred to as a low frequency non-separable transform (LFNST).

The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The deblocking filter is a filter for removing intra-block distortions generated at the boundaries between blocks in a reconstructed picture. Through the distribution of pixels included in several columns or rows based on random edges in a block, the encoder may determine whether to apply a deblocking filter to the edges. When applying a deblocking filter to the block, the encoder may apply a long filter, a strong filter, or a weak filter depending on the strength of deblocking filtering. Additionally, horizontal filtering and vertical filtering may be processed in parallel. The sample adaptive offset (SAO) may be used to correct offsets from an original video on a pixel-by-pixel basis with respect to a residual block to which a deblocking filter has been applied. To correct offset for a particular picture, the encoder may use a technique that divides pixels included in the picture into a predetermined number of regions, determines a region in which the offset correction is to be performed, and applies the offset to the region (Band Offset). Alternatively, the encoder may use a method for applying an offset in consideration of edge information of each pixel (Edge Offset). The adaptive loop filter (ALF) is a technique of dividing pixels included in a video into predetermined groups and then determining one filter to be applied to each group, thereby performing filtering differently for each group. Information about whether to apply ALF may be signaled on a per-coding unit basis, and the shape and filter coefficients of an ALF to be applied may vary for each block. In addition, an ALF filter having the same shape (a fixed shape) may be applied regardless of the characteristics of a target block to which the ALF filter is to be applied.

The prediction unit 150 includes an intra-prediction unit 152 and an inter-prediction unit 154. The intra-prediction unit 152 performs intra prediction within a current picture, and the inter-prediction unit 154 performs inter prediction to predict the current picture by using a reference picture stored in the decoded picture buffer 156. The intra-prediction unit 152 performs intra prediction from reconstructed regions in the current picture and transmits intra encoding information to the entropy coding unit 160. The intra encoding information may include at least one of an intra-prediction mode, a most probable mode (MPM) flag, an MPM index, and information regarding a reference sample. The inter-prediction unit 154 may again include a motion estimation unit 154*a* and a motion compensation unit 154*b*. The motion estimation unit 154*a* finds a part most similar to a current region with reference to a specific region of a reconstructed reference picture, and obtains a motion vector value which is the distance between the regions. Reference region-related motion information (reference direction indication information (L0 prediction, L1 prediction, or bidirectional prediction), a reference picture index, motion vector information, etc.) and the like, obtained by the motion estimation unit 154*a*, are transmitted to the entropy coding unit 160 so as to be included in a bitstream. The motion compensation unit 154B performs inter-motion compensation by using the motion information transmitted by the motion estimation unit 154*a*, to generate a prediction block for the current block. The inter-prediction unit 154 transmits the inter encoding information, which includes motion information related to the reference region, to the entropy coding unit 160.

According to an additional embodiment, the prediction unit 150 may include an intra block copy (IBC) prediction unit (not shown). The IBC prediction unit performs IBC prediction from reconstructed samples in a current picture and transmits IBC encoding information to the entropy coding unit 160. The IBC prediction unit references a specific region within a current picture to obtain a block vector value that indicates a reference region used to predict a current region. The IBC prediction unit may perform IBC prediction by using the obtained block vector value. The IBC prediction unit transmits the IBC encoding information to the entropy coding unit 160. The IBC encoding information may include at least one of reference region size information and block vector information (index information for predicting the block vector of a current block in a motion candidate list, and block vector difference information).

When the above picture prediction is performed, the transform unit 110 transforms a residual value between an original picture and a predictive picture to obtain a transform coefficient value. At this time, the transform may be performed on a specific block basis in the picture, and the size of the specific block may vary within a predetermined range. The quantization unit 115 quantizes the transform coefficient value generated by the transform unit 110 and transmits the quantized transform coefficient to the entropy coding unit 160.

The quantized transform coefficients in the form of a two-dimensional array may be rearranged into a one-dimensional array for entropy coding. In relation to methods for scanning a quantized transform coefficient, the size of a transform block and an intra-picture prediction mode may determine which scanning method is used. In an embodiment, diagonal, vertical, and horizontal scans may be applied. This scan information may be signaled on a block-by-block basis, and may be derived based on predetermined rules.

The entropy coding unit 160 generates a video signal bitstream by entropy coding information indicating a quantized transform coefficient, intra encoding information, and inter encoding information. The entropy coding unit 160 may use variable length coding (VLC) and arithmetic coding. The variable length coding (VLC) is a technique of transforming input symbols into consecutive codewords, wherein the length of the codewords is variable. For example, frequently occurring symbols are represented by shorter codewords, while less frequently occurring symbols are represented by longer codewords. As the variable length coding, context-based adaptive variable length coding (CAVLC) may be used. The arithmetic coding uses the probability distribution of each data symbol to transform consecutive data symbols into a single decimal number. The arithmetic coding allows acquisition of the optimal decimal bits needed to represent each symbol. As the arithmetic coding, context-based adaptive binary arithmetic coding (CABAC) may be used.

CABAC is a binary arithmetic coding technique using multiple context models generated based on probabilities obtained from experiments. First, when symbols are not in binary form, the encoder binarizes each symbol by using exp-Golomb, etc. The binarized value, 0 or 1, may be described as a bin. A CABAC initialization process is divided into context initialization and arithmetic coding initialization. The context initialization is the process of initializing the probability of occurrence of each symbol, and is determined by the type of symbol, a quantization parameter (QP), and slice type (I, P, or B). A context model having the initialization information may use a probability-based value obtained through an experiment. The context model provides information about the probability of occurrence of Least Probable Symbol (LPS) or Most Probable Symbol (MPS) for a symbol to be currently coded and about which of bin values 0 and 1 corresponds to the MPS (valMPS). One of multiple context models is selected via a context index (ctxIdx), and the context index may be derived from information in a current block to be encoded or from information about neighboring blocks. Initialization for binary arithmetic coding is performed based on a probability model selected from the context models. In the binary arithmetic coding, encoding is performed through the process in which division into probability intervals is made through the probability of occurrence of 0 and 1, and then a probability interval corresponding to a bin to be processed becomes the entire probability interval for the next bin to be processed. Information about a position within the last bin in which the last bin has been processed is output. However, the probability interval cannot be divided indefinitely, and thus, when the probability interval is reduced to a certain size, a renormalization process is performed to widen the probability interval and the corresponding position information is output. In addition, after each bin is processed, a probability update process may be performed, wherein information about a processed bin is used to set a new probability for the next to be processed.

The generated bitstream is encapsulated in network abstraction layer (NAL) unit as basic units. The NAL units are classified into video a coding layer (VCL) NAL unit, which includes video data, and a non-VCL NAL unit, which includes parameter information for decoding video data. There are various types of VCL or non-VCL NAL units. A NAL unit includes NAL header information and raw byte sequence payload (RBSP) which is data. The NAL header information includes summary information about the RBSP. The RBSP of a VCL NAL unit includes an integer number of encoded coding tree units. In order to decode a bitstream in a video decoder, it is necessary to separate the bitstream into NAL units and then decode each of the separate NAL units. Information required for decoding a video signal bitstream may be included in a picture parameter set (PPS), a sequence parameter set (SPS), a video parameter set (VPS), etc., and transmitted.

The block diagram of FIG. 1 illustrates the encoding device 100 according to an embodiment of the present disclosure, wherein the separately shown blocks logically distinguish the elements of the encoding device 100. Accordingly, the above-described elements of the encoding device 100 may be mounted as a single chip or multiple chips, depending on the design of the device. According to an embodiment, the above-described operation of each element of the encoding device 100 may be performed by a processor (not shown).

Figure 2:
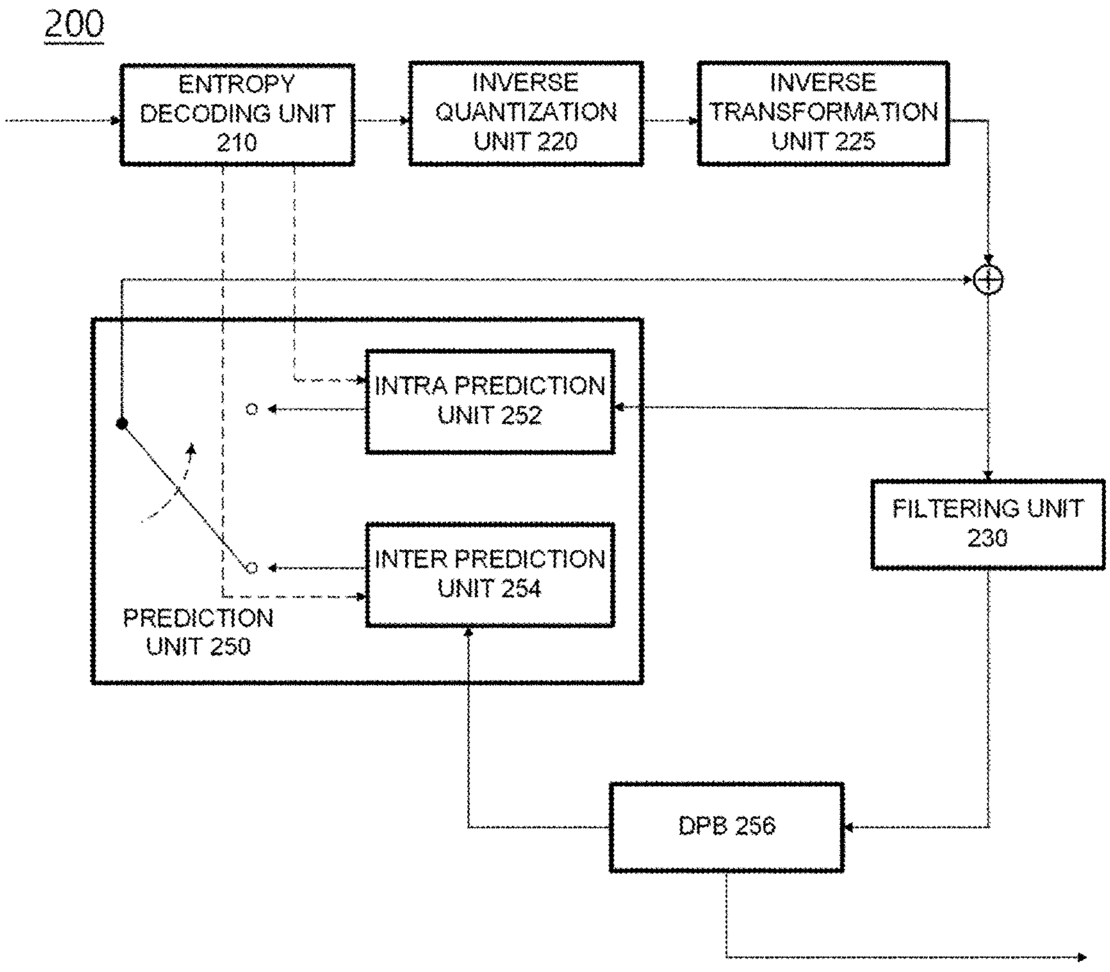
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures are pictures located temporally before or after the current picture, and may be pictures for which reconstruction has already been completed. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an IBC prediction unit (not shown). The IBC prediction unit may reconstruct the current region by referring to a specific region including reconstructed samples in the current picture. The IBC prediction unit obtains IBC encoding information for the current region from the entropy decoding unit 210. The IBC prediction unit obtains a block vector value of the current region indicating the specific region in the current picture. The IBC prediction unit may perform IBC prediction by using the obtained block vector value. The IBC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

The technology proposed in the present specification may be applied to a method and a device for both an encoder and a decoder, and the wording signaling and parsing may be for convenience of description. In general, signaling may be described as encoding each type of syntax from the perspective of the encoder, and parsing may be described as interpreting each type of syntax from the perspective of the decoder. In other words, each type of syntax may be included in a bitstream and signaled by the encoder, and the decoder may parse the syntax and use the syntax in a reconstruction process. In this case, the sequence of bits for each type of syntax arranged according to a prescribed hierarchical configuration may be called a bitstream.

One picture may be partitioned into sub-pictures, slices, tiles, etc. and encoded. A sub-picture may include one or more slices or tiles. When one picture is partitioned into multiple slices or tiles and encoded, all the slices or tiles within the picture must be decoded before the picture can be output a screen. On the other hand, when one picture is encoded into multiple subpictures, only a random subpicture may be decoded and output on the screen. A slice may include multiple tiles or subpictures. Alternatively, a tile may include multiple subpictures or slices. Subpictures, slices, and tiles may be encoded or decoded independently of each other, and thus are advantageous for parallel processing and processing speed improvement. However, there is the disadvantage in that a bit rate increases because encoded information of other adjacent subpictures, slices, and tiles is not available. A subpicture, a slice, and a tile may be partitioned into multiple coding tree units (CTUs) and encoded.

Figure 3:
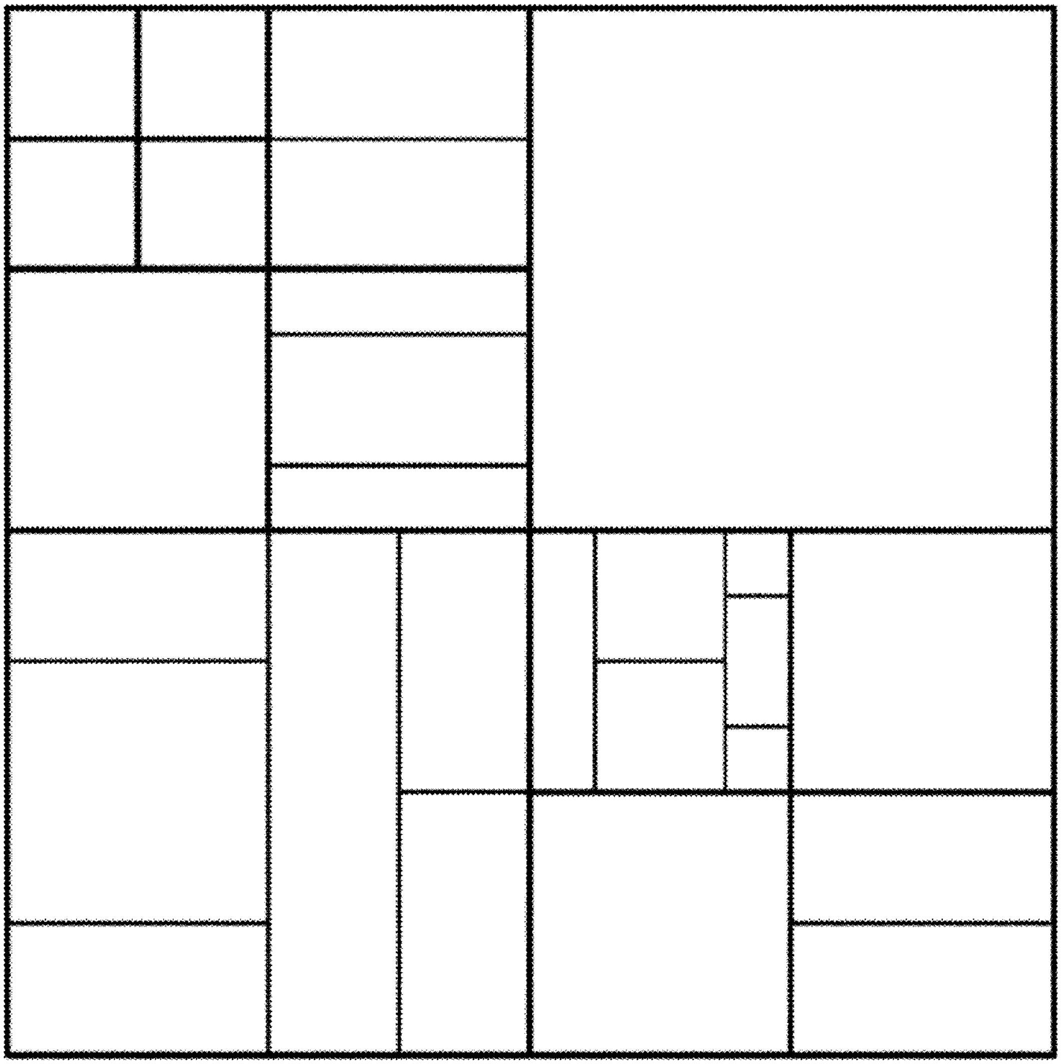
FIG. 3 shows an embodiment in which a coding tree unit is divided into coding units in a picture.

FIG. 3 illustrates an embodiment in which a coding tree unit (CTU) is divided into coding units (CUs) within a picture. In the process of coding a video signal, a picture may be divided into a sequence of coding tree units (CTUs). A coding tree unit may include a luma Coding Tree Block (CTB), two chroma coding tree blocks, and encoded syntax information thereof. One coding tree unit may include one coding unit, or one coding tree unit may be divided into multiple coding units. One coding unit may include a luma coding block (CB), two chroma coding blocks, and encoded syntax information thereof. One coding block may be partitioned into multiple sub-coding blocks. One coding unit may include one transform unit (TU), or one coding unit may be partitioned into multiple transform units. A transform unit may include a luma transform block (TB), two chroma transform blocks, and encoded syntax information thereof. A coding tree unit may be partitioned into multiple coding units. A coding tree unit may become a leaf node without being partitioned. In this case, the coding tree unit itself may be a coding unit.

The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

A leaf node of the multi-type tree can be a coding unit. When the coding unit is not greater than the maximum transform length, the coding unit can be used as a unit of prediction and/or transform without further splitting. As an embodiment, when the width or height of the current coding unit is greater than the maximum transform length, the current coding unit can be split into a plurality of transform units without explicit signaling regarding splitting. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
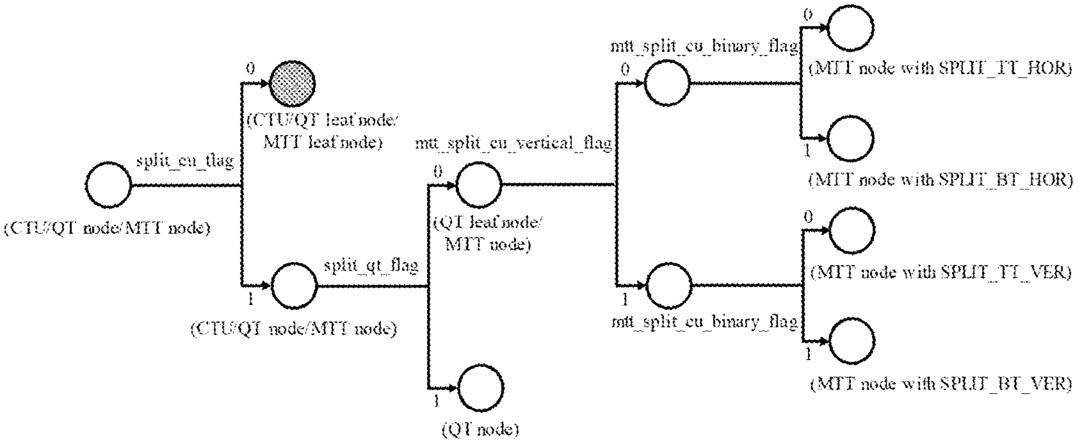
FIG. 4 shows an embodiment of a method for signaling a division of a quad tree and a multi-type tree.

FIG. 4 illustrates an embodiment of a method of signaling splitting of the quad tree and multi-type tree. Preset flags can be used to signal the splitting of the quad tree and multi-type tree described above. Referring to FIG. 4, at least one of a flag 'split_cu_flag' indicating whether or not to split a node, a flag 'split_qt_flag' indicating whether or not to split a quad tree node, a flag 'mtt_split_cu_vertical_flag' indicating a splitting direction of the multi-type tree node, or a flag 'mtt_split_cu_binary_flag' indicating a splitting shape of the multi-type tree node can be used.

According to an embodiment of the present invention, 'split_cu_flag', which is a flag indicating whether or not to split the current node, can be signaled first. When the value of 'split_cu_flag' is 0, it indicates that the current node is not split, and the current node becomes a coding unit. When the current node is the coating tree unit, the coding tree unit includes one unsplit coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes the coding unit.

When the value of 'split_cu_flag' is 1, the current node can be split into nodes of the quad tree or multi-type tree according to the value of 'split_qt_flag'. A coding tree unit is a root node of the quad tree, and can be split into a quad tree structure first. In the quad tree structure, 'split_qt_flag' is signaled for each node 'QT node'. When the value of 'split_qt_flag' is 1, the corresponding node is split into 4 square nodes, and when the value of 'qt_split_flag' is 0, the corresponding node becomes the 'QT leaf node' of the quad tree, and the corresponding node is split into multi-type nodes. According to an embodiment of the present invention, quad tree splitting can be limited according to the type of the current node. Quad tree splitting can be allowed when the current node is the coding tree unit (root node of the quad tree) or the quad tree node, and quad tree splitting may not be allowed when the current node is the multi-type tree node. Each quad tree leaf node 'QT leaf node' can be further split into a multi-type tree structure. As described above, when 'split_qt_flag' is 0, the current node can be split into multi-type nodes. In order to indicate the splitting direction and the splitting shape, 'mtt_split_cu_vertical_flag' and 'mtt_split_cu_binary_flag' can be signaled. When the value of 'mtt_split_cu_vertical_flag' is 1, vertical splitting of the node 'MTT node' is indicated, and when the value of 'mtt_split_cu_vertical_flag' is 0, horizontal splitting of the node 'MTT node' is indicated. In addition, when the value of 'mtt_split_cu_binary_flag' is 1, the node 'MTT node' is split into two rectangular nodes, and when the value of 'mtt_split_cu_binary_flag' is 0, the node 'MTT node' is split into three rectangular nodes.

In the tree partitioning structure, a luma block and a chroma block may be partitioned in the same form. That is, a chroma block may be partitioned by referring to the partitioning form of a luma block. When a current chroma block is less than a predetermined size, a chroma block may not be partitioned even if a luma block is partitioned.

In the tree partitioning structure, a luma block and a chroma block may have different forms. In this case, luma block partitioning information and chroma block partitioning information may be signaled separately. Furthermore, in addition to the partitioning information, luma block encoding information and chroma block encoding information may also be different from each other. In one example, the luma block and the chroma block may be different in at least one among intra encoding mode, encoding information for motion information, etc.

A node to be split into the smallest units may be treated as one coding block. When a current block is a coding block, the coding block may be partitioned into several sub-blocks (sub-coding blocks), and the sub-blocks may have the same prediction information or different pieces of prediction information. In one example, when a coding unit is in an intra mode, intra-prediction modes of sub-blocks may be the same or different from each other. Also, when the coding unit is in an inter mode, sub-blocks may have the same motion information or different pieces of the motion information. Furthermore, the sub-blocks may be encoded or decoded independently of each other. Each sub-block may be distinguished by a sub-block index (sbIdx). Also, when a coding unit is partitioned into sub-blocks, the coding unit may be partitioned horizontally, vertically, or diagonally. In an intra mode, a mode in which a current coding unit is partitioned into two or four sub-blocks horizontally or vertically is called intra sub-partitions (ISP). In an inter mode, a mode in which a current coding block is partitioned diagonally is called a geometric partitioning mode (GPM). In the GPM mode, the position and direction of a diagonal line are derived using a predetermined angle table, and index information of the angle table is signaled.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
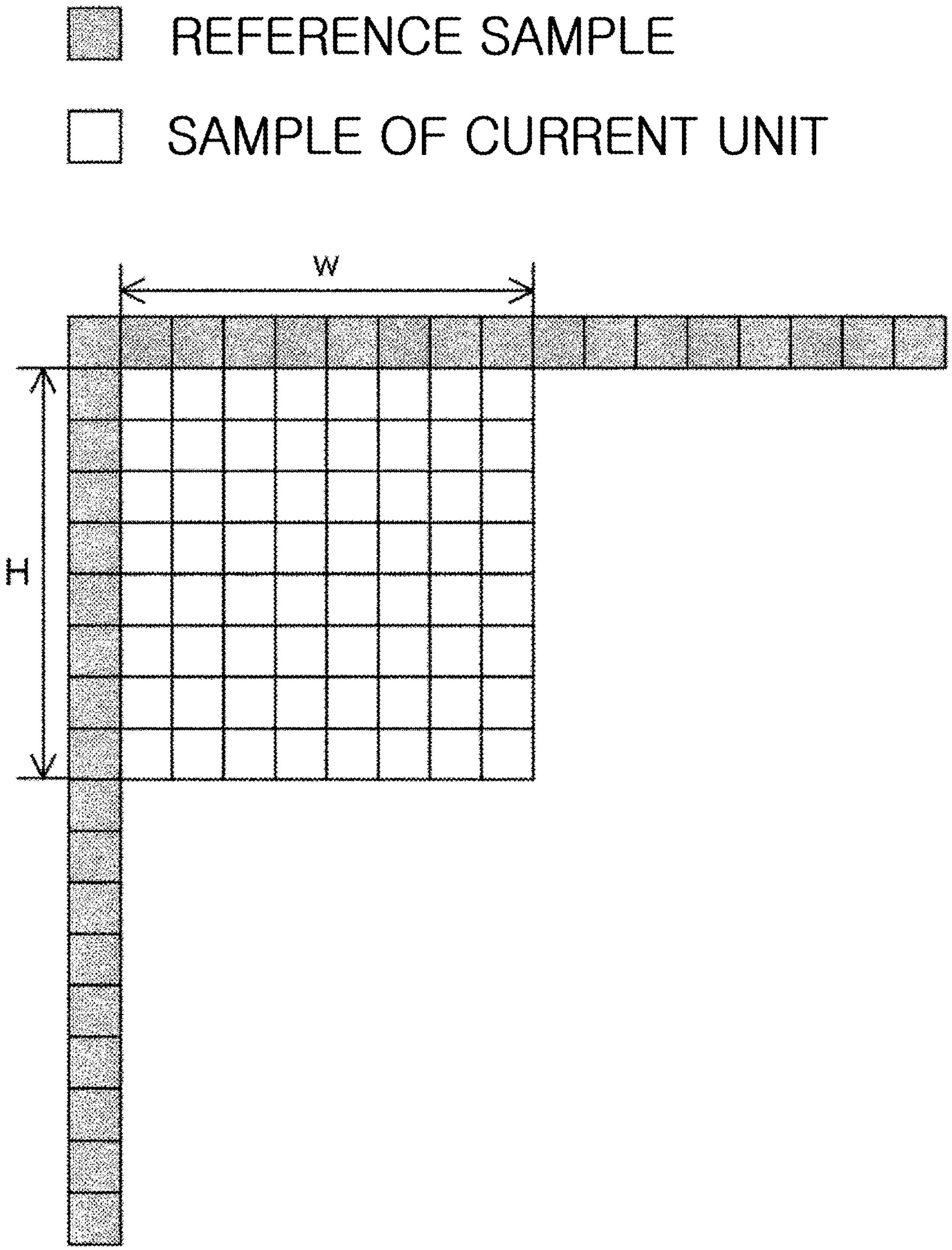
FIGS. 5 and 6 illustrate an intra-prediction method in more detail according to an embodiment of the present disclosure.
Figure 6:
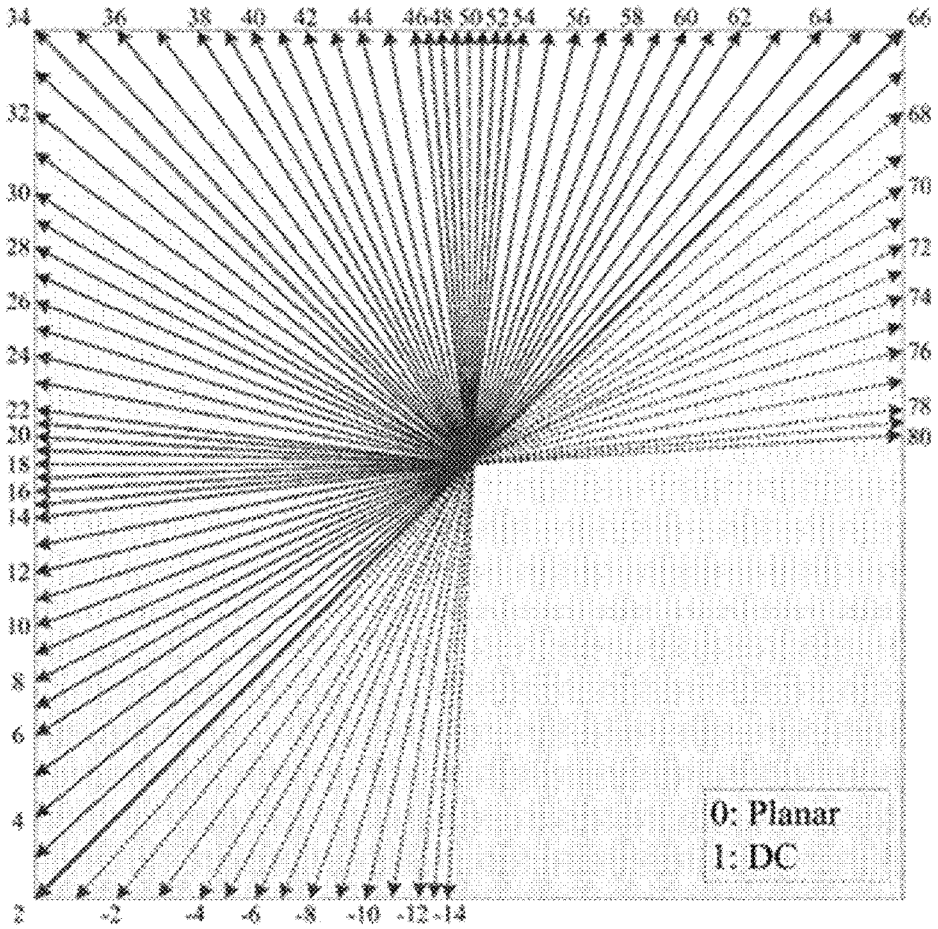

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

Pixels from multiple reference lines may be used for intra prediction of the current block. The multiple reference lines may include n lines located within a predetermined range from the current block. According to an embodiment, when pixels from multiple reference lines are used for intra prediction, separate index information that indicates lines to be set as reference pixels may be signaled, and may be named a reference line index.

When at least some samples to be used as reference samples have not yet been reconstructed, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range can be set differently depending on a shape of the current block. For example, if the current block is a rectangular block, a wide angle mode indicating an angle exceeding 45 degrees or less than −135 degrees in a clockwise direction can be additionally used. When the current block is a horizontal block, an angle mode can indicate an angle within an angle range (i.e., a second angle range) between (45+offset1) degrees and (−135+offset1) degrees in a clockwise direction. In this case, angle modes 67 to 76 outside the first angle range can be additionally used. In addition, if the current block is a vertical block, the angle mode can indicate an angle within an angle range (i.e., a third angle range) between (45−offset2) degrees and (−135−offset2) degrees in a clockwise direction. In this case, angle modes −10 to −1 outside the first angle range can be additionally used. According to an embodiment of the present disclosure, values of offset1 and offset2 can be determined differently depending on a ratio between the width and height of the rectangular block. In addition, offset1 and offset2 can be positive numbers.

According to a further embodiment of the present invention, a plurality of angle modes configuring the intra prediction mode set can include a basic angle mode and an extended angle mode. In this case, the extended angle mode can be determined based on the basic angle mode.

According to an embodiment, the basic angle mode is a mode corresponding to an angle used in intra prediction of the existing high efficiency video coding (HEVC) standard, and the extended angle mode can be a mode corresponding to an angle newly added in intra prediction of the next generation video codec standard. More specifically, the basic angle mode can be an angle mode corresponding to any one of the intra prediction modes {2, 4, 6, . . . , 66}, and the extended angle mode can be an angle mode corresponding to any one of the intra prediction modes {3, 5, 7, . . . , 65}. That is, the extended angle mode can be an angle mode between basic angle modes within the first angle range. Accordingly, the angle indicated by the extended angle mode can be determined on the basis of the angle indicated by the basic angle mode.

According to another embodiment, the basic angle mode can be a mode corresponding to an angle within a preset first angle range, and the extended angle mode can be a wide angle mode outside the first angle range. That is, the basic angle mode can be an angle mode corresponding to any one of the intra prediction modes {2, 3, 4, . . . , 66}, and the extended angle mode can be an angle mode corresponding to any one of the intra prediction modes {−14, −13, −12, . . . , −1} and {67, 68, . . . , 80}. The angle indicated by the extended angle mode can be determined as an angle on a side opposite to the angle indicated by the corresponding basic angle mode. Accordingly, the angle indicated by the extended angle mode can be determined on the basis of the angle indicated by the basic angle mode. Meanwhile, the number of extended angle modes is not limited thereto, and additional extended angles can be defined according to the size and/or shape of the current block. Meanwhile, the total number of intra prediction modes included in the intra prediction mode set can vary depending on the configuration of the basic angle mode and extended angle mode described above In the embodiments described above, the spacing between the extended angle modes can be set on the basis of the spacing between the corresponding basic angle modes. For example, the spacing between the extended angle modes {3, 5, 7, . . . , 65} can be determined on the basis of the spacing between the corresponding basic angle modes {2, 4, 6, . . . , 66}. In addition, the spacing between the extended angle modes {−14, −13, . . . , −1} can be determined on the basis of the spacing between corresponding basic angle modes {53, 54, . . . , 66} on the opposite side, and the spacing between the extended angle modes {67, 68, . . . , 80} can be determined on the basis of the spacing between the corresponding basic angle modes {2, 3, 4, . . . , 15} on the opposite side. The angular spacing between the extended angle modes can be set to be the same as the angular spacing between the corresponding basic angle modes. In addition, the number of extended angle modes in the intra prediction mode set can be set to be less than or equal to the number of basic angle modes.

According to an embodiment of the present invention, the extended angle mode can be signaled based on the basic angle mode. For example, the wide angle mode (i.e., the extended angle mode) can replace at least one angle mode (i.e., the basic angle mode) within the first angle range. The basic angle mode to be replaced can be a corresponding angle mode on a side opposite to the wide angle mode. That is, the basic angle mode to be replaced is an angle mode that corresponds to an angle in an opposite direction to the angle indicated by the wide angle mode or that corresponds to an angle that differs by a preset offset index from the angle in the opposite direction. According to an embodiment of the present invention, the preset offset index is 1. The intra prediction mode index corresponding to the basic angle mode to be replaced can be remapped to the wide angle mode to signal the corresponding wide angle mode. For example, the wide angle modes {−14, −13, . . . , −1} can be signaled by the intra prediction mode indices {52, 53, . . . , 66}, respectively, and the wide angle modes {67, 68, . . . , 80} can be signaled by the intra prediction mode indices {2, 3, . . . , 15}, respectively. In this way, the intra prediction mode index for the basic angle mode signals the extended angle mode, and thus the same set of intra prediction mode indices can be used for signaling the intra prediction mode even if the configuration of the angle modes used for intra prediction of each block are different from each other. Accordingly, signaling overhead due to a change in the intra prediction mode configuration can be minimized.

Meanwhile, whether or not to use the extended angle mode can be determined on the basis of at least one of the shape and size of the current block. According to an embodiment, when the size of the current block is greater than a preset size, the extended angle mode can be used for intra prediction of the current block, otherwise, only the basic angle mode can be used for intra prediction of the current block. According to another embodiment, when the current block is a block other than a square, the extended angle mode can be used for intra prediction of the current block, and when the current block is a square block, only the basic angle mode can be used for intra prediction of the current block.

The intra-prediction unit determines reference samples and/or interpolated reference samples to be used for intra prediction of the current block, based on the intra-prediction mode information of the current block. When the intra-prediction mode index indicates a specific angular mode, a reference sample corresponding to the specific angle or an interpolated reference sample from current samples in the current block is used for prediction of a current pixel. Thus, different sets of reference samples and/or interpolated reference samples may be used for intra prediction depending on the intra-prediction mode. After the intra prediction of the current block is performed using the reference samples and the intra-prediction mode information, the decoder reconstructs sample values of the current block by adding the residual signal of the current block, which has been obtained from the inverse transform unit, to the intra-prediction value of the current block.

Motion information used for inter prediction may include reference direction indication information (inter_pred_idc), reference picture index (ref_idx_l0, ref_idx_l1), and motion vector (mvL0, mvL1). Reference picture list utilization information (predFlagL0, predFlagL1) may be set based on the reference direction indication information. In one example, for a unidirectional prediction using an L0 reference picture, predFlagL0=1 and predFlagL1=0 may be set. For a unidirectional prediction using an L1 reference picture, predFlagL0=0 and predFlagL1=1 may be set. For bidirectional prediction using both the L0 and L1 reference pictures, predFlagL0=1 and predFlagL1=1 may be set.

When the current block is a coding unit, the coding unit may be partitioned into multiple sub-blocks, and the sub-blocks have the same prediction information or different pieces of prediction information. In one example, when the coding unit is in an intra mode, intra-prediction modes of the sub-blocks may be the same or different from each other. Also, when the coding unit is in an inter mode, the sub-blocks may have the same motion information or different pieces of motion information. Furthermore, the sub-blocks may be encoded or decoded independently of each other. Each sub-block may be distinguished by a sub-block index (sbIdx).

The motion vector of the current block is likely to be similar to the motion vector of a neighboring block. Therefore, the motion vector of the neighboring block may be used as a motion vector predictor (MVP), and the motion vector of the current block may be derived using the motion vector of the neighboring block. Furthermore, to improve the accuracy of the motion vector, the motion vector difference (MVD) between the optimal motion vector of the current block and the motion vector predictor found by the encoder from an original video may be signaled.

The motion vector may have various resolutions, and the resolution of the motion vector may vary on a block-by-block basis. The motion vector resolution may be expressed in integer units, half-pixel units, ¼ pixel units, 1/16 pixel units, 4-integer pixel units, etc. A video, such as screen content, has a simple graphical form such as text, and does not require an interpolation filter to be applied. Thus, integer units and 4-integer pixel units may be selectively applied on a block-by-block basis. A block encoded using an affine mode, which represent rotation and scale, exhibit significant changes in form, so integer units, ¼ pixel units, and 1/16 pixel units may be applied selectively on a block-by-block basis. Information about whether to selectively apply motion vector resolution on a block-by-block basis is signaled by amvr_flag. If applied, information about a motion vector resolution to be applied to the current block is signaled by amvr_precision_idx.

In the case of blocks to which bidirectional prediction is applied, weights applied between two prediction blocks may be equal or different, and information about the weights is signaled via BCW_IDX.

In order to improve the accuracy of the motion vector predictor, a merge or AMVP (advanced motion vector prediction) method may be selectively used on a block-by-block basis. The merge method is a method that configures motion information of a current block to be the same as motion information of a neighboring block adjacent to the current block, and is advantageous in that the motion information is spatially propagated without change in a motion region with homogeneity, and thus the encoding efficiency of the motion information is increased. On the other hand, the AMVP method is a method for predicting motion information in L0 and L1 prediction directions respectively and signaling the most optimal motion information in order to represent accurate motion information. The decoder derives motion information for a current block by using the AMVP or merge method, and then uses a reference block, located in the motion information in a reference picture, as a prediction block for the current block.

A method of deriving motion information in Merge or AMVP involves a method for constructing a motion candidate list using motion vector predictors derived from neighboring blocks of the current block, and then signaling index information for the optimal motion candidate. In the case of AMVP, motion candidate lists are derived for L0 and L1, respectively, so the most optimal motion candidate indexes (mvp_l0_flag, mvp_l1_flag) for L0 and L1 are signaled, respectively. In the case of Merge, a single move candidate list is derived, so a single merge index (merge_idx) is signaled. There may be various motion candidate lists derived from a single coding unit, and a motion candidate index or a merge index may be signaled for each motion candidate list. In this case, a mode in which there is no information about residual blocks in blocks encoded using the merge mode may be called a MergeSkip mode.

The motion candidate and the motion information candidate in this specification may have the same meaning. In addition, the motion candidate list and the motion information candidate list in this specification may have the same meaning.

Symmetric MVD (SMVD) is a method which makes motion vector difference (MVD) values in the L0 and L1 directions symmetrical in the case of bi-directional prediction, thereby reducing the bit rate of motion information transmitted. The MVD information in the L1 direction that is symmetrical to the L0 direction is not transmitted, and reference picture information in the L0 and L1 directions is also not transmitted, but is derived during decoding.

Overlapped block motion compensation (OBMC) is a method in which, when blocks have different pieces of motion information, prediction blocks for a current block are generated by using motion information of neighboring blocks, and the prediction blocks are then weighted averaged to generate a final prediction block for the current block. This has the effect of reducing the blocking phenomenon that occurs at the block edges in a motion-compensated video.

Generally, a merged motion candidate has low motion accuracy. To improve the accuracy of the merge motion candidate, a merge mode with MVD (MMVD) method may be used. The MMVD method is a method for correcting motion information by using one candidate selected from several motion difference value candidates. Information about a correction value of the motion information obtained by the MMVD method (e.g., an index indicating one candidate selected from among the motion difference value candidates, etc.) may be included in a bitstream and transmitted to the decoder. By including the information about the correction value of the motion information in the bitstream, a bit rate may be saved compared to including an existing motion information difference value in a bitstream.

A template matching (TM) method is a method of configuring a template through a neighboring pixel of a current block, searching for a matching area most similar to the template, and correcting motion information. Template matching (TM) is a method of performing motion prediction by a decoder without including motion information in a bitstream so as to reduce the size of an encoded bitstream. The decoder does not have an original image, and thus may schematically derive motion information of a current block by using a pre-reconstructed neighboring block.

A Decoder-side Motion Vector Refinement (DMVR) method is a method for correcting motion information through the correlation of already reconstructed reference videos in order to find more accurate motion information. The DMVR method is a method which uses the bidirectional motion information of a current block to use, within predetermined regions of two reference pictures, a point with the best matching between reference blocks in the reference pictures as a new bidirectional motion. When the DMVR method is performed, the encoder may perform DMVR on one block to correct motion information, and then partition the block into sub-blocks and perform DMVR on each sub-block to correct motion information of the sub-block again, and this may be referred to as multi-pass DMVR (MP-DMVR).

A local illumination compensation (LIC) method is a method for compensating for changes in luma between blocks, and is a method which derives a linear model by using neighboring pixels adjacent to a current block, and then compensate for luma information of the current block by using the linear model.

Existing video encoding methods perform motion compensation by considering only parallel movements in upward, downward, leftward, and rightward directions, thus reducing the encoding efficiency when encoding videos that include movements such as zooming, scaling, and rotation that are commonly encountered in real life. To express the movements such as zooming, scaling, and rotation, affine model-based motion prediction techniques using four (rotation) or six (zooming, scaling, rotation) parameter models may be applied.

Bi-directional optical flow (BDOF) is used to correct a prediction block by estimating the amount of change in pixels on an optical-flow basis from a reference block of blocks with bi-directional motion. Motion information derived by the BDOF of VVC may be used to correct the motion of a current block.

Prediction refinement with optical flow (PROF) is a technique for improving the accuracy of affine motion prediction for each sub-block so as to be similar to the accuracy of motion prediction for each pixel. Similar to BDOF, PROF is a technique that obtains a final prediction signal by calculating a correction value for each pixel with respect to pixel values in which affine motion is compensated for each sub-block based on optical-flow.

The combined inter-/intra-picture prediction (CIIP) method is a method for generating a final prediction block by performing weighted averaging of a prediction block generated by an intra-picture prediction method and a prediction block generated by an inter-picture prediction method when generating a prediction block for the current block.

The intra block copy (IBC) method is a method for finding a part, which is most similar to a current block, in an already reconstructed region within a current picture and using the reference block as a prediction block for the current block. In this case, information related to a block vector, which is the distance between the current block and the reference block, may be included in a bitstream. The decoder can parse the information related to the block vector contained in the bitstream to calculate or set the block vector for the current block.

The bi-prediction with CU-level weights (BCW) method is a method in which with respect to two motion-compensated prediction blocks from different reference pictures, weighted averaging of the two prediction blocks is performed by adaptively applying weights on a block-by-block basis without generating the prediction blocks using an average.

The multi-hypothesis prediction (MHP) method is a method for performing weighted prediction through various prediction signals by transmitting additional motion information in addition to unidirectional and bidirectional motion information during inter-picture prediction.

A cross-component linear model (CCLM) is a method for configuring a linear model by using a high correlation between a luma signal and a chroma signal at the same location as the corresponding luma signal, and then predicting a chroma signal through the corresponding linear model. After a template is configured using a block completed to be reconstructed from among neighboring blocks adjacent to a current block, and then a parameter for the linear model is derived through the template. Next, a current luma block selectively reconstructed according to the size of the chroma block according to a video format is down-sampled. Lastly, a chroma component block of the current block is predicted using the down-sampled luma component block and the corresponding linear model. In this case, the method using two or more linear models is called a multi-model linear mode (MMLM).

In independent scalar quantization, reconstructed coefficient t'k for input coefficient tk is only dependent on quantization index qk. That is, a quantization index for any reconstructed coefficient has a value different from those of quantization indices for other reconstructed coefficients. In this case, t'k may be a value obtained by adding a quantization error to tk, and may vary or remain the same according to a quantization parameter. Here, t'k may be also referred to as a reconstructed transform coefficient or a de-quantized transform coefficient, and the quantization index may be also referred to as a quantized transform coefficient.

In uniform reconstruction quantization (URQ), reconstructed coefficients have the characteristic of being arrangement at equal intervals. The distance between two adjacent reconstructed values may be called a quantization step size. The reconstructed values may include 0, and the entire set of available reconstructed values may be uniquely defined based on the quantization step size. The quantization step size may vary depending on quantization parameters.

In the existing methods, quantization reduces the set of acceptable reconstructed transform coefficients, and elements of the set may be finite. Thus, there are limitation in minimizing the average error between an original video and a reconstructed video. Vector quantization may be used as a method for minimizing the average error.

A simple form of vector quantization used in video encoding is sign data hiding. This is a method in which the encoder does not encode a sign for one non-zero coefficient and the decoder determines the sign for the coefficient based on whether the sum of absolute values of all the coefficients is even or odd. To this end, in the encoder, at least one coefficient may be incremented or decremented by "1", and the at least one coefficient may be selected and have a value adjusted so as to be optimal from the perspective of rate-distortion cost. In one example, a coefficient with a value close to the boundary between the quantization intervals may be selected.

Another vector quantization method is trellis-coded quantization, and, in video encoding, is used as an optimal path-searching technique to obtain optimized quantization values in dependent quantization. On a block-by-block basis, quantization candidates for all coefficients in a block are placed in a trellis graph, and the optimal trellis path between optimized quantization candidates is found by considering rate-distortion cost. Specifically, the dependent quantization applied to video encoding may be designed such that a set of acceptable reconstructed transform coefficients with respect to transform coefficients depends on the value of a transform coefficient that precedes a current transform coefficient in the reconstruction order. At this time, by selectively using multiple quantizers according to the transform coefficients, the average error between the original video and the reconstructed video is minimized, thereby increasing the encoding efficiency.

Among intra prediction encoding techniques, the matrix intra prediction (MIP) method is a matrix-based intra prediction method, and obtains a prediction signal by using a predefined matrix and offset values through pixels on the left and top of a neighboring block, unlike a prediction method having directionality from pixels of neighboring blocks adjacent to a current bloc.

To derive an intra-prediction mode for a current block, on the basis of a template which is a random reconstructed region adjacent to the current block, an intra-prediction mode for a template derived through neighboring pixels of the template may be used to reconstruct the current block. First, the decoder may generate a prediction template for the template by using neighboring pixels (references) adjacent to the template, and may use an intra-prediction mode, which has generated the most similar prediction template to an already reconstructed template, to reconstruct the current block. This method may be referred to as template intra mode derivation (TIMD).

In general, the encoder may determine a prediction mode for generating a prediction block and generate a bitstream including information about the determined prediction mode. The decoder may parse a received bitstream to set an intra-prediction mode. In this case, the bit rate of information about the prediction mode may be approximately 10% of the total bitstream size. To reduce the bit rate of information about the prediction mode, the encoder may not include information about an intra-prediction mode in the bitstream. Accordingly, the decoder may use the characteristics of neighboring blocks to derive (determine) an intra-prediction mode for reconstruction of a current block, and may use the derived intra-prediction mode to reconstruct the current block. In this case, to derive the intra-prediction mode, the decoder may apply a Sobel filter horizontally and vertically to each neighboring pixel adjacent to the current block to infer directional information, and then map the directional information to the intra-prediction mode. The method by which the decoder derives the intra-prediction mode using neighboring blocks may be described as decoder side intra mode derivation (DIMD).

Figure 7:
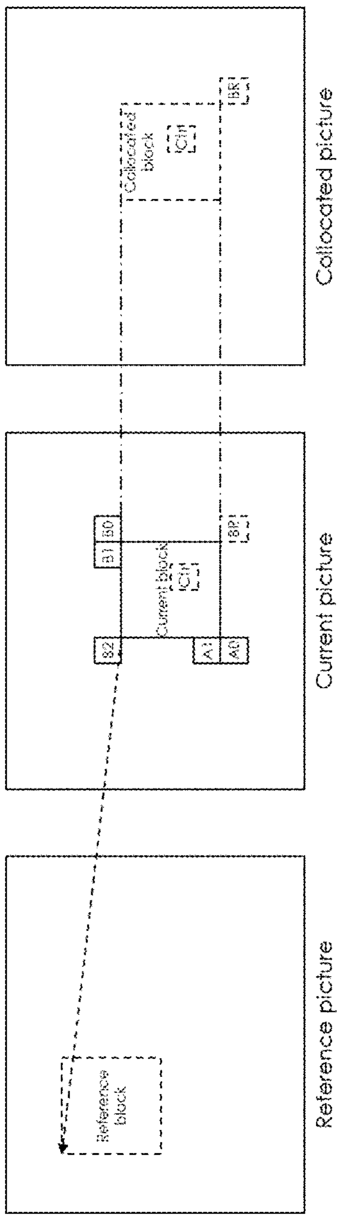
FIG. 7 illustrates the position of neighboring blocks used to construct a motion candidate list in inter prediction.

FIG. 7 illustrates the position of neighboring blocks used to construct a motion candidate list in inter prediction.

The neighboring blocks may be spatially located blocks or temporally located blocks. A neighboring block that is spatially adjacent to a current block may be at least one among a left (A1) block, a left below (A0) block, an above (B1) block, an above right (B0) block, or an above left (B2) block. A neighboring block that is temporally adjacent to the current block may be a block in a collocated picture, which includes the position of a top left pixel of a bottom right (BR) block of the current block. When a neighboring block temporally adjacent to the current block is encoded using an intra mode, or when the neighboring block temporally adjacent to the current block is positioned not to be used, a block, which includes a horizontal and vertical center (Ctr) pixel position in the current block, in the collocated picture corresponding to the current picture may be used as a temporal neighboring block. Motion candidate information derived from the collocated picture may be referred to as a temporal motion vector predictor (TMVP). Only one TMVP may be derived from one block. One block may be partitioned into multiple sub-blocks, and a TMVP candidate may be derived for each sub-block. A method for deriving TMVPs on a sub-block basis may be referred to as sub-block temporal motion vector predictor (sbTMVP).

Whether methods described in the present specification are to be applied may be determined on the basis of at least one of pieces of information relating to slice type information (e.g., whether a slice is an I slice, a P slice, or a B slice), whether the current block is a tile, whether the current block is a subpicture, the size of a current block, the depth of a coding unit, whether a current block is a luma block or a chroma block, whether a frame is a reference frame or a non-reference frame, and a temporal layer corresponding a reference sequence and a layer. Pieces of information used to determine whether methods described in the present specification are to be applied may be pieces of information promised between a decoder and an encoder in advance. In addition, such pieces of information may be determined according to a profile and a level. Such pieces of information may be expressed by a variable value, and a bitstream may include information on a variable value. That is, a decoder may parse information on a variable value included in a bitstream to determine whether the above methods are applied. For example, whether the above methods are to be applied may be determined on the basis of the width length or the height length of a coding unit. If the width length or the height length is equal to or greater than 32 (e.g., 32, 64, or 128), the above methods may be applied. If the width length or the height length is smaller than 32 (e.g., 2, 4, 8, or 16), the above methods may be applied. If the width length or the height length is equal to 4 or 8, the above methods may be applied.

Figure 8:
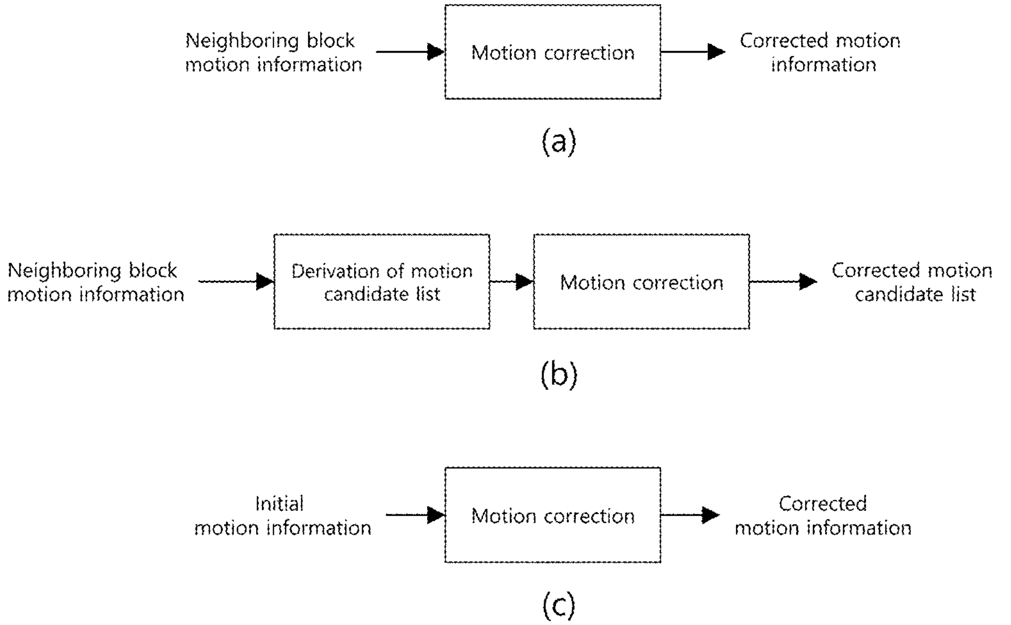
FIG. 8 is diagrams illustrating a method of correcting motion information according to an embodiment of the present invention.

FIGS. 8A, 8B, and 8C are diagrams illustrating a method of correcting motion information according to an embodiment of the present invention.

FIG. 8A illustrates a process of correcting (refining or revising) motion information derived from a neighboring block of a current block and outputting new motion information. Referring to FIG. 8A, a decoder may correct motion information of a neighboring block of a current block by various motion correction methods to obtain the corrected motion information. Referring to FIG. 8B, a decoder may derive a motion candidate list from a neighboring block of a current block and then correct one or more motion candidates in the derived motion candidate list by various motion correction methods to obtain the corrected motion candidate list. The motion candidate list may be configured using motion information derived from the neighboring block of the current block. The decoder may perform a motion correction process individually or entirely for the one or more motion candidates in the motion candidate list to obtain the corrected motion candidate list including the corrected one or more motion candidates. Referring to FIG. 8C, a decoder may correct initial motion information of a current block by various motion correction methods to obtain the corrected motion information. The motion correction methods may be motion vector difference (MVD), template matching (TM), bilateral matching (BM), merge mode with MVD (MMVD), merge mode with MVD (MMVD)-based TM, optical flow-based TM, and multi-pass DMVR.

Figure 9:
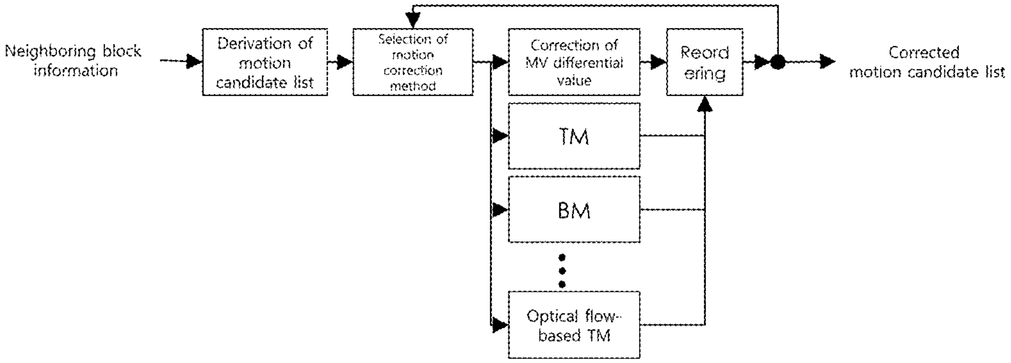
FIG. 9 is a diagram illustrating a method of correcting motion information of a current block by recursively performing a motion correction method according to an embodiment of the present invention.

FIG. 9 is a diagram illustrating a method of correcting motion information of a current block by recursively performing a motion correction method according to an embodiment of the present invention.

A decoder may correct initial motion information of a current block by recursively performing a motion correction method. The decoder may configure a motion candidate list for a current block by using neighboring blocks of the current block, and correct motion information by recursively performing one or more motion correction methods. The one or more motion correction methods may be motion vector difference (MVD), template matching (TM), bilateral matching (BM), merge mode with MVD (MMVD), merge mode with MVD (MMVD)-based TM, optical flow-based TM, and multi-pass DMVR. MVD is a method in which an encoder generates a correction value of motion information, which is included in a bitstream, and a decoder obtains the correction value of the motion information from the bitstream and corrects the motion information (MV differential value correction of FIG. 9). TM may be a method in which a decoder configures a template on the basis of a neighboring pixel of a current block, searches for a matching area having the highest similarity degree for the configured template, and corrects motion information. BM may be a method in which a decoder corrects motion information of a current block on the basis of a similarity degree between a reference block in a picture included in an L1 picture list and a reference block in a picture included in an L0 picture list derived on the basis of the motion information. The MMVD method is a method of correcting motion information by using one of one or more motion differential value candidates. An encoder may generate a bitstream including information on an index indicating one of one or more motion differential value candidates. A decoder may parse the information on the index included in the bitstream to obtain a differential value candidate indicated by the index, and correct motion information on the basis of the obtained differential value candidate. The MMVD-based TM method is a method in which an expanded motion candidate list configured using a motion candidate list and one or more motion differential value candidates is rearranged on the basis of a TM cost value, and motion information of a current block is corrected using a motion candidate in the rearranged list. An encoder may generate a bitstream including information on an index indicating one of candidates in a rearranged list. A decoder may parse the information on the index included in the bitstream and use a motion correction candidate indicated by the index as a correction value of motion information of a current block. The optical flow-based TM method may be a method in which a decoder configures a template of an area adjacent to a current block in an optical flow map, searches for an area similar to that of an optical flow map of a reference picture, and corrects motion information.

One or more motion correction methods may be applied to a merge or AMVP mode. Referring to FIG. 9, a decoder may derive (configure) a motion candidate list (e.g., merge candidate list) for a current block. The decoder may individually or entirely correct motion information (e.g., merge candidates) in the motion candidate list by using one or more motion correction methods. The decoder may rearrange the motion candidate list on the basis of a cost value of the corrected motion information. As described above, the decoder may perform the above correction method individually or entirely for motion candidates in the rearranged motion candidate list and rearrange the motion candidate list. That is, the decoder may recursively perform correction of the motion candidates and rearrangement of the motion candidate list. If this method is applied, the accuracy of motion information of a motion candidate in a motion candidate list is increased and thus residual signals are reduced so that the bit amount of residual signals can be reduced. The decoder may receive a separate signaling including an index indicating one of motion candidates in the rearranged motion candidate list, and predict (reconstruct) the current block on the basis of the motion candidate indicated by the index. Alternatively, the decoder may select a motion candidate having the lowest cost value, and predict (reconstruct) the current block on the basis of the motion candidate having the lowest cost value.

In order to increase the accuracy of a merge candidate, an encoder may generate a bitstream including information on an index indicating one of correction values of motion information obtained using a merge mode with MVD (MMVD) method, and a decoder may obtain the correction value of the motion information through the index obtained parsing the information on the index included in the bitstream, and use the correction value of the motion information to predict (reconstruct) a current block. The MMVD method is a method of selecting one of multiple motion differential value candidates, and may exhibit a lack of accuracy compared to a conventional method enabling sending a precise motion information differential value, but can save a significant bit amount. In order to further increase accuracy, the decoder may obtain second corrected motion information by additionally applying at least one method among TM, BM, merge mode with MVD (MMVD), merge mode with MVD (MMVD)-based TM, optical flow-based TM, and multi-pass DMVR methods to first corrected motion information that is corrected based on a correction value of motion information obtained using the MMVD method. Alternatively, the encoder may apply at least one method among TM, BM, merge mode with MVD (MMVD), merge mode with MVD (MMVD)-based TM, optical flow-based TM, and multi-pass DMVR methods to correct motion information, and then generate a bitstream additionally including information on a correction value of the motion information obtained applying the at least one method. In addition, indication information indicating whether information on a correction value is included in a bitstream may exist. In addition, the encoder may generate, when a correction method is recursively performed, a bitstream including information on which correction method has been used and information on a sequence in which a correction method is applied. The decoder may parse indication information included in a bitstream to identify whether information on a correction value exists. In addition, the decoder may parse information on which correction method has been used and information on a sequence in which a correction method is applied, which are included in a bitstream, to use same to correct motion information of the current block. When information on a correction value exists, the decoder may correct the motion information of the current block on the basis of the information on the correction value. When information on a correction value does not exist, the decoder may not parse the information on the correction value, and the correction value may not be applied to the motion information of the current block. The correction value may have the same meaning as a differential value.

When an encoder encodes motion information of a current block to an AMVP mode, the encoder may generate a bitstream including a differential value of the motion information. A decoder may generate a prediction block of the current block by using the differential value of the motion information included in the bitstream. The differential value of the motion information is included in the bitstream, and thus there is a problem in that the amount of bits is increased. In order to solve the problem, the above method may also be applied to an AMVP candidate list. That is, each or all of one or more candidates in a motion information candidate list obtained using AMVP may be corrected on the basis of at least one method among TM, BM, merge mode with MVD (MMVD), merge mode with MVD (MMVD)-based TM, optical flow-based TM, and multi-pass DMVR. A motion information candidate having the smallest cost value may be a final motion information candidate on the basis of TM. Alternatively, the motion information candidate list may be rearranged on the basis of TM and a cost value of each of the motion information candidates in the motion information candidate list. The encoder may signal and include, in a bitstream, an index of a final motion information candidate to be used as a motion prediction value of the current block in the rearranged motion information candidate list, and the decoder may parse the index to select the final motion information candidate of the current block, and use same as the motion prediction value. Corrected motion information is used, and thus the bit amount of a differential value of motion information actually included in a bitstream can be reduced. In addition, indication information indicating whether information on a differential value is included in a bitstream may exist. The decoder may parse indication information included in a bitstream to identify whether information on a differential value exists. When information on a differential value exists, the decoder may correct motion information of the current block on the basis of the information on the differential value. Specifically, the decoder may add up a differential value and a prediction value (a motion prediction value) of the motion information of the current block to obtain the motion information of the current block. When information on the differential does not exist, the decoder may not parse information on a differential value, and the differential value may be inferred to be (0,0). That is, the motion information of the current block may be obtained without application of a differential value or may be obtained on the basis of a differential value of (0,0). The differential value of (0,0) may indicate a motion in each direction (horizontal or vertical), and information on a differential value may include information indicating an absolute value and a sign value of each of horizontal and vertical components of the differential value.

In addition, each or all of one or more motion information candidates in a motion information candidate list obtained using AMVP may be corrected on the basis of at least one method among TM, BM, merge mode with MVD (MMVD), merge mode with MVD (MMVD)-based TM, optical flow-based TM, and multi-pass DMVR. Motion information corresponding the smallest cost value among the corrected motion information candidates may be an optimal motion candidate. Alternatively, an encoder may rearrange the motion information candidates on the basis of cost values to generate a bitstream including index information relating to which motion candidate is to be used as an optimal motion candidate. A decoder may parse the index information to identify an optimal motion information candidate. The optimal motion information candidate may be corrected on the basis of at least one method among TM, BM, merge mode with MVD (MMVD), merge mode with MVD (MMVD)-based TM, optical flow-based TM, and multi-pass DMVR, and this correction may be recursively repeated. The recursively repeated correction may change an initial search range and improve encoding efficiency.

At least one method among TM, BM, merge mode with MVD (MMVD), merge mode with MVD (MMVD)-based TM, optical flow-based TM, and multi-pass DMVRA motion prediction value of a current block may be applied to a motion prediction value of a current block, thereby correcting the motion prediction value. Then, a video signal processing device may obtain information on the MVD or MMVD method from a bitstream to additionally correct the corrected motion prediction value. An MVD or MMVD method may be first performed, and a correction method using at least one of TM, BM, merge mode with MVD (MMVD), merge mode with MVD (MMVD)-based TM, optical flow-based TM, and multi-pass DMVR may be performed. Alternatively, an encoder may generate a bitstream including a correction value of initial motion information by using MVD. A decoder may perform the above motion correction method on the basis of the correction value of the initial motion information included in the bitstream. In other word, the correction performance of initial motion information may vary according to which value the initial motion information has and a search range for correction of the initial motion information. That is, when a motion correction method is applied using slightly more accurate initial motion information, more precise motion information may be obtained.

Hereinafter, a method of applying motion vector difference (MVD), template matching (TM), bilateral matching (BM), merge mode with MVD (MMVD), merge mode with MVD (MMVD)-based TM, optical flow-based TM, and multi-pass DMVR is described.

A motion correction method to be used may be determined on the basis of an encoding mode (prediction mode) of a current block. For example, when a current block is encoded in a GPM mode, motion information may be first corrected using an MV differential value obtained using MMVD, and at least one of TM, BM, and optical flow-based TM methods may be performed for the corrected motion information, whereby the motion information may be corrected again. For example, when a current block is encoded in an AMVP mode, a video signal processing device may correct motion information by using an MV differential value obtained using MMVD of a merge mode, and perform at least one of TM, BM, and optical flow-based TM methods for the corrected motion information, thereby additionally correcting the corrected motion information. Here, MVD of the AMVP mode may not be applied.

For example, in a case where pieces of motion information of neighboring blocks adjacent to a current block are identical or similar to each other, correction for an MV differential value is not performed and at least one of TM, BM, and optical flow-based TM methods may be performed to correct motion information. This is because there is a high possibility that the motion of the current block may be similar to the motion of the neighboring blocks. In a case where the distributions of pieces of motion information of neighboring blocks adjacent to a current block are not similar to each other, a video signal processing device may correct motion information by using an MV differential value obtained using MVD or MMVD, and perform at least one of TM, BM, and optical flow-based TM methods for the corrected motion information, thereby additionally correcting the corrected motion information. This is because the motion of the current block may be different from that of the neighboring blocks.

For example, a motion correction method (e.g., motion vector difference (MVD), template matching (TM), bilateral matching (BM), optical flow-based TM, and multi-pass DMVR) may be selected on the basis of at least one of the size of a current block, whether a current block is a luma component block or a chroma component block, quantization parameter information on a current block, motion resolution information on a current block, whether a differential signal is present in a current block, and the sum or the number of absolute values of quantization indexes other than 0 in differential signals of a current block. If the size of the current block is equal to or greater than a random size or the motion resolution of the current block is a unit of a 1/16 pixel, the TM method may not be selected. This is because the TM method has high complexity. If the current block is a chroma component block, the TM method may not be performed for motion information of the chroma block and motion information having been corrected through the TM method in a luma component block of the current block may be used as the motion information of the chroma block. For example, the motion information having been corrected through the TM method in the luma component block of the current block may be scaled according to the resolution difference between the luma block and the chroma block and then be used for the chroma block of the current block.

For example, a motion correction method (e.g., motion vector difference (MVD), template matching (TM), bilateral matching (BM), merge mode with MVD (MMVD), merge mode with MVD (MMVD)-based TM, optical flow-based TM, and multi-pass DMVR) may be selected according to a characteristic of a current block. This is because there is a trade-off between the complexity and accuracy of each motion correction method. For example, TM has high complexity and disabled parallel processing, but exhibits the highest performance, BM has lower performance than TM, but has enabled parallel processing, and optical flow has low complexity and enabled parallel processing, but has a shortage of low performance. A selected motion correction method may be separately signaled. For example, a decoder may determine a motion correction method through a syntax element included in a bitstream. The syntax element may be signaled in an SPS level, a PPS level, a picture level, a slice level, and a coding unit (CU) level.

Figure 10:
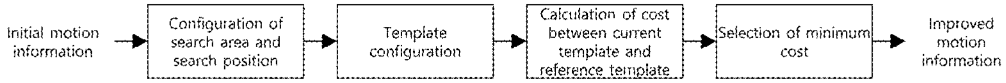
FIG. 10 is a diagram illustrating a sequence in which a TM method is performed according to an embodiment of the present invention.

FIG. 10 is a diagram illustrating a sequence in which a TM method is performed according to an embodiment of the present invention.

Referring to FIG. 10, a decoder may obtain initial motion information (initial MV and reference index) derived from a neighboring block. The decoder may configure a search area in a reference image on the basis of the initial motion information. The decoder may select several candidate positions in the search area according to a pre-defined search pattern. The decoder may configure a template for a current block by using a neighboring block of the current block, and configure a reference block (image) template having the same size as the template for the current block on the basis of the candidate positions. The decoder may obtain a cost value between the template for the current block and the reference block (image) template. The cost value between the templates may indicate a similarity degree between a first template and a second template, which are different from each other, when the templates exist. Specifically, a video signal processing device may calculate one or more cost values between one or more blocks included in the first template and one or more blocks included in the second template and corresponding to the one or more blocks included in the first template, respectively. A value obtained by adding up all the one or more cost values may be a cost value between the first template and the second template. The cost value may be obtained through sum of absolute differences (SAD) or mean-removed SAD (MRSAD). The decoder may obtain cost values for all the candidate positions in the search area, and use information of a motion candidate at a position corresponding to the smallest cost value as final motion information (e.g., improved motion information in FIG. 10). The meaning of obtaining a cost value in the present specification may be the same as that of calculating a cost value by a decoder.

Figure 11:
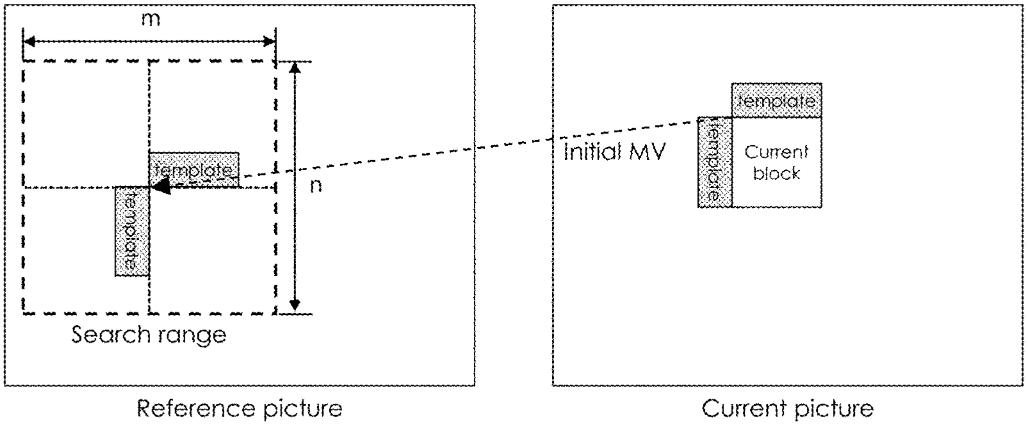
FIG. 11 is a diagram illustrating a method of configuring a search area for a TM method, based on initial motion information according to an embodiment of the present invention.

FIG. 11 is a diagram illustrating a method of configuring a search area for a TM method, based on initial motion information according to an embodiment of the present invention.

Referring to FIG. 11, in order to search for a reference block corresponding to a current block in a reference picture, a decoder may configure, as the position of the reference block, a position after movement by a value indicated by initial motion information (initial MV) from the upper left position of the current block. The decoder may configure a search area (range) having a random (m×n) size on the basis of the upper left position of the reference block. The formula m×n may be equal to 16×16. For example, the search area may have a range from −8 to 8 in the horizontal direction on the basis of a position of the initial motion information, and a range from −8 to 8 in the vertical direction. Specifically, the position indicated by the initial motion information may be (x,y) if represented by coordinates in the horizontal and vertical directions. The coordinate of the search area in the horizontal direction may have a range from x−8 to x+8, and the coordinate in the vertical direction may have a range from y−8 to y+8. The search area may be differently configured according to a characteristic of a video. Information on the size of the search area may be included in an SPS of a bitstream, a PPS, or a picture/tile/slice header. The decoder may parse information on a search area from a bitstream to identify the size of the search area and configure the search area. In addition, a search area may be configured based on at least one piece of information among the size of a current block, the transverse or longitudinal size of the current block, AMVR information on the current block, and information on whether OBMC or MHP is applied to the current block. For example, if the size of a current block is equal to or greater than 16×16, a search area may be configured to be 20×20. Alternatively, if AMVR of a current block is greater than a 1-integer pixel unit, a search area may be configured to be 20×20. If AMVR of a current block is equal to or smaller than a 1-integer pixel unit, a search area may be configured to be 16×16. Thereafter, the decoder may configure a left template of the current block and an above template of the current block by using blocks adjacent to the current block. In addition, the decoder configures a left template of the reference block and an above template of the reference block in the reference picture on the basis of the configured position of the reference block. The left template of the current block and the left template of the reference block may have the same size, and the above template of the current block and the above template of the reference block may have the same size.

Figure 12:
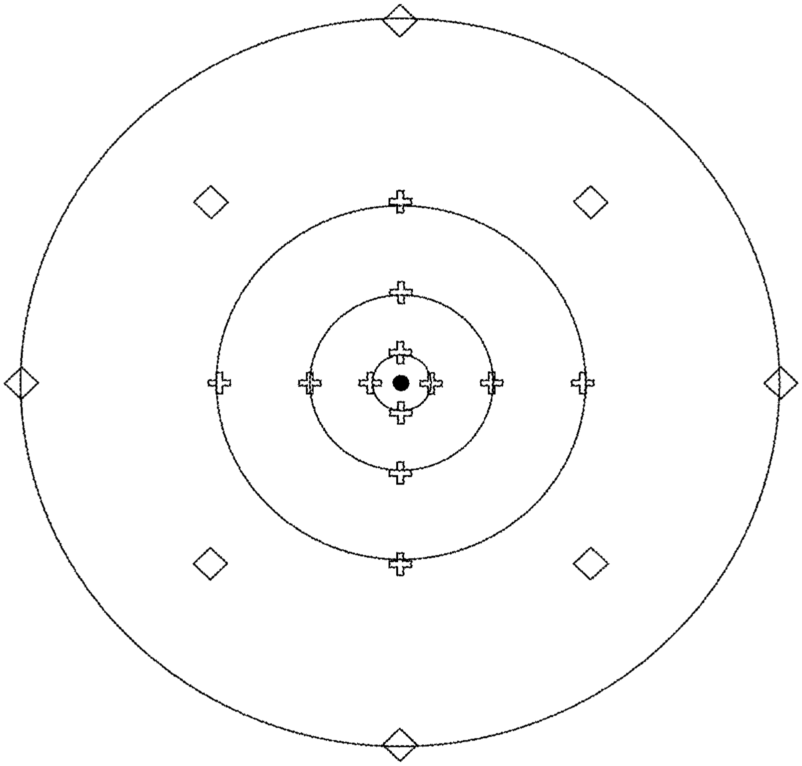
FIG. 12 is a diagram illustrating the position of a motion candidate searched for in a search area according to an embodiment of the present invention.

FIG. 12 is a diagram illustrating the position of a motion candidate searched for in a search area according to an embodiment of the present invention.

Referring to FIG. 12, the position of a motion candidate searched for in a search area for a TM method may be configured on the basis of a position (e.g., a center point of FIG. 12) for initial motion information. The position at which a motion candidate is searched for may change according to a search pattern. The search pattern may be a diamond pattern or a cross pattern. In FIG. 12, ◇ denotes a position at which a motion candidate is searched for according to a diamond pattern, and + may denote a position at which a motion candidate is searched for according to a cross pattern. A gap (or search gap) of the search pattern may be configured based on at least one of the size of a current block, whether the current block is a luma component block or a chroma component block, the resolution of motion information of the current block, the difference between POC values of the current block and a reference block, and a neighboring block motion characteristic of the current block. That is, the gap of the search pattern may be configured to be widened, narrowed, or equal in a direction going away from the initial motion information. For example, if the size of the current block is greater than a randomly pre-configured value, the current block has a high possibility of being a block for motion of a background or a big object, and thus the gap of the search pattern may be configured to be widened in a direction going away from the initial motion information. The randomly pre-configured value may be a value when the size of the block is 32×32. In addition, if the size of the current block is greater than a randomly pre-configured value, the current block has a high possibility of being a block for motion corresponding to an object boundary, and thus the gap of the search pattern may be configured to be further narrowed in a direction going away from the initial motion information, for search related to various motions. Information on the gap of the search pattern may be included in one of an SPS of a bitstream, a PPS, a picture header, and a slice header. A decoder may parse the information on the gap of the search pattern to configure a pattern gap of the current block.

Figure 13:
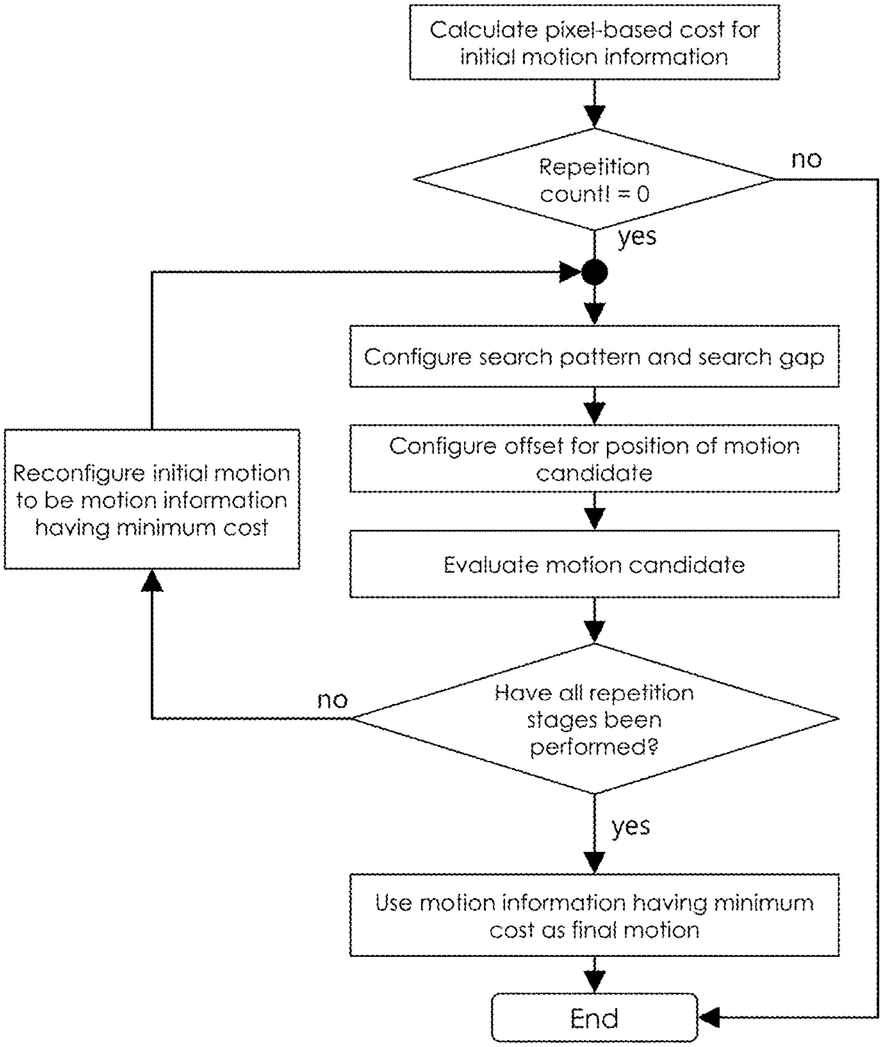
FIG. 13 is a diagram illustrating a process of searching for the position of a motion candidate according to an embodiment of the present invention.

FIG. 13 is a diagram illustrating a process of searching for the position of a motion candidate according to an embodiment of the present invention.

Specifically, FIG. 13 is a flowchart showing a searching process related to a position at which a motion candidate for a TM method is searched for. Referring to FIG. 13, a decoder may obtain (calculate) a pixel-based cost value for initial motion information. The decoder may terminate the process without performing a TM method if a repetition count of searching is "0". Otherwise (i.e., a repetition count of searching is not "0"), the decoder may perform the TM method. The repetition count may be a random integer value equal to or greater than 1.

An initial search process may be recursively repeated. A motion candidate corrected in a current search stage may be input as initial motion information of a subsequent search process. A search pattern, a search gap, and a repetition count in each stage may vary according to the motion resolution of a current block. For example, in a first search stage, a repetition count is configured to be "375", an initial search pattern is configured to be "DIAMOND", and an initial search gap may be configured to be "6" if the motion resolution is a 4-integer pixel unit, and may be configured to be "4" if the motion resolution is not a 4-integer pixel unit. In a second search process, a repetition count is configured to be "1", a search pattern is configured to be "CROSS", and a search gap may be configured to be "6" if the motion resolution is a 4-integer pixel unit, and may be configured to be "4" if the motion resolution is not a 4-integer pixel unit. In a third search process, a repetition count is configured to be "1", a search pattern is configured to be "CROSS", and a search gap may be configured to be "5" if the motion resolution is a 4-integer pixel unit, and may be configured to be "3" if the motion resolution is not a 4-integer pixel unit. In a fourth search process, a repetition count is configured to be "1", a search pattern is configured to be "CROSS", and a search gap may be configured to be "4" if the motion resolution is a 4-integer pixel unit, and may be configured to be "2" if the motion resolution is not a 4-integer pixel unit. In a fifth search process, a repetition count is configured to be "1", a search pattern is configured to be "CROSS", and a search gap may be configured to be "3" if the motion resolution is a 4-integer pixel unit, and may be configured to be "1" if the motion resolution is not a 4-integer pixel unit. Whether a search process corresponding to each stage is performed may be determined based on the motion resolution of the current block. For example, if the motion resolution of the current block is a 4-integer pixel unit or a 1-integer pixel unit, only the first and second search processes are performed and the third, fourth, and fifth search processes may not be performed. Alternatively, if the motion resolution of the current block is a ½-pixel unit, only the first, second, and third search processes are performed and the fourth and fifth search processes may not be performed. Alternatively, if the motion resolution of the current block is a ¼-pixel unit, only the first, second, third, and fourth search processes are performed and the fifth search process may not be performed.

The repetition count, the initial search pattern, and the initial search gap in the above search process may be established before a process illustrated in FIG. 13 is performed.

Next, the search pattern and the search gap may be reconfigured. The search pattern and the search gap may be determined on the basis of at least one of the size of the current block, whether the current block is a luma component block or a chroma component block, a current motion resolution, a repetition count, the distribution of cost values of motion candidate positions calculated in a previous repetition stage, and information relating to whether OBMC or MHP is applied to the current block. Hereinafter, a method of configuring the search pattern and the search gap is described.

The search gap may be determined according to a motion information resolution of the current block. The motion information resolution may be a unit of a 1-integer pixel, 4-integer pixels, a ½ pixel, a ¼ pixel, and a 1/16 pixel. If the motion information resolution is a ¼ pixel, the initial search gap may be configured to be 6, and otherwise, the initial search gap may be configured to be 4.

The search pattern may be determined to be a diamond pattern or a cross pattern. The search gap may be adjusted to be decreased or increased from the initial search gap by a random gap. For example, the search pattern and the search gap may change according to a repetition stage. The repetition stage may indicate how many times reconfiguration of the search pattern and the search gap is repeated, if the repetition count is not 0. That is, the search pattern and the search gap may vary according to which ordinal number the repetition stage has. For example, in a first repetition stage, evaluation of a motion candidate position may be performed based on a diamond search pattern and an initial search gap as the search pattern and the search gap. In a second stage, new candidate positions may be selected using a cross pattern and the initial search gap, based on an optimal motion candidate found in the first stage. Then, evaluation of the new candidate positions may be performed. In a third stage, new candidate positions may be selected using a cross pattern and a search gap obtained by reducing the initial search gap by 1, based on an optimal motion candidate found in the previous stage. Then, evaluation of the new candidate positions may be performed. In a stage after the third stage, new candidate positions may be selected using a cross pattern and a search gap obtained by reducing the search gap of the previous stage by 1, based on an optimal motion candidate found in the previous stage, and evaluation of the new candidate positions may be performed.

The search pattern and the search gap may be configured according to the motion resolution of the current block. A repetition count and the size of a template may be configured according to the motion resolution of the current block. For example, if the motion resolution is not a ¼-pixel unit, the repetition count may be configured to be a value equal to or greater than 2. That is, when the motion resolution of the current block is high (the motion is not precise), a search process may be additionally performed and motion information may be corrected. If the motion resolution is a ¼-pixel unit, a search pattern may be configured to be a diamond pattern to search for a precise motion.

The search pattern and the search gap may be configured according to a color component of the current block. The search pattern and the search gap for a chroma component may be configured to be wider than those for a luma component. This is because a chroma component (signal) has a higher spatial correlation than a luma component (signal). Alternatively, the search pattern and the search gap for a chroma component may be configured to be shorter than those for a luma component so as to increase performance.

The search pattern and the search gap may be configured on the basis of the size of the current block. If the size of the current block is equal to or greater than a predetermined random value, a cross pattern is used as the search pattern and the search gap may be configured to be wider than the initial search gap. For example, the search gap may be "7". If the size of the current block is greater than a predetermined random number in order to increase performance, a diamond pattern is used as the search pattern and the search gap may be configured to be shorter than the initial search gap. For example, the search gap may be "5". The size of the current block may be 16×16 or 32×32, and the search pattern and the search gap may be configured on the basis of the sum of a transverse size and a longitudinal size of the current block. In addition, the size of a template may be configured based on the size of the current block. If the size of the current block is equal to or greater than a predetermined random value, the size of the template may be configured to be a predetermined size. If the size of the current block is equal to or greater than a predetermined random value, the size of the template may be configured to be smaller than a conventional size.

Next, the decoder may configure a correction value (offset) for the position of a motion candidate searched for using the search pattern and the search gap, and evaluate discovered motion candidates. Evaluating in the present specification may indicate obtaining a cost value. The position at which a motion candidate is searched for may change according to the search pattern. For example, if the search pattern is a cross pattern, a correction value is (0, 1), (1, 0), (0, −1), or (−1, 0), and the search pattern is a diamond pattern, a correction value is (0, 2), (1, 1), (2, 0), (1, −1), (0, −2), (−1, −1), (−2, 0), and (−1, 1). The correction value (x,y) denotes (horizontal, vertical), and x may be a correction value for a horizontal direction, and y may be a correction value for a vertical direction.

The method described with reference to FIG. 13 may be recursively performed by a predetermined random repetition count. For example, if a repetition count is 1, the method may be performed one or more times. If the decoder has searched for motion candidates and has evaluated all discovered motion candidates, the decoder may use motion information of a motion candidate corresponding to the smallest cost value as final motion information.

An initial motion candidate of FIG. 13 may be reconfigured on the basis of the smallest cost value in a previous repetition stage. An initial motion candidate of a next stage may be reconfigured on the basis of a motion candidate corresponding to the smallest cost value in a first stage. For example, if the motion candidate corresponding to the smallest cost value in the first stage is a motion candidate positioned at the upper left, the decoder may evaluate a motion candidate adjacent to the motion candidate positioned at the upper left in the next repetition stage.

The searching process described with reference to FIG. 13 may proceed differently according to whether the current block is a coding unit (block) or a subblock (sub-coding block).

If the current block is a coding block and an AMVP mode is applied to the current block, an L0 motion candidate list for L0 prediction of the current block and an L1 motion candidate list for L1 prediction may be derived. A searching process is performed for some or all motion candidates of the derived candidate lists so that corrected motion information may be derived. If the current block is a coding block and a merge mode is applied to the current block, one motion candidate list for L0 and L1 prediction of the current block may be derived. A searching process may be performed for some or all motion candidates in the derived one candidate list. L0 described in the present specification may indicate L0 prediction, and L1 may denote L1 prediction.

L0 uni-directional prediction or L1 uni-directional prediction or bi-directional prediction may be applied to a current block. Which prediction, among L0 uni-directional prediction and L1 uni-directional prediction or bi-directional prediction, to be applied to a current block may be indicated by reference direction indication information. The reference direction indication information may be reconfigured on the basis of a cost value. For example, motion information and reference direction indication information may be reconfigured for a current block, the motion information and reference direction indication information corresponding to the smallest cost value among a cost value of a prediction block generated using initial motion information of L0, a cost value of a prediction block generated using initial motion information of L1, a cost value of a prediction block generated by weighted-averaging two prediction blocks through bi-directional prediction using initial motion information of L0 and L1, a cost value of a prediction block generated using corrected motion information of L0, a cost value of a prediction block generated using corrected motion information of L1, and a cost value of a prediction block generated by weighted-averaging two prediction blocks through bi-directional prediction using corrected motions of L0 and L1.

L0 and L1 motion information candidate lists in an AMVP mode may be independently derived. Scaled L0 motion information may be included in an L1 motion information candidate list. If reference pictures of L0 and L1 motion information are different and have different directions with respect to a picture to be currently encoded, there may be linearity between the L0 and L1 motion information. L1 motion information may be predicted through the distance between L0 motion information and a reference picture. L1 motion information (scaled L0 motion information) predicted through L0 motion information may be included in an L1 motion candidate list.

A search process using TM may be independently applied to L0 and L1 motion candidates. A corrected motion information candidate found by L0 in a search process using TM may be used to correct L1 motion information candidates. For example, L1 motion information may be predicted based on the distance between a reference picture and a corrected motion candidate found by L0, and the predicted L1 motion information may be included in an L1 motion candidate list.

A current coding block may be partitioned into multiple subblocks. Initial motion information of each subblock may be reconfigured to be corrected motion information according to a searching process. A template may differ for each subblock, and a pixel of an adjacent subblock may be used as a template. However, the decoder is able to search for a next subblock only when an adjacent subblock is reconstructed, and thus there is a problem in that a searching process is not performed in parallel for subblocks. To solve this problem, a searching process may be performed only for a subblock positioned at the boundary of a current block. Alternatively, the decoder may derive corrected motion information of a subblock positioned at the boundary of a current block by using a TM method, and derive corrected motion information of a subblock not positioned at the boundary of a current block by using one or more of BM, optical flow-based TM, and multi-pass DMVR methods.

If the current block is processed as a coding block, the decoder may calculate a cost value for the entirety of the current block by using initial motion information for L0 and L1, and derive corrected motion information on the basis of the calculated cost value. A motion of a lower-right partial area in the block processed as a coding block may be slightly different from the motion of the entirety of the coding block. A searching process may vary according to how a template is configured, and corrected motion information may also vary. Therefore, even when the current block is processed as a coding block, corrected motion information may be derived in a unit of a subblock on the basis of a cost value of a template configured on the basis of subblocks.

Figure 14:
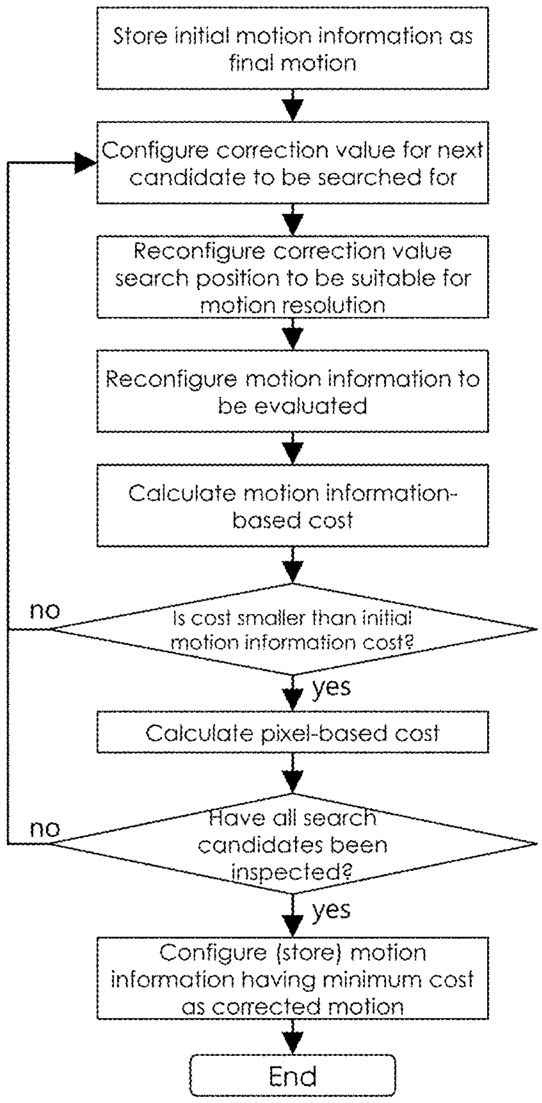
FIG. 14 is a diagram illustrating a process of evaluating a search candidate according to an embodiment of the present invention.

FIG. 14 is a diagram illustrating a process of evaluating a search candidate according to an embodiment of the present invention.

Specifically, FIG. 14 is a flowchart showing a process of evaluating a search candidate by using correction values for a candidate position selected according to a search pattern and a search gap described with reference to FIG. 13. A decoder may store initial motion information as final motion information. Then, the decoder may perform a process described below for correction values of all search candidates.

The decoder may select one from among correction values for a candidate position to be searched for. The correction value may be reconfigured to be suitable for a motion resolution to be used in a current block. The decoder may reconfigure motion information to be evaluated, by adding the reconfigured correction value to the initial motion information. The decoder may obtain a cost value on the basis of the reconfigured motion information. A cost value obtained on the basis of motion information may be calculated by adding a difference value between the absolute values of horizontal components between the initial motion information and the reconfigured motion information and a difference value between the absolute values of vertical components, and then multiplying a value obtained by the adding by a random weight value. The random weight value may be "4". The decoder may calculate a pixel-based cost value of the reconfigured motion information only when the cost value obtained on the basis of the motion information is smaller than a cost value of the initial motion information obtained on the basis of pixels.

The decoder may evaluate correction values for all search candidates, and then configure motion information corresponding to the smallest cost value as final motion information.

In a template-based motion correction method such as TM, motion correction performance may vary according to how much the motion of a template is similar to the motion of a current block. In other words, the motion characteristics of a template and a current block may be different, and the motion correction performance of a motion corrected using the template having the different characteristic may be efficient under the template but inefficient for the current block. In order to solve this problem, a pixel-based cost value for initial motion information may be recalculated and used for comparison with search candidates. This can increase an importance level for the initial motion information. That is, a pixel-based cost value for initial motion information may be recalculated using at least one of the size of a current block and a quantization parameter of the current block. For example, a pixel-based cost value for initial motion information may be reconfigured through calculation of subtracting a value obtained by multiplying the size of a current block by a random weight. Comparison between search candidates may be performed based on the reconfigured cost value. The random weight may be an integer equal to or greater than 1.

A cost value obtained on the basis of motion information may vary according to the size of a correction value. That is, the smaller the correction value, the smaller the cost value. Motion information corresponding to the smallest cost value is configured as final motion information, and thus evaluation may be performed only for a neighboring motion candidate having a small correction value and being located at a position indicated by initial motion information. However, a motion candidate having a large correction value may be an optimal motion candidate. Therefore, in order to evaluate various motion candidates to select an optimal motion candidate, a cost value may be obtained using a method described below. A cost value may be obtained using the difference between motion information values of neighboring blocks, a quantization parameter, and the size of a current block.

Whether to apply a pixel-based cost value may be obtained using the distribution of motion information of neighboring blocks. For evaluation for various motion candidates, the decoder may obtain whether to apply a pixel-based cost value, by using a difference value between corrected motion information and motion information of a neighboring block. For example, the decoder may compare, with a predetermined random value, a difference value between corrected motion information and motion information of a neighboring block, and determine whether to apply a pixel-based cost value according to a result of the comparison. Specifically, if a difference value between corrected motion information and motion information of a neighboring block is greater than (or smaller than, or equal to) a predetermined random value, the decoder may obtain a pixel-based cost value. The neighboring block may be a neighboring block adjacent to a current block or a temporal neighboring block at a position identical to (or corresponding to) that of the current block in a collocated picture.

A cost value may be obtained on the basis of the size of a current block. For example, the weight for obtaining the cost value described above may be configured according to the size of the current block. The weight may be configured to be in inverse proportion to the size of the current block. That is, the larger the size of the current block, the lower the weight may be configured. This configuration allows evaluation of a motion candidate in a wider range for selection of a suitable motion candidate. The weight may be configured to be in proportion to the size of the current block. That is, the larger the size of the current block, the higher the weight may be configured. This may lower complexity. For example, the size of the current block may be 16×16 or 32×32 and may be configured to be the sum of the transverse and longitudinal sizes of the current block. The weight may be an integer value such as 1, 2, 3, 4, 5, 6, etc. In addition, the greater the weight, the higher the cost value, and thus if the weight is equal to or greater than a particular value, the decoder may not perform evaluation for acquisition of a cost value.

Hereinafter, a method of correcting motion information by using DMVR is described.

Figure 15:
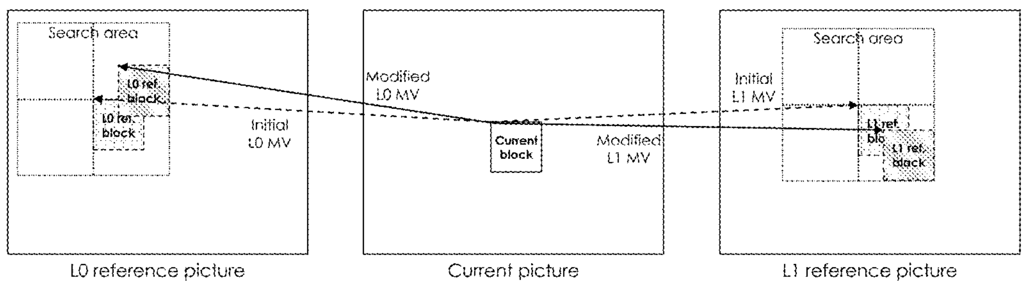
FIG. 15 and FIG. 16 are diagrams illustrating a method of correcting motion information by using DMVR according to an embodiment of the present invention.
Figure 16:
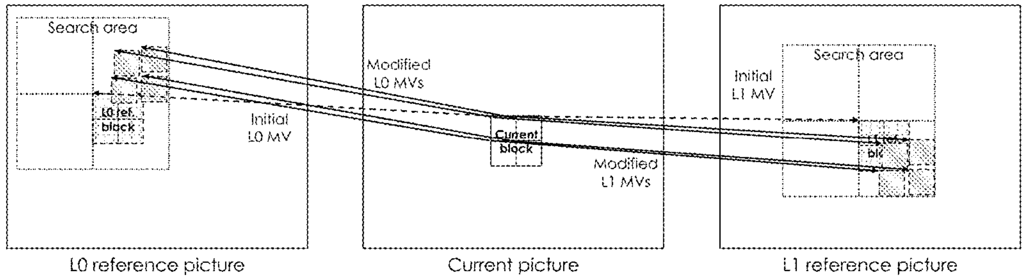

FIG. 15 and FIG. 16 are diagrams illustrating a method of correcting motion information by using DMVR according to an embodiment of the present invention.

DMVR is a method of obtaining corrected motion information for a current block by using a bilateral matching (BM) method. The bilateral matching (BM) method is a method of searching for the most similar part between a neighboring search area of an L0 reference block and a neighboring search area of an L1 reference block with respect to a block having bi-directional motion, to correct initial motion information, and using the corrected motion information for prediction of a current block. The size of a search area may be configured to be a random (m×n) size on the basis of a particular point of a reference block. For example, the particular point may be the upper-left position of the reference block, or the center position of the reference block, and the random size may be 16×16. The most similar part may be a point corresponding to the smallest cost value when cost values are calculated in a pixel unit between blocks. The cost value may be calculated using a sum of absolute differences (SAD) or mean-removed SAD (MR-SAD) method. Information on which method is used for calculation of a cost value may be included in at least one of an SPS of a bitstream, a PPS, a picture header, and a slice header. A decoder may calculate a cost value on the basis of a method configured by parsing corresponding information. The cost value may vary according to a search area, and corrected motion information may also vary. The decoder may partition a current block into multiple subblocks, and correct motion information for each subblock by using DMVR. This is because motion information for smaller blocks is more precise compared to large blocks. In this case, DMVR is not performed in a large block, and may be performed only in a small partitioned block (e.g., subblock). Referring to FIG. 16, one block may be partitioned into multiple (e.g., 4) subblocks. A decoder may obtain corrected motion information by using DMVR for each partitioned subblock. Alternatively, the decoder may use a multi-DMVR method of using corrected motion information found through DMVR in a large block, to derive more precise motion information through DMVR in a small partitioned block.

Hereinafter, the multi-DMVR method is described.

Figure 17:
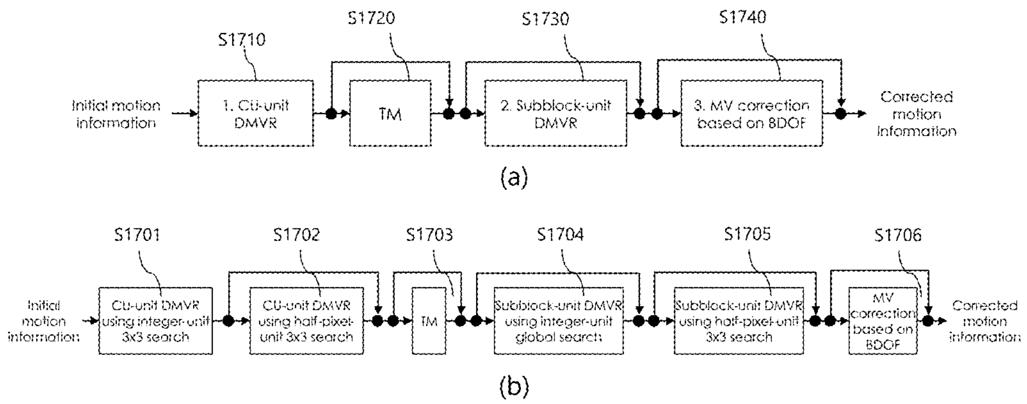
FIG. 17 is diagrams illustrating a process in which multi-DMVR is performed according to an embodiment of the present invention.

FIGS. 17A and 17B are diagrams illustrating a process in which multi-DMVR is performed according to an embodiment of the present invention.

FIG. 17A shows a general process in which multi-DMVR is performed, and FIG. 17B shows a general process of multi-DMVR in more detail.

Referring to FIG. 17A, in multi-DMVR, DMVR in a unit of a coding unit (block) may be performed on the basis of initial motion information to obtain one or more pieces of corrected motion information (operation S1710). If TM is applied to a current coding block, a decoder may perform TM by using the one or more pieces of corrected motion information obtained in operation S1710 (operation S1720). If corrected motion information of the current coding block determined by TM is changed from being bi-directional to being uni-directional, a DMVR process is unperformable, and thus operations (operations S1730 and S1740) after operation S1720 are not performed, and the motion of the current block is finally determined to be uni-directional. If a result of TM indicates that corrected motion information of the current coding block is bi-directional, the decoder may perform DMVR in a unit of a subblock to obtain corrected motion information in a unit of a subblock with respect to each subblock (operation S1730). Then, the decoder may correct again the obtained corrected motion information in the unit of the subblock on the basis of BDOF in operation S1740, and finally obtain motion information having been corrected on the basis of BDOF.

Referring to FIG. 17B, operation S1710 of FIG. 17A may be subdivided into operation S1701 of performing DMVR in a unit of a coding unit (block) by using search in an integer unit, and operation S1702 of performing DMVR in a unit of a coding unit (block) by using search in a half-pixel unit. In operation S1710, a decoder may use a 3×3 square search to calculate corrected motion information and a pixel-based cost value of a current coding unit (block). A motion resolution may be configured in an integer unit in operation S1701 and in a half (½)-pixel unit in operation S1702. In operation S1701, the decoder may obtain corrected motion information by using initial motion information and an integer-unit correction value.

Hereinafter, operation S1730 of FIG. 17A is described in detail.

In operation S1730, the decoder may partition the current coding block into several subblocks and then perform operations S1704 and S1705 of FIG. 17B for each subblock. The size of the subblock may be a maximum of 16×16.

The decoder may configure corrected motion information obtained in operation S1720, as initial motion information for operations S1704 and S1705. The decoder may perform a global search in an integer unit by using the initial motion information, and obtain optimal motion information of a current subblock and a cost value of the optimal motion information (operation S1704). After operation S1704, the decoder may perform a 3×3 square search in a half (½)-pixel unit. Motion information obtained through operation S1704 may be used as reference motion information of operation S1705. That is, a new motion candidate is obtained on the basis of the information obtained through operation S1704, and the decoder may evaluate the new motion candidate (operation S1705). The decoder may evaluate the new motion candidate, and store final motion information for the current subblock. Operations S1704 and S1705 may be repeated for all subblocks. A DMVR process in a unit of a subblock has no dependency between subblocks, and thus is advantageous in that DMVR is possible for all subblocks in parallel.

An encoder may generate a bitstream including information indicating whether template matching (TM) of operations S1720 and S1703 is performed (applied). The decoder may parse the information indicating whether template matching is applied, to configure whether template matching is applied to a current block.

Whether template matching is applied may be determined in a unit of a current block or CU. For example, if template matching is applied to a current block and motion information of the current block is a bidirectional motion, template matching may be performed for each of L0 motion information and L1 motion information. Otherwise, template matching may not be performed for both of the L0 motion information and L1 motion information.

Whether template matching is applied may be determined for each direction of motion information of the current block. For example, if template matching has been applied to an L0 motion direction of the current block and has not been applied to an L1 motion direction, template matching may be applied to L0 motion information of the current block and may not be applied to L1 motion information. Alternatively, the encoder and the decoder may implicitly apply template matching to only the L0 motion direction of the current block, and L1 motion information may be corrected based on the distance between corrected L0 motion information and a reference picture in the L1 motion direction. In addition, a context model for signaling whether a template is applied for the L1 motion direction may be determined based on at least one of the size of the current block, the ratio between the transverse and longitudinal sizes of the current block, the size of a differential value of motion information, and whether a template is applied for the L0 motion direction.

A video signal processing device may reconfigure a motion information candidate list on the basis of a cost value for motion information candidates in the motion information candidate list and information relating to whether TM is applied to a motion information candidate. The motion information candidate list may include a motion information candidate, having the smallest cost value, to which TM has been applied, and a motion information candidate, having the smallest cost value, to which TM has not been applied. In an order in the motion information candidate list, the motion information candidate to which TM has been applied may be positioned first, and the motion information candidate to which TM has not been applied may be positioned second. Alternatively, the reverse order may also be possible. That is, a motion candidate list may be configured based on whether TM is applied. Information on whether TM is applied and information on an optimal motion information candidate may be integrated, and index information relating to which motion information candidate has been used in an integrated motion information candidate list and whether TM has been applied may be included in a bitstream. The decoder may parse the index information to determine a motion information candidate for the current block.

Figure 18:
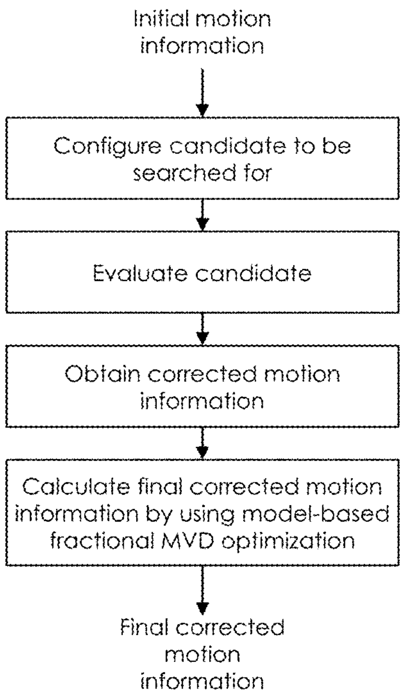
FIG. 18 is a diagram illustrating a search method for obtaining a cost value related to corrected motion information of a coding block according to an embodiment of the present invention.

FIG. 18 is a diagram illustrating a search method for obtaining a cost value related to corrected motion information of a coding block according to an embodiment of the present invention.

Referring to FIG. 18, a decoder may obtain initial motion information and configure motion candidates to be searched for on the basis of the obtained initial motion information. Then, the decoder may obtain corrected motion information on the basis of a cost value obtained by evaluating the configured motion candidates. Thereafter, the decoder may obtain final corrected motion information by using model-based fractional MVD optimization according to the motion information resolution of a current block. Corrected motion information obtained in operations S1701, S1702, S1704, S1705, and S1706 of FIG. 17B may be obtained through the methods described through FIG. 18 and FIG. 19.

Figure 19:
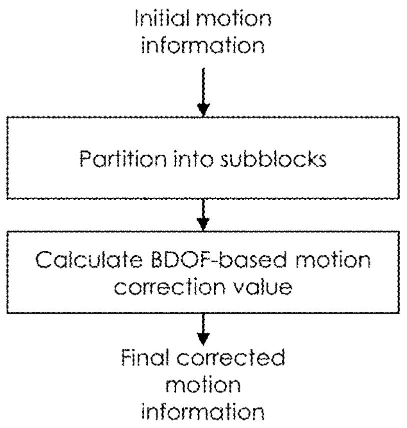
FIG. 19 is a diagram illustrating a method of correcting motion information, based on BDOF according to an embodiment of the present invention.

FIG. 19 is a diagram illustrating a method of correcting motion information, based on BDOF according to an embodiment of the present invention.

Correction of motion information based on BDOF illustrated in FIG. 19 specifically represents correction of motion information based on BDOF in operations S1740 and S1706 of FIGS. 17A and 17B.

Referring to FIG. 19, a decoder may partition a current block into subblocks, and then calculate a correction value of motion information based on BDOF on the basis of motion information having been corrected in a previous stage to obtain final corrected motion information. BDOF may be used to estimate the variance of a pixel from a reference block of a block configured by bi-directional motion to correct a prediction block. Motion information derived in BDOF may be used to correct the motion of the current block. If the current block has been encoded in at least one mode among affine, LIC, OBMC, sub-block MC, CIIP, SMVD, BCW with different weight, and MMVD, motion correction based on BDOF may not be performed. Motion correction based on BDOF may be performed when at least one of the following conditions is satisfied. A condition for performing motion correction based on BDOF may correspond to, with respect to the current block, i) a case where a motion of a merge mode is bi-directional, ii) a case where the distances between a current picture and reference pictures are the same, iii) a case where the current block is a block to which weight prediction between reference blocks has not been applied, iv) a case where the size of the current block is equal to or greater than a predetermined random size, and v) OBMC has been applied to the current block. The predetermined random size may be the width and height of the block. For example, the transverse size of the block may be "8" and the longitudinal size thereof may be "8". In addition, the motion correction based on BDOF may be performed in a unit of a subblock, and the size of the subblock may be a maximum of 16×16.

When the methods of FIG. 17A to FIG. 19 are applied, the prediction efficiency of motion information for the current block can be increased, and the amount of bits for a motion differential value signaled from a bitstream can be reduced. As the prediction efficiency of motion information increases, the motion information may have (0,0) as a differential value in many cases. In this case, an encoder may select a merge mode as a final encoding mode for the current block. In the merge mode, one motion candidate list is used and thus L0 and L1 are grouped, but in the AMVP mode, L0 and L1 motion candidate lists are independently processed and thus the TM performance of AMVP may be more effective. That is, the encoder may select the AMVP mode in which the differential value of motion information is (0,0). The differential value of motion information may be additionally transmitted or not be transmitted. Information on whether the differential value is additionally transmitted may be included in a bitstream and then be signaled. That is, information indicating whether a differential value for motion information is transmitted, and information on the differential value for the motion information may be included in a bitstream and then be signaled. A decoder may parse information indicating whether a differential value for motion information is transmitted to identify whether there is a differential value for the current block. When a result of parsing information indicating whether a differential value for motion information is transmitted indicates that there is a differential value for the current block, the decoder may calculate the motion of the current block by adding a motion prediction value of the current block and the differential value obtained by parsing information on the differential value for the motion information. When a result of parsing information indicating whether a differential value for motion information is transmitted indicates that there is no differential value for the current block, the decoder may not parse information on the differential value for the motion information. The differential value may be inferred to be (0,0). That is, the motion of the current block may be calculated without a differential value or may be calculated using a differential value of (0,0).

If the differential value of motion information is small and an AMVP mode of (0,0) occurs many times, differential values for motion information in horizontal and vertical directions are not separately signaled and may be integrated in one piece of information and be signaled. The differential value (0,0) in the horizontal and vertical directions may be signaled through one piece of flag information. In other words, when the encoder encodes a differential value of motion information, the encoder may use both a method of separating horizontal and vertical directions and signaling same through respective codewords, and a method of integrating horizontal and vertical directions into one codeword and signaling same. For example, if the differential value of actual motion information is equal to or smaller than a predetermined random differential value, respective differential values of the actual motion information in the horizontal and vertical directions may be integrated into one codeword and be signaled. If the differential value of actual motion information is greater than the predetermined random differential value, respective differential values of the actual motion information in the horizontal and vertical directions may be separated from each other and be signaled through respective codewords. The predetermined random differential value may be an integer.

FIG. 20 is a diagram illustrating a method of signaling a motion information differential value according to an embodiment of the present invention.

Referring to FIG. 20, a decoder may parse mvd_zero_flag that is a syntax element representing whether a motion information differential value is (0,0). If a value of mvd_zero_flag is 1, a motion information differential value of the current block is configured to be (0,0) and a subsequent parsing process may be omitted. If a value of mvd_zero_flag is 0, this may indicate that a motion information differential value of the current block is not (0,0). The meaning of a motion information differential value of (0,0) may imply that there is no motion information differential value for the current block. That is, mvd_zero_flag may be a syntax element representing whether there is a motion differential value of the current block. If a value of mvd_zero_flag is 0, the decoder may parse abs_mvd_greater0_flag[compIdx] that is a syntax element representing the sizes of a horizontal vector and a vertical vector of MVD of a block. compIdx is an index of each component and may have a value of 0 or 1. If a value of compIdx is 0, this may indicate an x component (i.e., horizontal direction), and if a value of compIdx is 1, this may indicate an y component (i.e., vertical direction). If a value of abs_mvd_greater0_flag[0] is 0, this may indicate that a motion of a horizontal direction is 0, and if the motion of the horizontal direction is 0, a motion of a vertical direction is required to be equal to or greater than 1. Therefore, if a value of abs_mvd_greater0_flag[0] is 0, a value of abs_mvd_greater0_flag[1] may not be parsed and may be inferred to be 1. If a value of abs_mvd_greater0_flag [0] is 1, a motion of a vertical direction may be 0 or 1. Therefore, if a value of abs_mvd_greater0_flag[0] is 1, the decoder may parse abs_mvd_greater0_flag[1]. If mvd_zero_flag is not parsed, a value of mvd_zero_flag may be inferred to be 0. A syntax element indicating whether a parsing process is performed illustrated in FIG. 20 may be included in at least one of an SPS, a PPS, and a picture header, a syntax element signaled in an SPS may be sps_mvd_zero_enabled_flag, a syntax element signaled in a PPS is pps_mvd_zero_enabled_flag, and a syntax element signaled in a picture header may be referred to as ph_mvd_zero_enabled_flag. sps_mvd_zero_enabled_flag, pps_mvd_zero_enabled_flag, and ph_mvd_zero_enabled_flag may be syntax elements representing whether to parse a value of mvd_zero_flag. If a value of mvd_zero_flag is configured not to be parsed by at least one of sps_mvd_zero_enabled_flag, pps_mvd_zero_enabled_flag, and ph_mvd_zero_enabled_flag, the value of mvd_zero_flag may be configured to be the same as a value of a syntax signaled in an SPS, a PPS, and a picture header.

When a motion differential value is coded through an MMVD method in a merge mode, the motion differential value may be coded through the MMVD method in the merge mode by using an index of a table configured by pre-defined distances and information on one direction among horizontal and vertical directions. When TM is used, the distribution of motion differential values may be further concentrated on 0. Therefore, a table may be configured by integrating distance information and direction information. Distance information and direction information may be signaled based on one index of an integrated one table. In other words, when a differential value of motion information is encoded, a method of separating distance information and direction information and signaling same through respective indexes, and a method of signaling distance information and direction information through only one index may be both used. For example, if a motion differential value is equal to or smaller than a predetermined random value, distance information and direction information may be signaled through only one index and if a motion differential value is greater than the predetermined random value, distance information and direction information may be separated from each other and be signaled through respective indexes. The predetermined random value may be an integer such as 1, 2, 3, 4, . . . .

In general, an AMVP mode may be effective in a part in which a new motion occurs, such as an object boundary. The merge mode has a characteristic of making motion information of the current block be all the same as a neighboring block, and thus may be effective in a part in which motion is similar, such as a background and the inside of an object. A motion correction method using TM may be used to correct a motion candidate in a stage of configuring a motion candidate list of the AMVP mode, due to the accuracy of a template. A motion correction method using DMVR is a method based on bilateral matching (BM). Therefore, in a DMVR method, L0 and L1 reference blocks similar to the current block may be used to correct motion information of the current block. Therefore, the DMVR method may be used to more precisely correct motion information of the current block in a motion compensation stage.

The DMVR method may be used to even a block encoded in the AMVP mode as well as the merge mode. Whether the DMVR method is applied may be determined based on at least one of the size of the current block, the size of a motion differential value, AMVR information (resolution information of motion information), and the amount of an error signal of the current block. For example, if the current block has been encoded in the AMVP mode and AMVR of the current block is not a 1/4 or 1/16-pixel unit, a DMVR method or an MP-DMVR method may be applied in a motion compensation stage.

If the current block is encoded in the AMVP mode, a TM method may be implicitly performed. The TM method has performance varying according to the accuracy of a template and thus whether to apply the TM method may be selectively determined. Whether to apply the TM method may be determined based on at least one of the size of the current block, AMVR information of the current block, a motion information candidate list of the current block, a quantization parameter of the current block, and the amount of an error signal of the current block. For example, if AMVR information of the current block is not a 1/4 or 1/16-pixel unit (or the information is the ¼ or 1/16-pixel unit), the TM method may be implicitly applied. Alternatively, if AMVR information of the current block is not a ¼ or 1/16-pixel unit (or the information is the ¼ or 1/16-pixel unit), information indicating whether TM is applied may be included in a bitstream and then be signaled.

The DMVR method may be applied when an encoding mode of the current block is the merge mode, and OBMC may be performed in a motion compensation method. Whether OBMC is performed may be determined based on information on whether the encoding mode of the current block is the AMVP mode or the merge mode, and information on whether additional motion information in an MHP mode has been encoded in the AMVP mode or the merge mode. If the current block has been encoded in the merge mode and motion information of the AMVP mode may be additionally used through an MHP, OBMC may not be performed.

If the MHP method is used for the current block and additional motion information is in the AMVP mode, AMVR for the additional motion information may be implicitly configured according to information on whether the encoding mode of the current block is the AMVP mode or the merge mode. If the encoding mode of the current block is the AMVP mode, AMVR for additional motion information may be implicitly configured to be the AMVR mode of the current block.

If the encoding mode of the current block is the AMVP mode, AMVR for additional motion information may be implicitly configured to be a ¼-pixel unit so as to provide more precise motion information. If the encoding mode of the current block is the merge mode, AMVR for additional motion information may be implicitly configured to be a ¼-pixel unit.

If the MHP method is used for the current block and additional motion information is in the AMVP mode, the TM method may not be performed to reduce complexity. On the contrary, if the MHP method is used for the current block and additional motion information is in the AMVP mode, the TM method may be performed to improve performance.

The meaning of being implicitly configured in the present specification may imply that an encoder does not generate a bitstream including corresponding information and a decoder does not parse corresponding information and configures a predetermined value.

In order to find an optimal candidate among multiple candidates, a template-based algorithm may be used. Here, a candidate may indicate an encoding mode of the current block, a motion information candidate of the current block, a sign of a motion differential value of the current block, and a sign value of a differential signal. For a template-based algorithm, a template may be used to calculate cost value of all candidates, and a candidate corresponding to the minimum cost value may be selected or all the candidates may be rearranged based on the cost values. An optimal candidate may be selected based on a cost value, and thus encoding efficiency may vary according to how much a template reflects a characteristic of the current block. That is, encoding efficiency varies according to a method of configuring a template, and thus a method of configuring an optimal template may also be important. Therefore, various templates are used for each candidate so that an optimal template and an optimal candidate may be determined based on a cost value. Varying the sizes of templates and differentiating positions configuring templates may configure various types of templates. For example, a template may be configured in three types. Specifically, a template may be configured by only blocks adjacent to a left side of the current block, by only blocks adjacent to an upper side of the current block, or by including all blocks adjacent to the left side of the current block and blocks adjacent to the upper side. Information representing the type of a template may be included in a bitstream and then be signaled. That is, a decoder may parse information representing the type of a template and configure the template.

A video signal processing device may calculate cost values by using various types of templates for each motion information candidate, and may perform a TM method, based on a template and a motion candidate corresponding to the minimum cost value. Hereinafter, a TM method performed when a motion information candidate list is configured will be described.

A video signal processing device may configure a motion candidate list for the current block. The video signal processing device may configure three type of templates as described above. The video signal processing device may calculate a cost value for each motion information candidate in the motion information candidate list, based on each of the three types of templates. The device may rearrange the motion information candidates, based on the calculated cost value. For example, the video signal processing device may rearrange the motion information candidates in an order from the smallest cost value to the largest or rearrange the motion information candidates in an order from the largest cost value to the smallest. The video signal processing device may determine a template type corresponding to a motion information candidate having the smallest cost value among the motion information candidates, and perform TM. Motion information corrected by performing TM may be selected as a final motion information candidate.

Only one template among the three types of templates may be used based on at least one of the size of the current block, the size of a motion differential value, AMVR information, the amount of an error signal of the current block, a change degree of a neighboring block pixel adjacent to the current block, whether an OBMC or MHP mode is applied to the current block, and whether a left or upper boundary of the current block is adjacent to a picture/slice/tile boundary. This is for complexity reduction. For example, when the change degree of a pixel of a neighboring block adjacent to the current block is smooth, only a template configured by only blocks adjacent to the left side of the current block may be used. For example, when the upper boundary of the current block is adjacent to a picture boundary, only a template configured by only blocks adjacent to the left side of the current block may be used. Information on which type of template is used may not be included in a bitstream and not be signaled. When the upper boundary of the current block is adjacent to a picture boundary, the decoder may infer a template type to be a pre-designated type (i.e., a template configured by only blocks adjacent to the left side of the current block). That is, a template type may be implicitly inferred without explicit signaling.

If AMVR is performed for the current block, the motion resolution of the current block may be changed to be suitable for AMVR information. For example, if AMVR information is information that configures a motion resolution in a 1-pixel unit, values in ½ and ¼-pixel units more precise than a 1-integer pixel unit in motion information of the current block are rounded up (or rounded off or down) to the 1-integer pixel unit, and only motion information in the 1-integer pixel unit remains. Optimal motion information for the current block may not be explicitly signaled and may be predicted and encoded. That is, a differential value between a motion prediction value (motion information candidate) derived from a neighboring block of the current block and optimal motion information for the current block may be included in a bitstream and then be signaled. When AMVR is performed for the current block, optimal motion information for the current block is expressed by an AMVR resolution, and thus a motion prediction value derived from a neighboring block is also required to be changed to be suitable for the AMVR resolution. Optimal motion information and a motion prediction value for the current block are expressed by the same AMVR resolution, and thus a motion differential value may also be expressed by the same AMVR resolution as that of the current block.

When a motion information candidate list for the current block to which AMVR is applied is configured, all motion information candidates in the motion information candidate list may be changed to be suitable for an AMVR resolution. When a TM method using a motion candidate list having been changed to be suitable for an AMVR resolution is performed, at least one of a search range, a search gap, a search pattern, a repetition count, and the size of a template may be changed according to the AMVR resolution. For example, if an AMVR resolution is a 1-integer pixel unit, a video signal processing device may perform TM that searches for a motion information candidate only on a position corresponding to a unit equal to or greater than the 1-integer pixel unit. The video signal processing device may not search for a motion information candidate for ½, ¼, and 1/16-pixel units. Meanwhile, the video signal processing device may perform TM for all positions of motion candidates to be searched for regardless of AMVR resolution. That is, although an AMVR resolution is a 1-integer pixel unit, the video signal processing device may perform a search for TM even for ½ and ¼-pixel units, etc. as well as the 1-integer pixel unit. In addition, TM may be performed regardless of AMVR resolution, and thus a final corrected motion information candidate may be rounded up, rounded off (rounded), or down. That is, whether rounding off is applied may be determined according to a search condition (e.g., search gap, etc.) for TM.

When a TM method is performed, the position of a motion information candidate for an initial search may be derived from a motion information candidate list of the current block. An AMVR resolution of the motion information candidate may be ¼ or 1/16 according to an encoding mode of the current block. If the encoding mode of the current block is an affine mode, the AMVR resolution may be a 1/16-pixel unit. If the encoding mode of the current block is not the affine mode, the AMVR resolution may be a ¼-pixel unit. When TM having an AMVR resolution of a 1-integer pixel unit is performed, an AMVR resolution of a motion information candidate in a motion information candidate list may be a ¼ or 1/16-pixel unit. The ¼ or 1/16-pixel unit may be rounded up, off, or down to the 1-integer pixel unit and the video signal processing device may perform the TM. The TM is performed in the 1-integer pixel unit, and a result of performing the TM may also be the 1-integer pixel unit.

The more precise the motion resolution, a block, the motion of which has been compensated, may have a higher image quality. That is, a block, the motion of which has been compensated in a ¼-pixel unit, has an image quality higher than that of a 1-integer pixel unit. This is because, as an interpolation effect used for calculating a sample of a ¼ pixel from an integer pixel, a value obtained by referring to and weighted-averaging multiple integer pixels around a ¼ pixel is used to obtain the ¼ pixel. When the video signal processing device performs TM having an AMVR resolution of a 1-integer pixel unit, a motion candidate having a ¼ or 1/16 motion resolution before being rounded may be used so as to increase the performance of motion correction. A motion resolution of an initial motion information candidate before TM is performed may be ¼ or 1/16. The position of a motion information candidate to be searched for may be a position after movement by a 1-integer pixel from the position of the initial motion information candidate. For example, if the position of an initial motion information candidate having a motion resolution of ¼ is (10.25, 5.75) and a cross pattern is applied, the position of a motion information candidate to be newly searched for may be (11.25, 5.75), (9.25, 5.75), (10.25, 6.75), or (10.25, 4.75). The video signal processing device may calculate a cost value for each of the four motion information candidates to be newly searched for. If a motion information candidate corresponding to the smallest cost value is (10.25, 6.75), the video signal processing device may round the same candidate to a 1-integer pixel unit to obtain a corrected motion information candidate of (10,7). Whether rounding is applied to a motion information candidate may be determined according to a unit of a block, a tile, a slice picture, and an SPS. Whether rounding is applied according to each unit may be determined by a separate syntax element, and the syntax element may be included in a bitstream and then be signaled. That is, the decoder may parse the syntax element to determine whether to apply rounding to a motion information candidate.

A motion candidate list may be configured by using at least one of motion information of a spatial or temporal neighboring block and a history-based motion information. In order to prevent overlapping motion information from being included in a motion candidate list, motion candidates to be included in the list may undergo a redundancy inspection, and only a non-overlapping motion candidate may be included in the motion candidate list. In order to reduce the complexity of the redundancy inspection, the redundancy inspection may be performed only for a motion candidate of a pre-defined neighboring block. If an AMVR resolution is a 1-integer pixel unit, motion candidates of a neighboring block may be rounded to the 1-integer pixel unit and then undergo a redundancy inspection. Performing TM according to whether rounding is applied may be applied variously as follows.

FIGS. 21A and 21B are diagrams illustrating a method of performing TM, based on a motion information candidate according to an embodiment of the present invention.

MVP in FIGS. 21A and 21B is information derived from a neighboring block of a current block and may be expressed by an MV candidate.

FIG. 21A is a diagram illustrating a method of performing TM, based on a motion information candidate to which rounding has been applied. Referring to FIG. 21A, a-1) a video signal processing device may first a-1-i) derive a motion information candidate from a neighboring block of a current block. Then, the video signal processing device may configure a motion information candidate list for the current block. a-1-ii) Thereafter, the video signal processing device may perform a rounding process for the motion information candidate to be suitable for an AMVR resolution of the current block. Rounding has been applied to the motion information candidate, and thus the number of the same motion information candidates may be increased. a-1-iii) The video signal processing device may determine the equivalence between motion information candidates and then determine whether to add the motion information candidates to the motion information list, according to whether they are identical. For example, if motion information candidates are identical, the video signal processing device may add only one candidate among the identical two motion information candidates to the list. On the other hand, if motion information candidates are not identical, the video signal processing device may add all the two candidates to the list. The video signal processing device may repeatedly perform a-1-i) to a-1-iii) for neighboring blocks of the current block. a-2) The video signal processing device may calculate TM-based cost values for motion information candidates in the motion information candidate list, and rearrange the motion information candidates, based on the calculated cost values. a-3) The video signal processing device may perform TM for a candidate corresponding to the smallest cost value in the motion information candidate list. a-4) The video signal processing device may identify whether to perform rounding for a corrected motion information candidate. Whether rounding is performed may be determined based on whether rounding has been applied to a motion information candidate input to TM, or a search gap during the TM. For example, if rounding has not been applied to a motion information candidate input to TM, a rounding process may be applied after the TM is performed. Alternatively, if rounding has not been applied to a motion information candidate input to TM and a search gap during the TM is smaller than an AMVR resolution of the current block, a rounding process may be performed after the TM is performed. a-5) The video signal processing device may obtain final motion information through the process of a-4).

FIG. 21B is a diagram illustrating a method of performing TM, based on a motion information candidate to which rounding has not been applied. Referring to FIG. 21B, b-1) a video signal processing device may configure a motion information candidate list for the current block. b-1-i) Then, the video signal processing device may configure a threshold for determining the similarity between motion information candidates in the motion information candidate list. b-1-ii) The video signal processing device may configure the threshold to be 1 when AMVR is not applied to the current block. On the contrary, if AMVR is configured to be applied to the current block, the video signal processing device may change the threshold of 1, which is configured when AMVR is not applied, to use a new threshold. That is, the video signal processing device may configure different thresholds according to AMVR resolution. For example, if the AMVR resolution is a 4-integer pixel unit, the video signal processing device may configure the threshold to be "1<<5". If the AMVR resolution is a 1-integer pixel unit, the video signal processing device may configure the threshold to be "1<<3". If the AMVR resolution is a ½-pixel unit, the video signal processing device may configure the threshold to be "1<<2". The sign "<<" is a left shift operation and "X<<Y" indicates multiplying X by 2 to the power of Y. The threshold (i.e., 1) configured when AMVR is not applied to the current block may be variously changed. For example, the threshold may be changed to an integer equal to or greater than 1. b-1-iii)) The video signal processing device may derive motion information candidates from neighboring blocks of the current block. b-1-iv) The video signal processing device may determine the similarity between the candidates, based on the motion information threshold, and then determine whether to add the motion information candidates to the motion information list, according to whether they are similar. For example, when the similarity between motion information candidates is within the threshold, the video signal processing device may determine that the motion information candidates are similar to each other and add, to the motion information candidate list, only one motion information candidate among the compared two motion candidates. On the contrary, when it is determined that the compared two motion candidates are not similar to each other (that is, the similarity is greater than the threshold), the video signal processing device may add both of the two motion candidates to the motion information candidate list. The video signal processing device may repeatedly perform b-1-iii) and b-1-iv) for the neighboring blocks of the current block. b-2) The video signal processing device may rearrange motion information candidates in the motion information candidate list, based on TM cost values of the motion information candidates. b-3) The video signal processing device may perform TM for a candidate corresponding to the smallest cost value among the candidates in the motion information candidate list. b-4) The video signal processing device may perform the TM of b-3) and then round the corrected motion information candidate.

Figure 22:
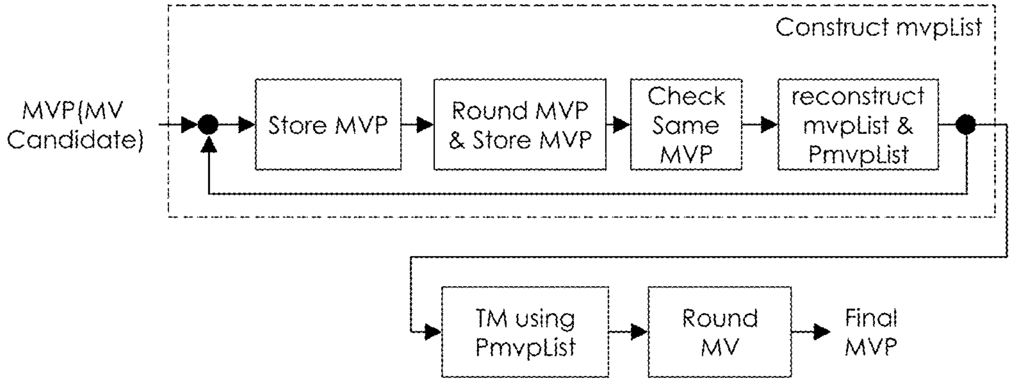
FIG. 22 is a diagram illustrating a method of performing TM, based on a motion information candidate according to an embodiment of the present invention.

FIG. 22 is a diagram illustrating a method of performing TM, based on a motion information candidate according to an embodiment of the present invention.

FIG. 22 relates to a method of storing a motion information candidate before rounding is applied, and using, for TM, the motion information candidate before rounding is applied.

Referring to FIG. 22, a video signal processing device may configure a motion information candidate list and a temporary list (a motion information candidate list to which rounding has not been applied, PmvpList) for a current block. The motion information candidate list and the temporary list may be configured by similar motion information candidates differing only in that rounding has been applied thereto. 1) The video signal processing device may derive a motion information candidate from a neighboring block of the current block. The video signal processing device may store the derived motion information candidate in a temporary list. The video signal processing device may perform rounding for the motion information candidate to be suitable for an AMVR resolution of the current block, and then store the motion information candidate in a list. The video signal processing device may determine the equivalence between motion information candidates and then reconfigure the motion information candidate list and the temporary list according to whether the motion information candidates are identical. The equivalence may be compared between a motion information candidate in the motion information candidate list and a motion information candidate in the temporary list. For example, if motion information candidates are identical, the video signal processing device may remove, from a corresponding list, one of the two motion information candidates, which are subject to equivalence comparison. If motion information candidates are not identical, the video signal processing device may maintain the motion information candidate list and the temporary list as they are. The video signal processing device may repeatedly perform the process of 1) for neighboring blocks of the current block. 2) The video signal processing device may rearrange motion information candidates (motion information candidates before being rounded) in the temporary list, based on TM cost values of the motion information candidates. 3) The video signal processing device may perform TM for a candidate corresponding to the smallest cost value among the motion information candidates in the temporary list. 4) The video signal processing device may perform the TM and then round the corrected motion information candidate. 5) The video signal processing device may select the corrected motion information candidate as a final motion information candidate.

While a merge mode is effective when the motion of a current block is similar to that of a neighboring block, an AMVP mode may be effective in a block in which a new motion occurs. Therefore, a TM method using a neighboring block in the AMVP mode may be ineffective in a particular block. Therefore, whether TM is performed may be determined based on at least one of the size of the current block, the ratio between the width and the height of the current block, encoding mode information of the current block, AMVR resolution information of the current block, the amount of an error signal, the position of a last transform coefficient in an error signal, a difference value between motion information of a spatial neighboring block and motion information of a temporal neighboring block, a TM-based cost value, and information relating to whether OBMC or MHP is applied to the current block.

A video signal processing device may determine whether to perform TM by comparing, with a predetermined random value, a difference value between motion information of a spatial neighboring block and motion information of a temporal neighboring block. For example, if a difference value between motion information of a spatial neighboring block and motion information of a temporal neighboring block is greater than a predetermined random value, the current block has a high probability of being a new motion, and thus TM may not be performed. The predetermined random value may be an integer equal to or greater than 1. Alternatively, if a difference value between motion information of a spatial neighboring block and motion information of a temporal neighboring block is greater than a predetermined random value, a TM process may be performed.

A video signal processing device may configure a motion information candidate list by using at least one of a motion information candidate to which TM has been applied and a motion information candidate to which TM has not been applied. Alternatively, the video signal processing device may configure a motion information candidate list by using at least one of a motion information candidate to which TM is to be applied and a motion information candidate to which TM is not to be applied. Index information on an optimal motion information candidate in the configured motion information candidate list may be included in a bitstream and then be signaled. A decoder may parse the index information to select an optimal motion information candidate in the motion information candidate list. Whether a motion information candidate is a motion information candidate to which TM is to be applied may be determined based at least one of a cost value, whether the motion information candidate is derived from a spatial neighboring block or a temporal neighboring block, and a different value between motion candidates. For example, TM may be applied to a candidate having the smallest cost value among motion information candidates in a motion information candidate list, and TM may not be applied to a candidate having the largest cost value. Alternatively, a motion information candidate having the smallest cost value among motion candidates in a motion information candidate list, and motion information obtained by applying TM to the motion information candidate having the smallest cost value may be included in the motion information candidate list. The motion information candidate to which TM has been applied is located first in the list and the motion information candidate to which TM has not been applied is located second in the list, and the opposite case is also possible. Alternatively, a motion information candidate to which TM has not been applied may be one of a motion information candidate having the smallest cost value and a motion information candidate derived from a temporal neighboring block. A motion information candidate list may be configured in an order of a motion information candidate to which TM has been applied, a motion information candidate having the smallest cost value, and a motion information candidate derived from a temporal neighboring block. That is, a motion information candidate list may be configured based on whether TM is applied. This causes an advantage in that whether TM is applied and an optimal motion information candidate can be integrated and then signaled. Index information on which motion information candidate in a motion information candidate list is used may be included in a bitstream and then be signaled. A decoder may parse the index information to configure a motion information candidate for the current block. Alternatively, TM is applied to a motion information candidate derived from a spatial neighboring block and TM may not be applied to a motion information candidate derived from a temporal neighboring block.

Whether TM is performed may be determined based on a template-based cost value. A motion information candidate list may be determined based on a template-based cost value and whether TM is performed. i) A video signal processing device may configure a motion information candidate list for a current block. ii) The video signal processing device may calculate template-based cost values through motion information candidates in the motion information candidate list. iii) The video signal processing device may rearrange the motion information candidates in the motion information candidate list, based on the template-based cost values calculated in ii). iv) The video signal processing device may select a candidate having the smallest cost value and a candidate having the largest cost value among the motion information candidates in the motion information candidate list. Each candidate may be selected based on a particular threshold. For example, a motion information candidate having a cost value greater than the particular threshold may be excluded, and a candidate having the smallest cost value and a candidate having the largest cost value among motion information candidates having cost values within the threshold may be selected. v) The video signal processing device may perform motion correction using TM for the candidate having the smallest cost value. vi) The video signal processing device may configure a motion information candidate list including the corrected motion information candidate and the motion information candidate having the largest cost value.

A motion information candidate list may be configured by including two or more motion information candidates including a motion information candidate, the motion of which has been corrected based on TM, and a motion information candidate for which TM has not been performed. In order to select a final motion information candidate for a current block, a random candidate in the motion information candidate list may be selected, and index information on the randomly selected candidate may be included in a bitstream and then be signaled. A decoder may parse the index information to determine a motion information candidate for the current block.

TM may be performed only for a motion information candidate having the smallest cost value in a motion information candidate list. A search range is configured based on the motion information candidate having the smallest cost value, and a corrected motion information candidate may be obtained within the search range. If a search range is fixed, efficiency is ensured in terms of complexity, but inefficiency may occur in terms of TM performance. Therefore, a method of improving TM performance through configuration, such as flexibly changing a search range or widening a search range, is required. Hereinafter, a method of changing a fixed search range is described.

A video signal processing device may reconfigure a motion information candidate list to select a motion information candidate. If a motion information candidate list is reconfigured and a motion information candidate is selected, a search range more effective than an existing fixed search range may be selected. For example, the video signal processing device may generate an additional motion information candidate by using a motion information candidate in a motion information candidate list. Then, the video signal processing device may add the additionally generated motion information candidate to the motion information candidate list. The video signal processing device may generate an additional motion information candidate by adding or subtracting a random number to or from an existing motion information candidate. The random number may be an integer equal to or greater than 1. That is, the video signal processing device may reconfigure an existing motion information candidate list to configure an expanded motion information candidate list and then select an optimal motion information candidate, based on a cost value.

Figure 23:
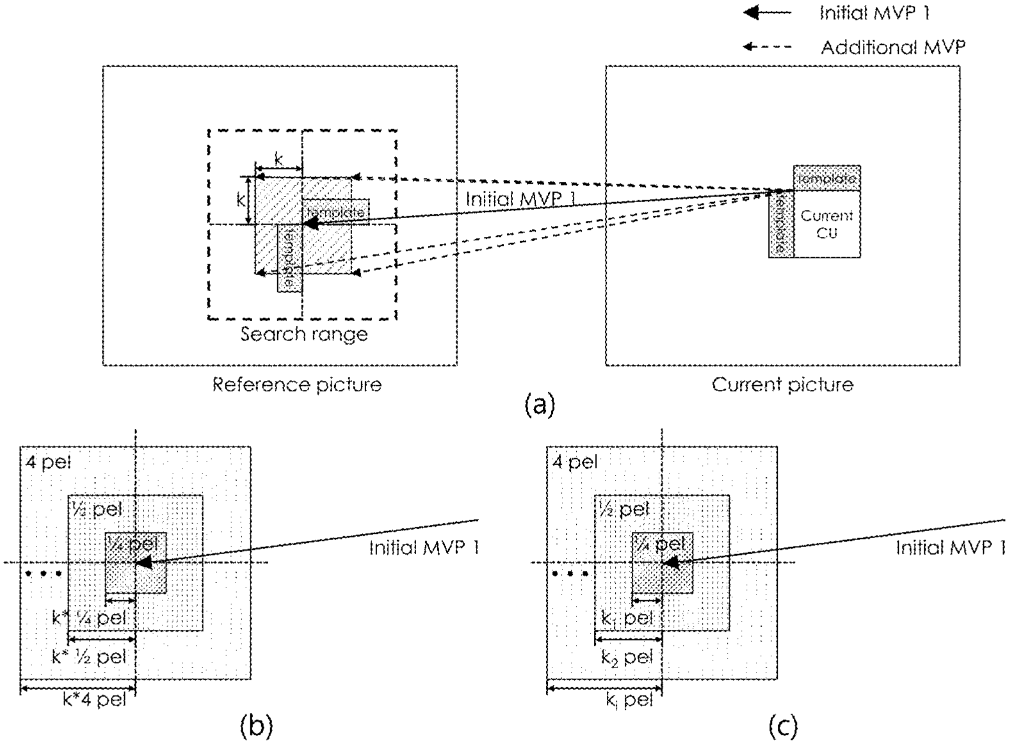
FIG. 23 is diagrams illustrating a method of generating an additional motion information candidate according to an embodiment of the present invention.

FIGS. 23A, 23B, and 23C are diagrams illustrating a method of generating an additional motion information candidate according to an embodiment of the present invention.

Referring to FIG. 23A, a video signal processing device may generate four new motion information candidates (dotted line arrows) by using one motion information candidate (a solid line arrow, initial MVP 1) in a motion information candidate list. New motion information candidates may be generated for all the motion information candidates in the motion information candidate list. Alternatively, new motion information candidates may be generated only for a motion information candidate that is determined based on at least one of the size of the current block, the ratio between the width and the height of the current block, encoding mode information of the current block, AMVR resolution information of the current block, the amount of an error signal, and the position of a last transform coefficient in an error signal. For example, if the number of the motion information candidates in the motion information candidate list is 2, the video signal processing device may select a final motion information candidate, based on cost values of a total of 10 motion candidates including newly generated motion information candidates (there are four newly generated motion information candidates per each motion information candidate). The video signal processing device may generate a new motion information candidate by adding or subtracting a predetermined random number (K) to or from horizontal and vertical components of a motion information candidate in the list in a (+, +), (+, −), (−, +), or (−, −) direction. In addition, the video signal processing device may generate a new motion information candidate by performing adding or subtracting in a direction, such as (+, 0), (−, 0), (0, +), and (0, −). The predetermined random number (K) is an integer equal to or greater than 1 and may be 4. Referring to FIG. 23B, the predetermined random number (K) may be determined based on an AMVR resolution. If the AMVR resolution of the current block is a 1/16 pixel, the predetermined random number (K) may be configured to be "K/16". If the AMVR resolution of the current block is a 1/4 pixel, the predetermined random number (K) may be configured to be "K/4". If the AMVR resolution of the current block is a 1/2 pixel, the predetermined random number (K) may be configured to be "K/2". If the AMVR resolution of the current block is a 1-integer pixel, the predetermined random number (K) may be maintained without change. If the AMVR resolution of the current block is 4-integer pixels, the predetermined random number (K) may be configured to be "K*4". The predetermined random number (K) may be referred to as an initial offset distance. Referring to FIG. 23C, the initial offset distance (K) may be determined according to the AMVR resolution of the current block. If the AMVR resolution of the current block is a 1/16 pixel, the initial offset distance may be configured to be "$K_0$". If the AMVR resolution of the current block is a 1/4 pixel, the initial offset distance may be configured to be "$K_1$". If the AMVR resolution of the current block is a 1/2 pixel, the initial offset distance may be configured to be "$K_2$". If the AMVR resolution of the current block is a 1-integer pixel, the initial offset distance may be configured to be "$K_3$". If the AMVR resolution of the current block is 4-integer pixels, the initial offset distance may be configured to be "$K_4$". In addition, the initial offset distance may be reconfigured to be an actually applied offset distance (actual offset distance) according to the AMVR resolution of the current block. If the AMVR resolution of the current block is a 1/16 pixel, the initial offset distance "$K_0$" may be reconfigured to be "$K_0$*1/16". If the AMVR resolution of the current block is a 1/4 pixel, the initial offset distance "$K_1$" may be reconfigured to be "$K_1$*1/4". If the AMVR resolution of the current block is a 1/2 pixel, the initial offset distance "$K_2$" may be reconfigured to be "$K_2$*1/2". If the AMVR resolution of the current block is a 1-integer pixel, the initial offset distance "$K_3$" may be reconfigured to be "$K_3$*1". If the AMVR resolution of the current block is 4-integer pixels, the initial offset distance "$K_4$" may be reconfigured to be "$K_4$*4". Here, "$K_0$", "$K_1$", "$K_2$", . . . , and "$K_i$" are predetermined values, may be integers equal to or greater than 1, and may have values identical to or different from each other. In addition, "$K_0$", "$K_1$", "$K_2$", . . . , and "$K_i$" may be configured based on at least one of the size of the current block, the ratio between the width and the height of the current block, encoding mode information of the current block, a quantization parameter, AMVR resolution information of the current block, the amount of an error signal, the position of a last transform coefficient in an error signal, and information relating to whether OBMC or MHP is applied to the current block. In addition, information on the initial offset distance (K) may be included in at least one of an SPS of a bitstream, a PPS, a picture/tile/slice header, a coding block (or unit), and a block and then be signaled. A decoder may parse the information on the initial offset distance (K) to configure the initial offset distance (K).

Figure 24:
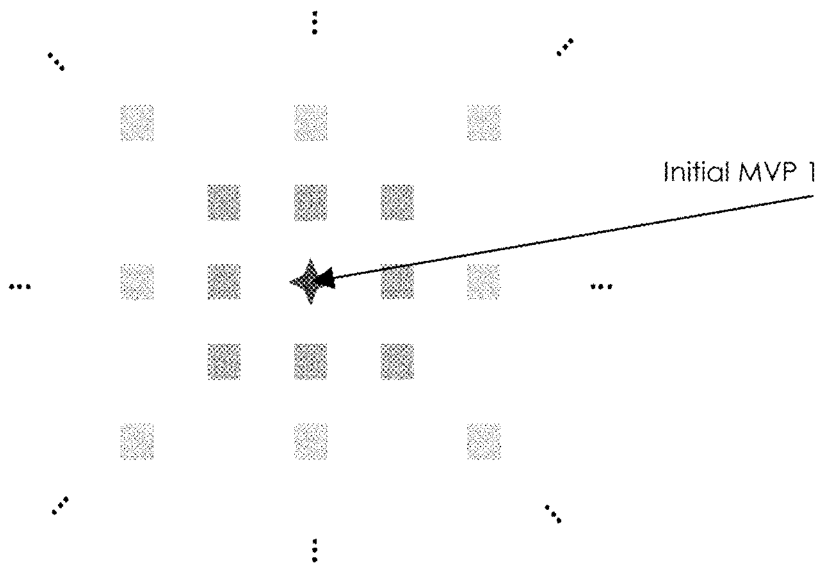
FIG. 24 and FIG. 25 are diagrams illustrating a method of generating an additional motion information candidate according to an embodiment of the present invention.
Figure 25:
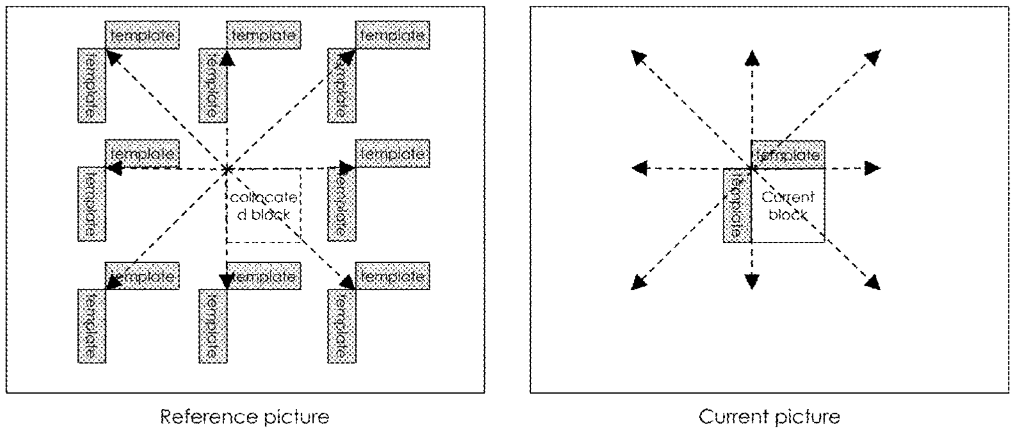

FIG. 24 and FIG. 25 are diagrams illustrating a method of generating an additional motion information candidate according to an embodiment of the present invention.

Referring to FIG. 24, in addition, a video signal processing device may, when a predetermined random number (K) is "1, 2, 3, 4, . . . , and i", generate 8 new motion candidates by adding or subtracting all Ks in a (+, +), (+, −), (−, +), (−, −), (+, 0), (−, 0), (0, +), or (0, −) direction, based on one motion information candidate (solid line MV, initial MVP 1). Referring to FIG. 25, new motion information candidates for positions spaced the predetermined random number (K) apart with respect to the position of the current block in the 8 directions ((+, +), (+, −), (−, +), (−, −), (+, 0), (−, 0), (0, +), and (0, −)), and templates based on the new motion information candidates are illustrated. In addition, in FIG. 25, a collocated block of a reference picture corresponding to the current block may be a block at a position indicated by a random motion information candidate. In addition, in FIG. 25, a collocated block of a reference picture corresponding to the current block may be a block, in the reference picture, at the same position as in the current block. In addition, in FIG. 25, a collocated block of a reference picture corresponding to the current block may be a block at a position indicated by motion information of a block (e.g., left block or above block) adjacent to the current block. The predetermined random number (K) is an integer equal to or greater than 1 and may be 4. The predetermined random number (K) may be determined based on at least one of the size of the current block, the ratio between the width and the height of the current block, encoding mode information of the current block, a quantization parameter, AMVR resolution information of the current block, the amount of transform coefficients of an error signal, the position of a last transform coefficient in an error signal, and whether OBMC or MHP is applied to the current block.

The video signal processing device may add a new motion information candidate to an existing motion information candidate list to select an optimal motion information candidate based on a TM cost value. The video signal processing device may determine, as a new motion information candidate, motion information at a position spaced a predetermined random number (K) apart from the position of the current block, and add the motion information to the motion information candidate list. Here, a method of generating a new motion candidate may be a method described through FIG. 23A to FIG. 25. As an embodiment, a predetermined random number may be differently configured according to AMVR resolution, and K configured according to the AMVR resolution may be configured identically as described with reference to FIGS. 23A, 23B, and 23C.

The video signal processing device may perform primary TM by using all motion information candidates of an initially configured motion information candidate list and then select an optimal motion information candidate based on TM cost values. The video signal processing device may perform secondary TM for the selected optimal motion information candidate to obtain the corrected motion information candidate. The video signal processing device may perform primary, secondary, tertiary, . . . , and N-th TM. Whether the N-th TM is performed may be determined based on at least one of the size of the current block, the ratio between the width and the height of the current block, encoding mode information of the current block, AMVR resolution information of the current block, the amount of an error signal, the position of a last transform coefficient in an error signal, and whether OBMC or MHP is applied to the current block.

The video signal processing device may perform primary TM by using all motion information candidates in an initially configured motion information candidate list, and the TM may be new TM having a lower complexity compared to a conventional TM method. Next, the video signal processing device may select an optimal motion information candidate, based on cost values of the motion information candidates having been corrected through the primary TM. Next, the video signal processing device may perform secondary TM for the selected optimal motion candidate to obtain the additionally corrected motion information candidate. The secondary TM (new TM) may be a method of performing only a part of a conventional TM process. In addition, the secondary TM may be conventional TM and may include the entirety of the conventional TM process. The video signal processing device may perform the secondary TM to obtain an additionally corrected motion information candidate.

The video signal processing device may perform primary TM by using all motion information candidates in an initially configured motion information candidate list, and the TM may be TM having a lower complexity compared to a conventional TM method. Next, the video signal processing device may select an optimal motion information candidate, based on cost values of the motion information candidates having been corrected through the primary TM. The video signal processing device may perform secondary TM for the selected optimal motion information candidate. The secondary TM may also be TM having a lower complexity compared to conventional TM. The video signal processing device may perform the secondary TM to obtain the additionally corrected motion information candidate. The primary TM may be a method of performing up to a particular process in a conventional TM process, and the secondary TM may be a method of performing a process after the method performed in the primary TM.

A search range may be configured based on at least one of the size of the current block, the ratio between the width and the height of the current block, encoding mode information of the current block, AMVR resolution information of the current block, the amount of an error signal, the position of a last transform coefficient in an error signal, and whether OBMC or MHP is applied to the current block. For example, if the AMVR resolution of the current block is a 1-integer pixel unit, the video signal processing device may expand an existing search range by a predetermined random number to configure or reconfigure a search range. The predetermined random number may be an integer equal to or greater than 1. The expanded search range may be a range having been expanded identically in the horizontal or vertical direction. Alternatively, a search range may be expanded only in the horizontal direction, only in the vertical direction, or in both of the horizontal and vertical directions. For example, in a case where a search range is expanded only in the horizontal direction by 4, (−X, −Y)−(X, Y) that are existing search ranges may be expanded to (−X−4, −Y) (X+4, Y).

A search range of TM may be configured based on an initial motion information candidate. Therefore, a search range when TM is performed again, based on a motion information candidate corrected as described with reference to FIGS. 23A to 25 may be configured based on the corrected motion information candidate. That is, TM may be performed in a new search range and a newly corrected motion information candidate may be obtained. Whether a TM method is recursively performed may be determined based on at least one of the size of the current block, the ratio between the width and the height of the current block, encoding mode information of the current block, AMVR resolution information of the current block, the amount of an error signal, and the position of a last transform coefficient in an error signal. For example, if AMVR has been applied to the current block or an AMVR resolution is equal to or greater than a predetermined random value, TM may be performed again by using a motion information candidate having been corrected in a previous TM stage. The predetermined random value may be a decimal or integer such as ½, 1, 2, . . . .

When TM is recursively performed, complexity may increase. In order to solve this problem, a video signal processing device may select a candidate having the smallest cost value among cost values of new motion information candidates generated by adding or subtracting a predetermined random number to or from a motion information candidate having been corrected in a previous TM stage. The predetermined random number may be a decimal or integer such as ½, 1, 2, . . . . For example, if a value of the motion information candidate having been corrected in the previous TM stage is (10, −5), the video signal processing device may obtain new candidates (11, −5), (9, −5), (10, −6), and (10, −4) by adding or subtracting 1. The video signal processing device may select, as an optimal corrected motion information candidate, a candidate having the smallest cost value among the corrected motion candidate and the new candidates. The predetermined random number may be differently configured according to AMVR resolution, if the AMVR resolution of the current block is a 1-integer pixel, the predetermined random number may be configured to be "1<<4", and if the AMVR resolution of the current block is 4-integer pixels, the predetermined random number may be configured to be "1<<6". If a corrected motion information candidate is positioned on a boundary of a search area or a periphery of the boundary, TM may be recursively performed. The periphery of the boundary may indicate an area within a predetermined random value from the boundary of the search area, and the predetermined random value may be an integer equal or greater than 1.

A TM method may improve encoding efficiency through a method of searching for an optimal motion information candidate, but is problematic in that complexity is increased. In order to alleviate the complexity problem, a video signal processing device may not search for all motion information candidates in a particular search stage, and if a random condition is satisfied, may terminate a search process. The random condition may be a condition based on at least one of a cost value of an optimal motion information candidate having been corrected in a previous stage, AMVR resolution information of the current block, and whether OBMC or MHP is applied to the current block. For example, the video signal processing device may determine whether to terminate a search by comparing a cost value of a particular motion information candidate in the current stage with a cost value of an optimal motion information candidate having been corrected in a previous stage. If the cost value of the particular motion information candidate in the current stage is smaller than the cost value of the optimal motion information candidate having been corrected in the previous stage, the video signal processing device may terminate the search. In the opposite case, the video signal processing device may continue the search. In addition, an image captured by a fixed camera may have more motions in the horizontal direction than in the vertical direction. The video signal processing device may first perform a search in the horizontal direction. Alternatively, a search sequence may be a pre-defined sequence. Information on a searching sequence may be included in an SPS of a bitstream, a PPS, or a picture/tile/slice header and then be signaled. A decoder may parse the information on the searching sequence to determine the searching sequence. A sequence in which a search is performed may be determined based on at least one of the size of the current block, the size of the width or the height of the current block, and AMVR information of the current block. For example, if the size of the current block is equal to or greater than 16×16, the vertical direction may be prioritized in a search sequence. Alternatively, if the AMVR information of the current block is equal to or greater than a 1-integer pixel unit, the horizontal direction may be prioritized in a search sequence. Alternatively, a search sequence may be defined in advance.

FIG. 26 to FIG. 29 are diagrams illustrating TM that is recursively performed according to an embodiment of the present invention.

Figure 26:
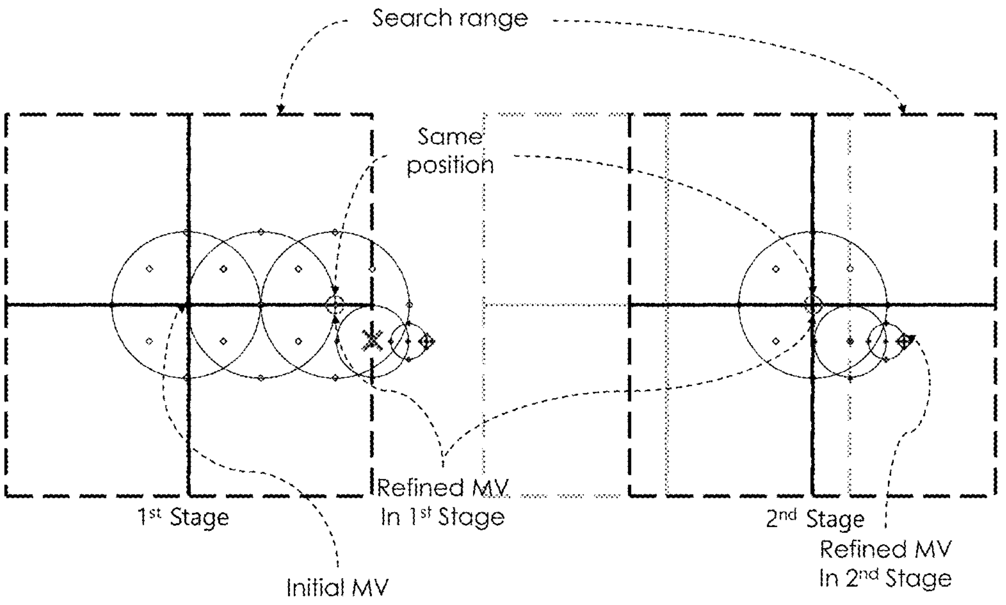

Referring to FIG. 26, a video signal processing device may perform primary TM and perform secondary TM, based on corrected motion information. A search range of the secondary TM is based on the corrected motion information, and thus a search area may be changed and encoding efficiency may be improved. However, two TMs being performed may cause a complexity problem. Hereinafter, a method of resolving the complexity will be described.

Whether recursive TM is performed, up to which stage recursive TM is performed, a search range, a search gap, a search pattern, a repetition count, a search sequence, and the size of a template may be determined based on at least one of the size of the current block, the size of the width or height of the current block, AMVR information on the current block, information on how many times recursive TM is performed, the horizontal or vertical difference between an initial motion information candidate and a corrected motion information candidate in a previous TM stage, and whether OBMC or MHP is applied to the current block. For example, if picture order counts (POCs) of reference pictures are all smaller than or equal to the POC of the current picture, the size of the current block is smaller than or equal to 128, and AMVR resolution information of the current block is a 1/16, ¼, ½, or 1-pixel unit, TM described in the present specification may be performed.

FIGS. 27A and 27B illustrate whether search is performed for each TM application stage, a search gap (searchStepShift), a repetition count, and a search pattern according to the AMVR resolution of the current block and a threshold (finestMvdPrec) according to an embodiment of the present invention, and illustrate a case where searching in TM is repeated 5 times according to a search gap, a repetition count, and a search pattern. Whether search is performed for each TM application stage is underlined and search may be performed using "(a search gap, a repetition count, a search pattern)" of underlined parts. Search corresponding to non-underlined parts in FIGS. 27A and 27B is not performed. Search is not performed when a search gap for each searching stage is smaller than a threshold (finestMvdPrec), and search may be performed only when the search gap is greater than or equal to the threshold. The threshold may be differently configured according to the AMVR resolution of the current block. A search pattern may vary, and may be a diamond pattern and a cross pattern. Search is performed in an order from the largest search gap to the smallest. For example, referring to FIG. 27A, if the AMVR of the current block is a 4-integer pixel unit, the threshold may be 6. The video signal processing device may perform recursive TM two times. A search gap of first TM is 6, the search is repeated 365 times, and the search may be performed in a diamond pattern. A search gap of second TM is 6, the search is repeated one time, and the search may be performed in a cross pattern. Hereinafter, a method of, when recursive TM is repeated, alleviating complexity increase is described.

Referring to FIG. 27B, a video signal processing device may determine, when TM is performed, a repetition count of a particular search stage, based on at least one of the size of the current block, the size of the width or the height of the current block, and AMVR information of the current block. If the AMVR resolution of the current block is a ½, 1, or 4-pixel unit, a repetition count of a second search process may be changed from "1" to "2", and the video signal processing device may perform a search one more time. Alternatively, if the AMVR resolution of the current block is a ½, 1, or 4-pixel unit, only a repetition count of a last search process may be changed from "1" to "2", and the video signal processing device may perform a search one more time.

whether search is performed for each TM application stage, a search range, a search gap, a search pattern, a repetition count, a search sequence, and the size of a template may be differently configured according to how many times recursive TM is performed. Referring to FIG. 28, when recursive TM is performed, a video signal processing device may perform only a last search process in second TM one more time. A search range for the second TM may be configured based on a motion information candidate having been corrected in previous TM. Therefore, the video signal processing device may perform, in the second TM, search having failed to be performed due to a search range restriction in the previous TM. In addition, the search range for the second TM may be configured to be smaller (or larger) than the search range of the first TM by a predetermined random number. For example, if the search range of the first TM is (−X, −Y)−(X, Y), the search range of the second TM may be (−X+2, −Y+2)−(X−2, Y−2). When a search range is reduced, complexity can be reduced. The predetermined random number may be an integer equal to or greater than 1.

Whether TM is performed, whether recursive TM is performed, whether search is performed for each TM application stage, a search range, a search gap, a search pattern, a repetition count, a search sequence, and the size of a template may be determined based on at least one of information on how many times recursive TM is performed, the horizontal or vertical size difference between an initial motion information candidate and a corrected motion information candidate in a previous TM stage, the size of a motion differential value of the current block, and whether OBMC is applied to the current block. For example, if at least one of the horizontal size difference or vertical size difference between an initial motion information candidate and a corrected motion information candidate in a previous TM stage is greater than a predetermined random value, recursive TM may be performed. Otherwise, TM may not be performed. The random value may be an integer equal to or greater than 1. Accordingly, if a motion candidate to be searched for in the previous TM stage is beyond a fixed search range, the search range is newly defined to enable TM to be performed again, whereby the motion information candidate may be corrected. Alternatively, if at least one of the horizontal size difference or vertical size difference between an initial motion candidate and a corrected motion candidate in a previous TM stage is equal to a predetermined random value, recursive TM may be performed. Otherwise, TM may not be performed. The predetermined random value may be a distance from the center of the search range to the boundary of the search range. Alternatively, if at least one of different values (D−DiffHor and D−Diff_Ver) between the distance (D) from the center of the search range to the boundary of the search range, and the horizontal size difference (Diff_Hor) and vertical size difference (Diff_Ver) between an initial motion information candidate and a corrected motion information candidate in a previous TM stage is smaller than or equal to a predetermined random value, recursive TM may be performed. The predetermined random value may be an integer, and for example, may be "tmThreshold" in FIG. 29. This case is a case where a corrected motion information candidate is positioned on or near the boundary of a fixed search range as illustrated in FIG. 29, and may be effective when search is impossible any more due to a restriction of the search range. In other words, a search range is updated based on a corrected motion information candidate of first TM so that second TM is performed again, whereby the motion information candidate may be additionally corrected.

The encoding performance of a TM method may change according to the accuracy of a template, and thus whether TM is applied may be configured for each motion information (L0, L1, MHP, etc.). Information on whether TM is applied may be included in an SPS of a bitstream, a PPS, or a picture/tile/slice header and then be signaled. In addition, whether the information on whether TM is applied is signaled may be determined based on at least one of the size of the current block, the size of the width or height of the current block, AMVR information on the current block, the size of a motion differential value of the current block, and whether OBMC or MHP is applied to the current block. Whether TM is applied may be configured in each of CTU, CU, and PU units.

If the size of the current block is equal to or greater than a predetermined random value, information on whether TM is applied may be included in a bitstream and then be signaled. A decoder may parse the information to determine whether TM is applied to the current block. If the size of the current block is smaller than the predetermined random value, information on whether TM is applied may not be included in a bitstream. If information on whether TM is applied is not included in a bitstream, the decoder may consider that TM is not applied or is applied to the current block. A differential value of L0-directional motion information of the current block is within a predetermined random size or a predetermined random range, information on whether TM is applied may be included in a bitstream and then be signaled. The decoder may parse the information on whether TM is applied to determine whether to apply TM to the L0-directional motion of the current block. Here, a predetermined random value may be 0, a negative integer, or a positive integer.

A differential value of L0-directional motion information of the current block is within a predetermined random size or a predetermined random range, TM may be applied or not applied to the L0-directional motion of the current block. The predetermined random size may be 0, a negative integer, or a positive integer. The predetermined random range may be configured based on the predetermined random size, and for example, may be a range of −3 to +3. Whether TM is applied to the L1-directional motion of the current block may be independently configured regardless of whether TM is applied to the L0-directional motion. Additional motion information may be signaled when an MHP mode is applied to the current block. Whether TM is applied to the additional motion information may be independently configured regardless of whether TM is applied to the L0 or L1-directional motion. Alternatively, whether TM is applied to the L1-directional motion of the current block and whether TM is applied to additional motion information (MHP) may be configured based on at least one of whether TM is applied to the L0-directional motion and a differential value of L0-directional motion information. For example, if a differential value of L0-directional motion information of the current block is within a predetermined random size or a predetermined random range, TM may be applied or not applied to the L1-directional motion of the current block.

The methods described in the present specification may be used to correct a motion information candidate when an encoding mode is a mode, such as AMVP, Merge, AMVP-Merge, MHP, DMVR, Multipass-DMVR, CIIP, GPM, Affine, SMVD, IBC, etc. Whether a method described in the present specification is used may be determined based on at least one of the size of the current block, the ratio between the width and the height of the current block, encoding mode information of the current block, a quantization parameter, AMVR resolution information of the current block, the amount of transform coefficients of an error signal, the position of a last transform coefficient in an error signal, and whether OBMC or MHP is applied to the current block.

Figure 30:
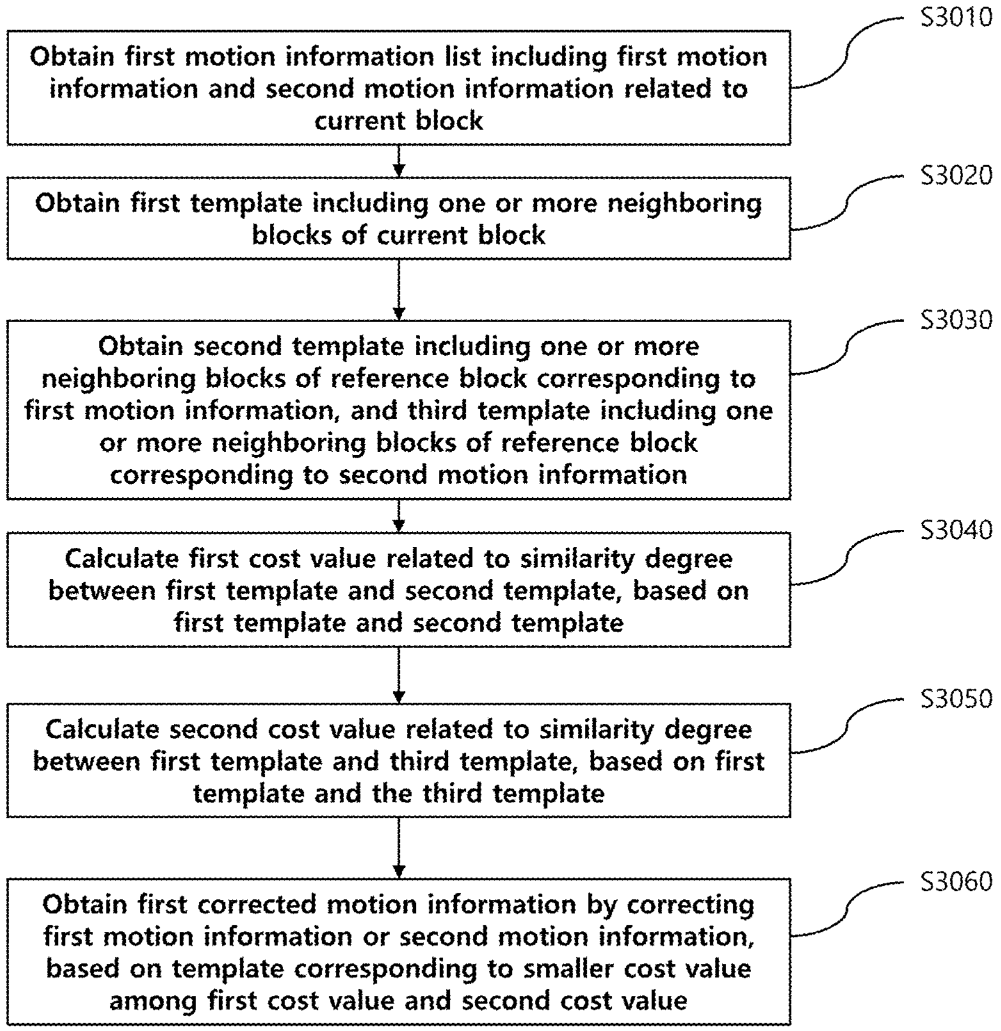
FIG. 30 is a flowchart illustrating a method of correcting a motion information candidate of a current block according to an embodiment of the present invention.

FIG. 30 is a flowchart illustrating a method of correcting a motion information candidate of a current block according to an embodiment of the present invention.

FIG. 30 shows a method of correcting a motion information candidate as described with reference to FIG. 1 to FIG. 29.

Referring to FIG. 30, a video signal processing device may obtain a first motion information list including first motion information and second motion information related to a current block (operation S3010). The video signal processing device may obtain a first template including one or more neighboring blocks of the current block (operation S3020). The video signal processing device may obtain a second template including one or more neighboring blocks of a reference block corresponding to the first motion information, and a third template including one or more neighboring blocks of a reference block corresponding to the second motion information (operation S3030). The video signal processing device may calculate a first cost value related to a similarity degree between the first template and the second template, based on the first template and the second template (operation S3040). The video signal processing device may calculate a second cost value related to a similarity degree between the first template and the third template, based on the first template and the third template (operation S3050). The video signal processing device may obtain first corrected motion information by correcting the first motion information or the second motion information, based on a template corresponding to a smaller cost value among the first cost value and the second cost value (operation S3060).

The first template may be configured by only one or more neighboring blocks adjacent to an upper side of the current block, may be configured by only one or more neighboring blocks adjacent to a left side of the current block, or may be configured by one or more neighboring blocks adjacent to the upper side of the current block and one or more neighboring blocks adjacent to the left side of the current block.

The first cost value may be calculated based on a sum of cost values related to respective similarity degrees between the one or more neighboring blocks of the current block included in the first template and the one or more neighboring blocks of the reference block corresponding to the first motion information, the one or more neighboring blocks being included in the second template and corresponding to the one or more neighboring blocks of the current block included in the first template, respectively. The second cost value may be calculated based on a sum of cost values related to respective similarity degrees between the one or more neighboring blocks of the current block included in the first template and the one or more neighboring blocks of the reference block corresponding to the second motion information, the one or more neighboring blocks being included in the third template and corresponding to the one or more neighboring blocks of the current block included in the first template, respectively. The cost value in the present specification may be obtained through sum of absolute differences (SAD) or mean-removed SAD (MRSAD), as described above.

A video signal processing device may rearrange the first motion information and the second motion information of the first motion information list, based on the first cost value and the second cost value.

The video signal processing device may round the first corrected motion information, based on an adaptive motion vector resolution (AMVR) of the current block.

The first corrected motion information may be motion information corrected based on template matching.

The video signal processing device may obtain a fourth template including one or more neighboring blocks of a reference block corresponding to the first corrected motion information. The video signal processing device may obtain second corrected motion information by correcting the first corrected motion information, based on the fourth template. The second corrected motion information may be motion information corrected based on the template matching.

A search range for performing the template matching may be determined based on an adaptive motion vector resolution (AMVR) of the current block.

The first motion information list may include pieces of motion information corresponding to (x1+K, y1), (x1−K, y1), (x1, y1+K), (x1, y1−K), (x2+K, y2), (x2−K, y2), (x2, y2+K), and (x2, y2−K), respectively. The first motion information may be (x1, y1), the second motion information may be (x2, y2), and K may be an integer equal to or greater than 1. An upper-left sample of the current block may be represented in a coordinate type of (0, 0). When an adaptive motion vector resolution (AMVR) of the current block is X, the first motion information list may include pieces of motion information corresponding to (x1+K*X, y1), (x1−K*X, y1), (x1, y1+K*X), (x1, y1−K*X), (x2+K*X, y2), (x2−K*X, y2), (x2, y2+K*X), and (x2, y2−K*X), respectively, and X may be a real number.

The above methods (video signal processing methods) described in the present specification may be performed by a processor in a decoder or an encoder. Furthermore, the encoder may generate a bitstream that is decoded by a video signal processing method. Furthermore, the bitstream generated by the encoder may be stored in a computer-readable non-transitory storage medium (recording medium).

The present specification has been described primarily from the perspective of a decoder, but may function equally in an encoder. The term "parsing" in the present specification has been described in terms of the process of obtaining information from a bitstream, but in terms of the encoder, may be interpreted as configuring the information in a bitstream. Thus, the term "parsing" is not limited to operations of the decoder, but may also be interpreted as the act of configuring a bitstream in the encoder. Furthermore, the bitstream may be configured to be stored in a computer-readable recording medium.

The above-described embodiments of the present invention may be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A video signal decoding device comprising a processor, wherein the processor is configured to:
- obtain a first motion information list including first motion information and second motion information related to a current block,
- obtain a first template including one or more neighboring samples of the current block,
- obtain a second template including one or more neighboring samples of a first reference block corresponding to the first motion information, and a third template including one or more neighboring samples of a second reference block corresponding to the second motion information,
- calculate a first cost value by comparing the first template with the second template,
- calculate a second cost value by comparing the first template with the third template,
- determine third motion information to be corrected as either the first motion information or the second motion information by comparing the first cost value and the second cost value, and
- obtain first corrected motion information by correcting the third motion information based on a template corresponding to a smaller cost value among the first cost value and the second cost value.

2. The video signal decoding device of claim 1, wherein the first template is configured to include only one or more neighboring samples adjacent to an upper side of the current block or the first template is configured to include only one or more neighboring samples adjacent to a left side of the current block, or the first template is configured to include one or more neighboring samples adjacent to the upper side of the current block and one or more neighboring samples adjacent to the left side of the current block.

3. The video signal decoding device of claim 1, wherein the first corrected motion information is motion information corrected based on template matching.

4. The video signal decoding device of claim 3, wherein the processor is configured to:
- obtain a fourth template including one or more neighboring samples of a third reference block corresponding to the first corrected motion information,
- obtain second corrected motion information by correcting the first corrected motion information based on the fourth template, and
- wherein the second corrected motion information is motion information corrected based on the template matching.

5. The video signal decoding device of claim 4,
- wherein when the first corrected motion information is located within a preconfigured area, the second corrected motion information is obtained by recursively performing correction of motion information.

6. The video signal decoding device of claim 5,
- wherein the preconfigured area is within a search area determined based on a size of the current block,
- wherein the preconfigured area corresponds to a range between a boundary of the search area and a location that is an offset from the boundary of the search area.

7. The video signal decoding device of claim 6,
- wherein the offset is 1 or greater.

8. The video signal decoding device of claim 7, wherein the search area for performing the template matching is determined based on an adaptive motion vector resolution (AMVR) of the current block.

9. The video signal decoding device of claim 1, wherein the first motion information list comprises pieces of motion information corresponding to (x1+K, y1), (x1−K, y1), (x1, y1+K), (x1, y1−K), (x2+K, y2), (x2−K, y2), (x2, y2+K), and (x2, y2−K), respectively, and
- the first motion information is (x1, y1), the second motion information is (x2, y2), and K is an integer equal to or greater than 1.

10. The video signal decoding device of claim 9, wherein, when an adaptive motion vector resolution (AMVR) of the current block is X,
- the first motion information list comprises pieces of motion information corresponding to (x1+K*X, y1), (x1−K*X, y1), (x1, y1+K*X), (x1, y1−K*X), (x2+K*X, y2), (x2−K*X, y2), (x2, y2+K*X), and (x2, y2−K*X), respectively, and
- X is a real number.

11. The video signal decoding device of claim 3, wherein information related to the template matching is determined based on at least one of a size of the current block, an adaptive motion vector resolution (AMVR) of the current block, the first motion information, or a difference between the second motion information and the first corrected motion information.

12. The video signal decoding device of claim 11, wherein the information related to the template matching includes at least one of whether the template matching is performed, a search area for the template matching, a search interval for the template matching, a search pattern for the template matching, or a number of times the templated matching is performed.

13. The video signal decoding device of claim 3, wherein whether the template matching is performed based on a size of the current block, a ratio between a width of the current block and a height of the current block, a prediction mode of the current block, an adaptive motion vector resolution (AMVR) of the current block, a residual of the current block, a location of a last transform coefficient of the current block, a difference between motion information of a spatial neighboring block of the current block and motion information of a temporal neighboring block of the current block, or a template matching cost.

14. The video signal decoding device of claim 3, wherein the processor is configured to:

determine whether to parse a syntax element indicating whether the template matching is performed based on a differential value of motion information, wherein the syntax element is parsed for each reference picture list.

15. A video signal encoding device comprising a processor, wherein the processor is configured to obtain a bitstream decoded by a decoding method, and wherein the decoding method comprises:

obtaining a first motion information list including first motion information and second motion information related to a current block;

obtaining a first template including one or more neighboring samples of the current block;

obtaining a second template including one or more neighboring samples of a first reference block corresponding to the first motion information, and a third template including one or more neighboring samples of a second reference block corresponding to the second motion information;

calculating a first cost value by comparing the first template with the second template;

calculating a second cost value by comparing the first template with the third template;

determining third motion information to be corrected as either the first motion information or the second motion information by comparing the first cost value and the second cost value; and obtaining first corrected motion information by correcting the third motion information based on a template corresponding to a smaller cost value among the first cost value and the second cost value.

16. The video signal encoding device of claim 15, wherein the first template is configured to include only one or more neighboring samples adjacent to an upper side of the current block or the first template is configured to include only one or more neighboring samples adjacent to a left side of the current block, or the first template is configured to include one or more neighboring samples adjacent to the upper side of the current block and one or more neighboring samples adjacent to the left side of the current block.

17. The video signal encoding device of claim 15, wherein the first corrected motion information is motion information corrected based on template matching.

18. The video signal encoding device of claim 17, wherein the decoding method further comprises:

obtaining a fourth template including one or more neighboring samples of a third reference block corresponding to the first corrected motion information; and obtaining second corrected motion information by correcting the first corrected motion information, based on the fourth template, and wherein the second corrected motion information is motion information corrected based on the template matching.

19. The video signal encoding device of claim 18, wherein when the first corrected motion information is located within a preconfigured area, the second corrected motion information is obtained by recursively performing correction of motion information.

20. A method of generating a bitstream, the method comprising:

obtaining a first motion information list including first motion information and second motion information related to a current block;

obtaining a first template including one or more neighboring samples of the current block;

obtaining a second template including one or more neighboring samples of a first reference block corresponding to the first motion information, and a third template including one or more neighboring samples of a second reference block corresponding to the second motion information;

calculating a first cost value by comparing the first template with the second template;

calculating a second cost value by comparing the first template with the third template;

determining third motion information to be corrected as either the first motion information or the second motion information by comparing the first cost value and the second cost value;

obtaining first corrected motion information by correcting the third motion information based on a template corresponding to a smaller cost value among the first cost value and the second cost value; and generating the bitstream including at least one of the first motion information, the second motion information, the third motion information and the first corrected motion information.

* * * * *